(12) United States Patent
Addepalli et al.

(10) Patent No.: US 8,514,825 B1
(45) Date of Patent: Aug. 20, 2013

(54) SYSTEM AND METHOD FOR ENABLING A VEHICULAR ACCESS NETWORK IN A VEHICULAR ENVIRONMENT

(75) Inventors: Sateesh K. Addepalli, San Jose, CA (US); Rodolfo A. Milito, Los Gatos, CA (US); Lillian Lei Dai, Rockville, MD (US); Flavio Bonomi, Palo Alto, CA (US); Raghuram S. Sudhaakar, Sunnyvale, CA (US); Christian Ibars Casas, Celra (ES); Pere Monclus, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 13/118,024

(22) Filed: May 27, 2011

Related U.S. Application Data

(60) Provisional application No. 61/433,138, filed on Jan. 14, 2011.

(51) Int. Cl.
  *H04W 4/00* (2009.01)
(52) U.S. Cl.
  USPC .......................................................... 370/338
(58) Field of Classification Search
  USPC ..................... 370/310, 312–315, 328–350
  See application file for complete search history.

(56) References Cited

U.S. PATENT DOCUMENTS

| | | |
|---|---|---|
| 5,428,666 A | 6/1995 | Fyfe et al. |
| 5,604,787 A | 2/1997 | Kotzin et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,078,652 A | 6/2000 | Barak |
| 6,169,387 B1 | 1/2001 | Kaib |
| 6,175,789 B1 | 1/2001 | Beckert et al. |
| 6,285,869 B1 | 9/2001 | Shannon et al. |
| 6,427,073 B1 | 7/2002 | Kortesalmi et al. |
| 6,484,082 B1 | 11/2002 | Millsap et al. |

(Continued)

FOREIGN PATENT DOCUMENTS

| | | |
|---|---|---|
| DE | 10146664 A1 | 2/2003 |
| EP | 1337119 A | 8/2003 |

(Continued)

OTHER PUBLICATIONS

Ibars et al, Radio Resource Allocation for a High Capacity Vehicular Access Network, IEEE, 5 pages, 2011.*

(Continued)

*Primary Examiner* — Frank Duong
(74) *Attorney, Agent, or Firm* — Patent Capital Group

(57) ABSTRACT

A method includes joining a vehicular access network (VAN) comprising cooperative communication between a plurality of on-board units (OBU) in respective vehicles, scanning the VAN to pick up a coverage of at least one infrastructure access point (IAP), which operates on a control channel in a radio access tree (RAT) comprising a plurality of cells, listening to a channel allocation information from the IAP that includes a request for a mobile cell gateway (MCG) at a nominal location in the RAT, and sending a candidacy message to the at least one IAP to become an MCG. Certain embodiments include establishing the VAN in a highway, and in urban areas, aggregating traffic in a cell and transmitting to the IAP via the MCG, and other features.

20 Claims, 34 Drawing Sheets

(56) References Cited

U.S. PATENT DOCUMENTS

| | | | |
|---|---|---|---|
| 6,490,679 B1 | 12/2002 | Tumblin et al. |
| 6,516,357 B1 | 2/2003 | Hamann et al. |
| 6,526,272 B1 | 2/2003 | Bansal et al. |
| 6,587,127 B1 | 7/2003 | Leeke et al. |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,069,144 B2 | 6/2006 | Yoshihara et al. |
| 7,082,359 B2 | 7/2006 | Breed |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummett et al. |
| 7,363,056 B2 | 4/2008 | Faisy |
| 7,389,178 B2 | 6/2008 | Raz et al. |
| 7,558,110 B2 | 7/2009 | Mizushima et al. |
| 7,593,605 B2 | 9/2009 | King et al. |
| 7,603,107 B2 | 10/2009 | Ratert et al. |
| 7,606,643 B2 | 10/2009 | Hunt et al. |
| 7,630,802 B2 | 12/2009 | Breed |
| 7,636,626 B2 | 12/2009 | Oesterling et al. |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,792,618 B2 | 9/2010 | Quigley et al. |
| 7,904,569 B1 | 3/2011 | Gelvin et al. |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,180,400 B2 | 5/2012 | Shin et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 * | 7/2012 | Yim et al. ............ 370/229 |
| 8,249,087 B2 | 8/2012 | Takada et al. |
| 2002/0006139 A1 | 1/2002 | Kikkawa et al. |
| 2002/0072388 A1 | 6/2002 | Korneluk et al. |
| 2002/0097855 A1 | 7/2002 | Neudeck et al. |
| 2002/0103964 A1 | 8/2002 | Igari |
| 2002/0165008 A1 | 11/2002 | Sashihara et al. |
| 2002/0198632 A1 | 12/2002 | Breed et al. |
| 2003/0005435 A1 | 1/2003 | Nelger et al. |
| 2003/0009271 A1 | 1/2003 | Akiyama |
| 2003/0028763 A1 | 2/2003 | Malinen et al. |
| 2003/0046228 A1 | 3/2003 | Berney |
| 2003/0051041 A1 | 3/2003 | Kalavade et al. |
| 2003/0083968 A1 | 5/2003 | Marsh et al. |
| 2003/0191939 A1 | 10/2003 | Tsai et al. |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0249915 A1 | 12/2004 | Russell |
| 2004/0256451 A1 | 12/2004 | Goman et al. |
| 2005/0009563 A1 | 1/2005 | Stenmark |
| 2005/0020250 A1 | 1/2005 | Chaddha et al. |
| 2005/0039027 A1 | 2/2005 | Shapiro |
| 2005/0065678 A1 | 3/2005 | Smith et al. |
| 2005/0075137 A1 | 4/2005 | Reemtsma |
| 2005/0101323 A1 | 5/2005 | De Beer |
| 2005/0124288 A1 | 6/2005 | Karmi et al. |
| 2005/0239504 A1 | 10/2005 | Ishi et al. |
| 2005/0266883 A1 | 12/2005 | Chatrath |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0040005 A1 | 2/2008 | Breed |
| 2008/0051062 A1 | 2/2008 | Lee |
| 2008/0072299 A1 | 3/2008 | Reiher |

| | | |
|---|---|---|
| 2008/0087720 A1 | 4/2008 | Levitov |
| 2008/0120504 A1 | 5/2008 | Kirkup et al. |
| 2008/0147265 A1 | 6/2008 | Breed |
| 2008/0147271 A1 | 6/2008 | Breed |
| 2008/0169350 A1 | 7/2008 | Audebert et al. |
| 2008/0209545 A1 | 8/2008 | Asano |
| 2008/0220743 A1 | 9/2008 | Mora et al. |
| 2008/0227604 A1 | 9/2008 | Daniel |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0312850 A1 | 12/2009 | Higuchi et al. |
| 2010/0005313 A1 | 1/2010 | Dai |
| 2010/0088401 A1 | 4/2010 | Degraeve et al. |
| 2010/0112997 A1 | 5/2010 | Roundtree |
| 2010/0167724 A1 | 7/2010 | Haran et al. |
| 2010/0215043 A1 | 8/2010 | Hisada |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0034201 A1* | 2/2011 | Hamada et al. ............... 455/517 |
| 2011/0055292 A1 | 3/2011 | Madau et al. |
| 2011/0059738 A1 | 3/2011 | Waller |
| 2011/0106375 A1 | 5/2011 | Gurusamy |
| 2012/0004933 A1 | 1/2012 | Foladare et al. |
| 2012/0089299 A1 | 4/2012 | Breed |
| 2012/0109418 A1 | 5/2012 | Lorber |
| 2012/0182935 A1 | 7/2012 | Addepalli et al. |

FOREIGN PATENT DOCUMENTS

| | | |
|---|---|---|
| EP | 1696357 | 8/2006 |
| EP | 1727383 | 11/2006 |
| EP | 1758335 | 2/2007 |
| GB | 2294787 | 5/1996 |
| GB | 2313257 A | 11/1997 |
| GB | 2386803 A | 9/2003 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

Weigle, Standards: WAVE/DSEC/802.11p, Old Dominion University, 19 pages, 2008.*

Bilstrup, A Survey Regarding Wireless Communication Standards Intended for a High-Speed Vehicle Environment, Technical Report IDE0712, 51, pages, Feb. 2007.*

Hsu, WAVE/DSRC Development and Standardization, Industrial Technology Research Institute, 84 pages, 2010.*

U.S. Appl. No. 13/014,605, entitled "System and Method for Enabling Secure Transactions Using Flexible Identity Management in a Vehicular Environment," filed Jan. 26, 2011, Inventors: Sateesh K. Addepalli et al.

U.S. Appl. No. 13/071,367,605, entitled "System and Method for Wireless Interface Selection and for Communication and Access Control of Subsystems, Devices, and Data in a Vehicular Environment," filed Mar. 24, 2011, Inventors: Sateesh K. Addepalli et al.

U.S. Appl. No. 13/083,305, entitled "System and Method for Applications Management in a Networked Vehicular Environment," filed Apr. 8, 2011, Inventors: Sateesh K. Addepalli et al.

U.S. Appl. No. 13/087,884, entitled "System and Method for Discovery, Trusted Execution, and Admission Control in a Vehicular Environment," filed Apr. 15, 2011, Inventors: Sateesh K. Addepalli et al.

U.S. Appl. No. 13/087,884, entitled "System and Method for Packet Distribution in a Vehicular Network Environment," filed May 5, 2011, Inventors: Sateesh K. Addepalli et al.

U.S. Appl. No. 13/104,737, entitled "System and Method for Internal Networking, Data Optimization and Dynamic Frequency Selection in a Vehicular Environment," filed May 10, 2011, Inventors: Sateesh K. Addepalli et al.

U.S. Appl. No. 13/108,631, entitled "System and Method for Real-Time Synthesis and Performance Enhancement of Audio/Video Data, and Noise Cancellation and Gesture Based User Interfaces in a Vehicular Environment," filed May 10, 2011, Inventors: Sateesh K. Addepalli et al.

U.S. Appl. No. 13/111,425, entitled "System and Method for Providing Resource Sharing, Synchronizing, Media Coordination, Transcoding, and Traffic Management in aVehicular Environment," filed May 19, 2011, Inventors: Sateesh K. Addepalli et al.

U.S Appl. No. 13/114,659, entitled "System and Method for Transport, Network, Translation, and Adaptive Coding in a Vehicular Network Environment," filed May 24, 2011, Inventors: Sateesh K. Addepalli et al.

U.S. Appl. No. 13/117,860, entitled "System and Method for Analyzing Vehicular Behavior in a Network Environment," filed May 27, 2011, Inventors: Sateesh K. Addepalli et al.

Autonet Mobile, "Autonet Mobile Features, Technology Specifications," autonetmobile.com, 1 page; [retrieved and printed Apr. 8, 2011] http://www.autonetmobile.com/service/anmdev.html.

Autonet Mobile, "CARFI Features, Technology Specifications," autonetmobile.com, 1 page; [retrieved and printed Apr. 8, 2011] http://autonetmobile.com/service/carfidev.html.

Autonet Mobile, "It's What Your Car has been Waiting For", autonetmobile.com, 2 pages; [retrieved and printed Apr. 8, 2011] http://www.autonetmobile.com/service/.

"Cisco Mobile Network Solutions for Commercial Transit Agencies," Cisco.com, © 2008 Cisco Systems, Inc., 8 pages; http://www.cisco.com/en/US/prod/collateral/routers/ps272/white_paper_c11-4921115.html.

"Cisco Mobile Network Solutions for Public Safety," Cisco.com, 2008 Cisco Systems, Inc., 7 pages; http://www.cisco.com/en/US/prod/collateral/routers/ps272/prod_white_paper0900aecd806220af.html.

Farinacci, D. et al., "LISP Mobile Node," Network Working Group Internet Draft, Feb. 1, 2010, 22 pages; http://tools.ietf.org/id/draft-meyer-lisp-mn-01.txt.

Ibars, Christian et al., "Wireless Services in the Connected Vehicle Era," IEEE Communications Magazine, Dec. 23, 2010, 13 pages.

Robert Bosch GmbH, *Automotive Electrics Automotive Electronics, Systems and Components, New: Networking Hybrid Drive*, 5th Edition, Nov. 2007, BentleyPublishers.com, 255 pages (two parts submitted: Part1-121 pages; Part 2-131 pages).

Lillian Lei Dai, "*Proactive Mobile Wireless Networks; an infrastructureless wireless network architecture for delay-sensitive applications*," Massachusetts Institute of Technology, Jun. 2008 (two parts submitted: Part 1-105 pages; Part 2-97 pages).

Zeldovich, Nickalai et al., "Making Information Flow Explicit in HiStar," OSDI '06: 7$^{th}$ USENIX Symposium on Operating Systems Design and Implementation, Nov. 2006, 16 pages.

Zeldovich, Nickolai et al., "Security Distributed Systems with Information Flow Control," NSDI '08: 5$^{th}$ USENIX Sumposium on Networked Systems Design and Implementation, Apr. 2008, 16 pages.

Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.

U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.

EPO May 22, 2012 European Search Report and Written Opinion from EP 12150208.2.

"TCG Mobile Trusted Module Specification." Trusted Computing Group, Specification version 1.0, Revision 6, Jun. 2008, 105 pages; http://www.trustedcomputinggroup.org/files/resource_files/87852F33-1D09-3519-AD0C0F141CC6B10D/Revision_6-tcg-mobile-trusted-module-1_0.pdf.

Alves, T., et al., "TrustZone: Integrated Hardware and Software Security," Information Quarterly, vol. 3, No. 4, 2004, pp. 18-24; http://www.iqmagazineonline.com/magazine/pdf/v_3_4_pdf/Pg18_24_custZone_Secur.pdf.

Arsenault, A., et al., "Securely Available Credentials—Requirements," IETF, Network Working Group, RFC 3157, Baltimore Technologies, Aug. 2001, 20 pages.

Bickhart, Ryan W., et al., "Transparent TCP-to-SCTP Translation Shim Layer," EuroBSDCon 2007, Copenhagen, Denmark; 14 pages.

Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.

Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.

EPO Jan. 21, 2013 EPO Response to Communication regarding Written Opinion from EP 12150208.2.

Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.

Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.

PCT Apr. 22, 2009 International Search Report for PCT/US08/88320; 3 pages.

PCT Jun. 29, 2010 International Preliminary Report on Patentability and Written Opinion of the International Searching Authority for PCT/US08/88320; 10 pages.

Scarfone, Karen et al., "Guide to Instrusion Detection and Prevention Systems (IDPS)," NIST (National Institute of Standards and Technology), Special Publication 800-94, Feb. 2007, 127 pages; http://csrc.ncsl.nist.gov/publications/nistpubs/800-94/SP800-94.pdf.

Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.

* cited by examiner

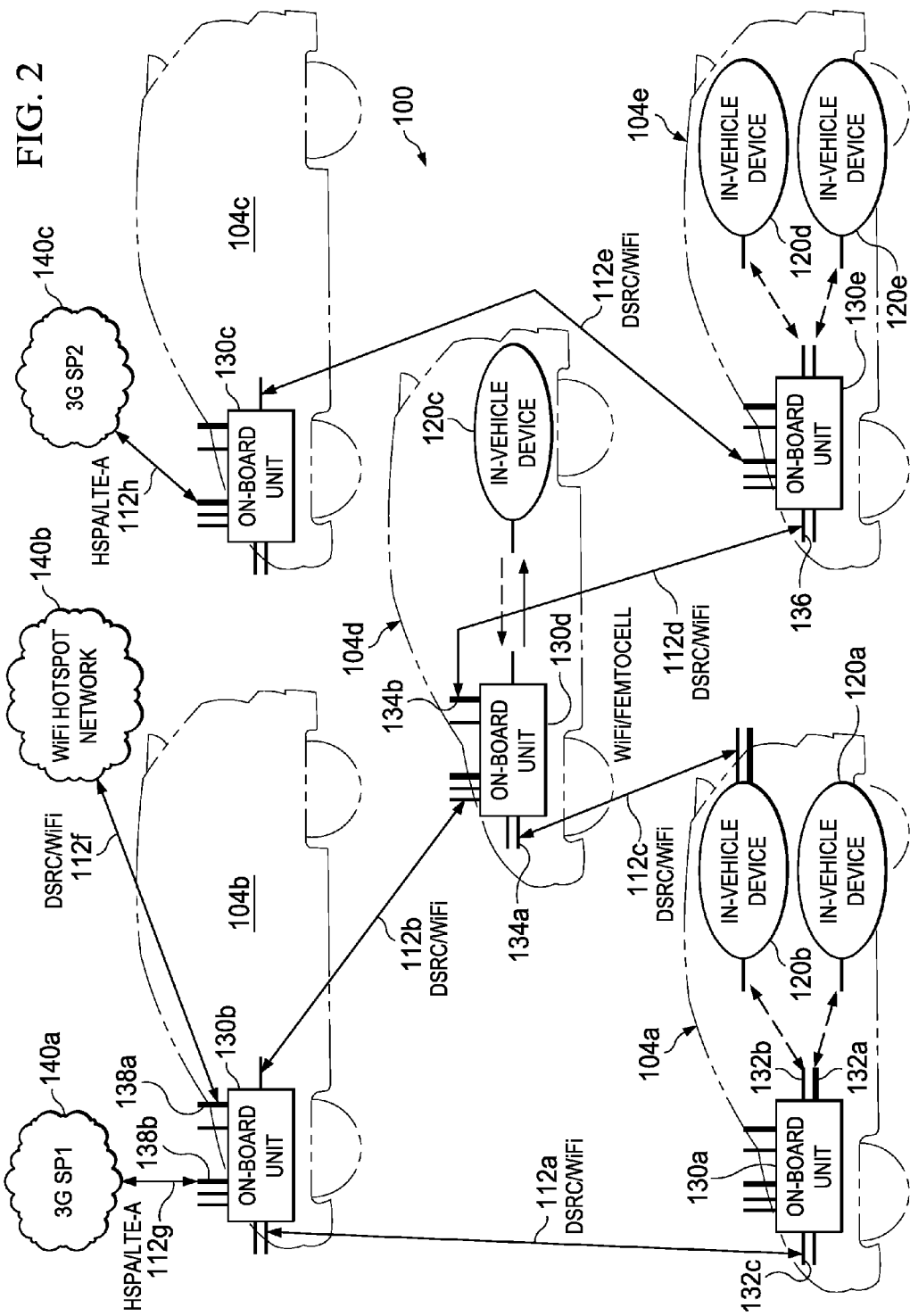

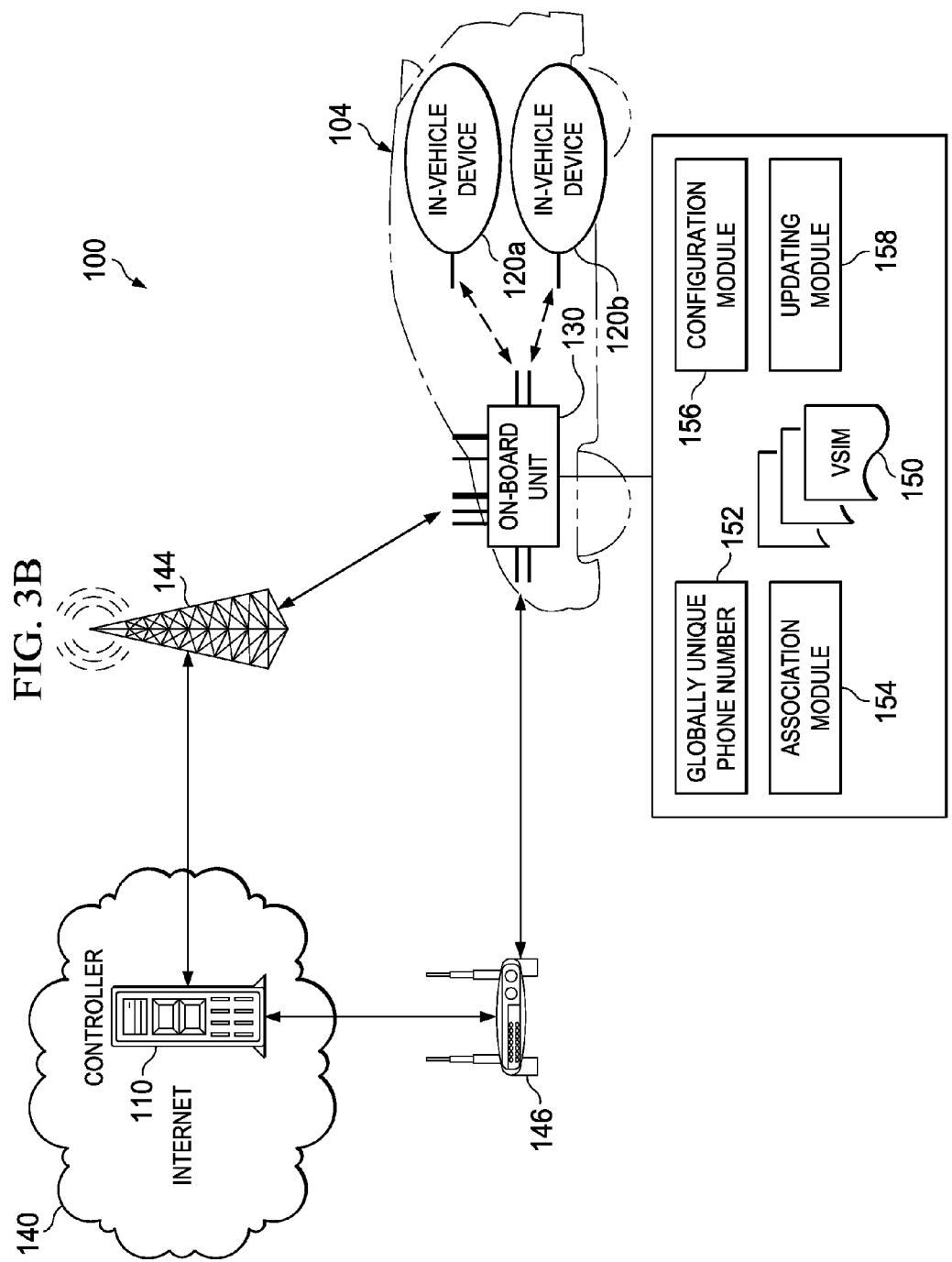

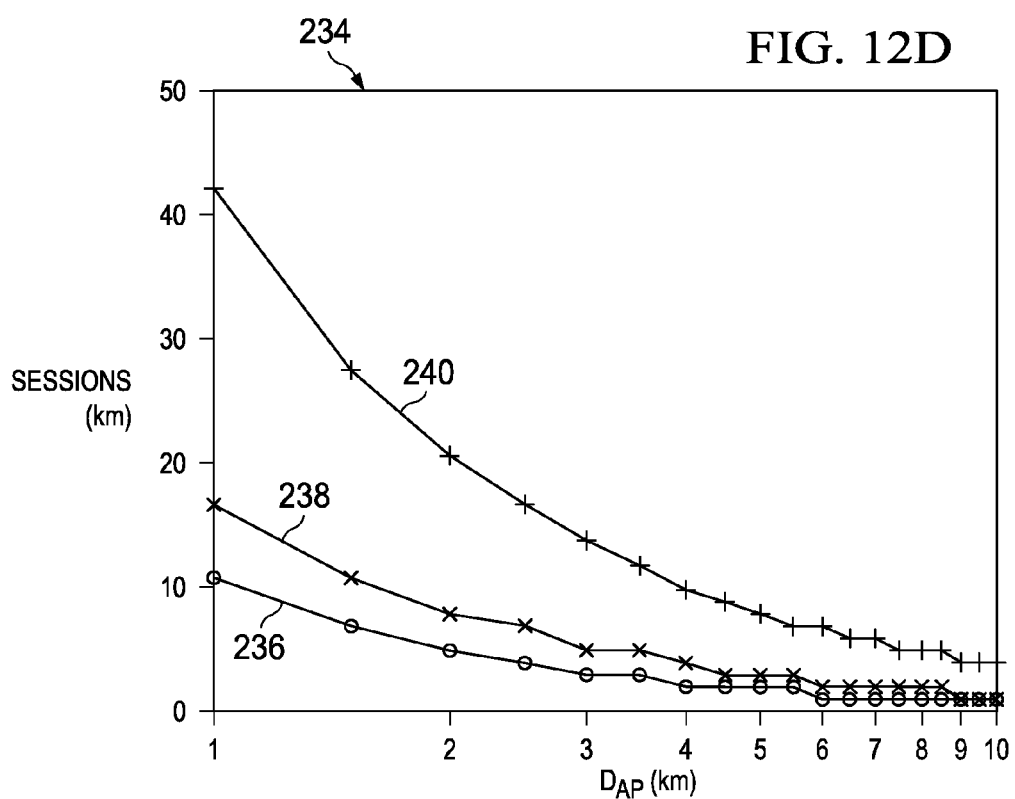

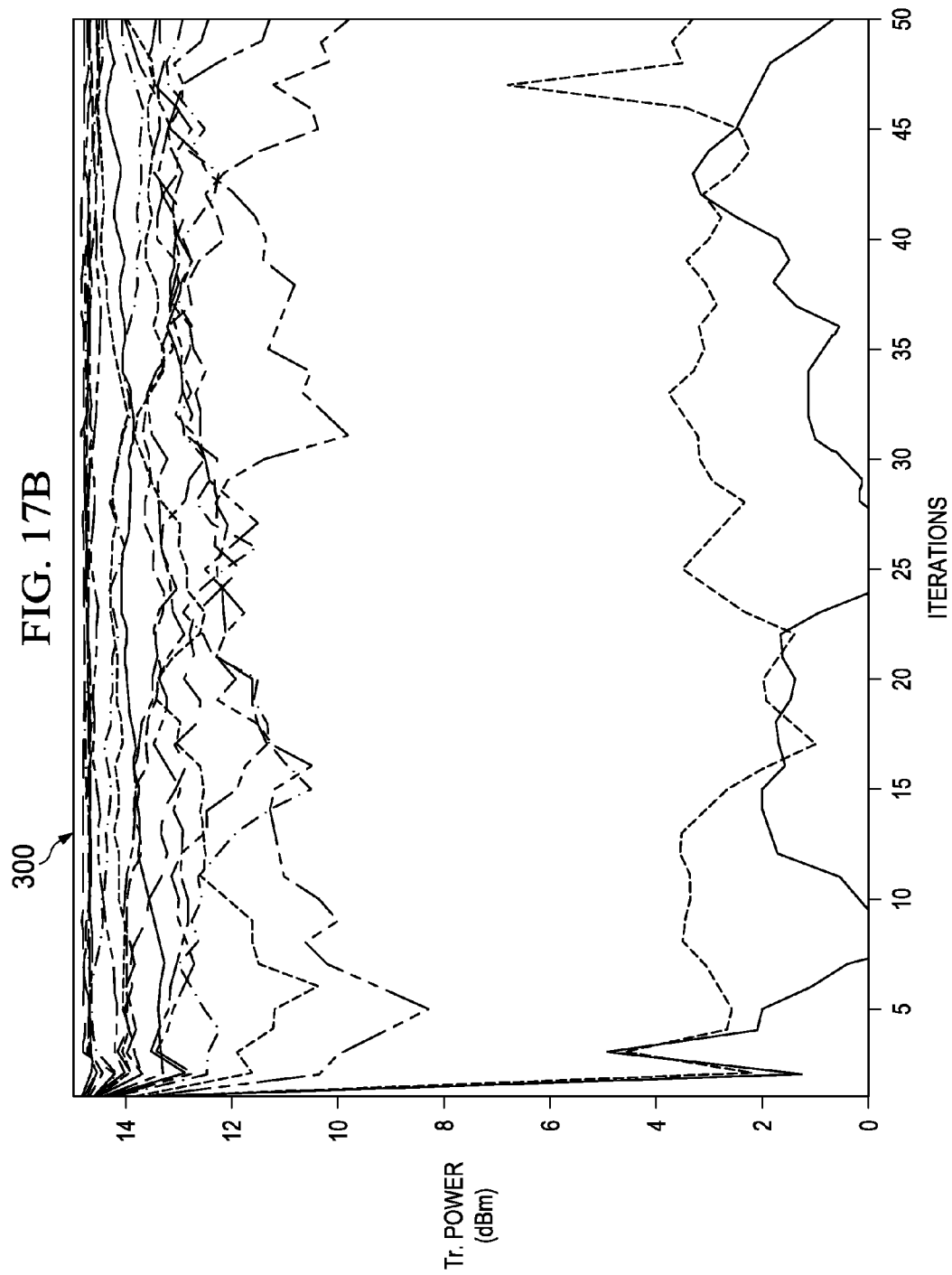

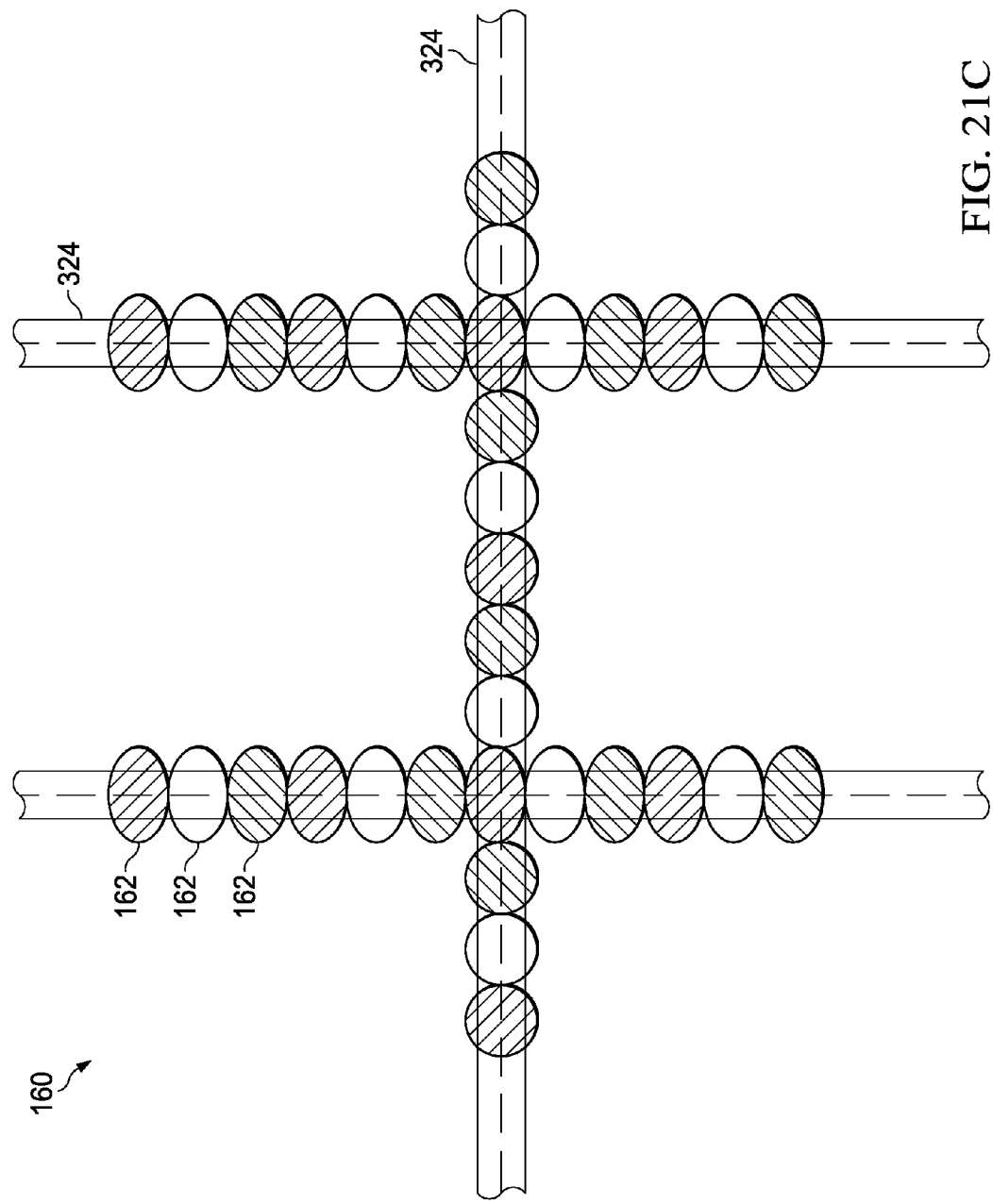

under 35 U.S.C. §119(e) of U.S. Provisional Application Ser. No.
SYSTEM AND METHOD FOR ENABLING A VEHICULAR ACCESS NETWORK IN A VEHICULAR ENVIRONMENT

CROSS-REFERENCE TO RELATED APPLICATION

This application claims the benefit of priority under 35 U.S.C. §119(e) of U.S. Provisional Application Ser. No. 61/433,138, filed Jan. 14, 2011, by Sateesh K. Addepalli, et al., entitled "SYSTEM, METHOD, AND PROCESSES ASSOCIATED WITH CONNECTED VEHICLES," which is hereby incorporated by reference in its entirety.

TECHNICAL FIELD

This disclosure relates in general to the field of electronic communications and, more particularly, to enabling a vehicular access network in a vehicular environment.

BACKGROUND

Networking architectures have grown increasingly complex and, further, have been designed for use in a wide variety of communications environments. Demand continues to rise among the subscriber base of end users, particularly so for network access across diverse network environments. In particular, configuring suitable network architectures for vehicular environments (e.g., automobiles, airplanes, trains, boats, etc.) presents unique difficulties. Vehicles can be mobile across a large geographical area, can travel at variable speeds, can have internal networks related to the vehicle itself, and can include more than one end user at a time. Providing the ability to conduct transactions in vehicular network environments in an optimized manner and enabling a vehicular access network in vehicular network environment present significant challenges to system designers, automobile manufacturers and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram of an embodiment of a vehicular access network in accordance with the present disclosure;

FIG. 3B is a simplified block diagram illustrating potential details that may be associated with an on-board unit (OBU) in a vehicular access network in accordance with the present disclosure;

FIGS. 12A through 12D show graphs illustrating RAT capacity over distance from an IAP for various example applications, according to embodiments of the present disclosure;

FIGS. 17A and 17B show graphs of transmitted power over iteration numbers associated with exemplary methods in accordance with the present disclosure;

FIGS. 21A through 21C are simplified block diagrams showing potential principles of operation of embodiments of the VAN in accordance with the present disclosure;

DETAILED DESCRIPTION OF EXAMPLE EMBODIMENTS

Overview

A method includes joining a vehicular access network (VAN) comprising cooperative communication between a plurality of on-board units (OBU) in respective vehicles, scanning the VAN to pick up a coverage of at least one infrastructure access point (IAP), which operates on a control channel in a radio access tree (RAT) comprising a plurality of cells, listening to a channel allocation information from the IAP that includes a request for a mobile cell gateway (MCG) at a nominal location in the RAT, and sending a candidacy message to the at least one IAP to become an MCG. Certain embodiments include establishing the VAN on a highway, and in urban areas, aggregating traffic in a cell and transmitting traffic to the IAP via the MCG, operating an IAP on an OBU, operating an IAP on a roadside unit (RSU) and other features.

Example Embodiments

Figure 1:
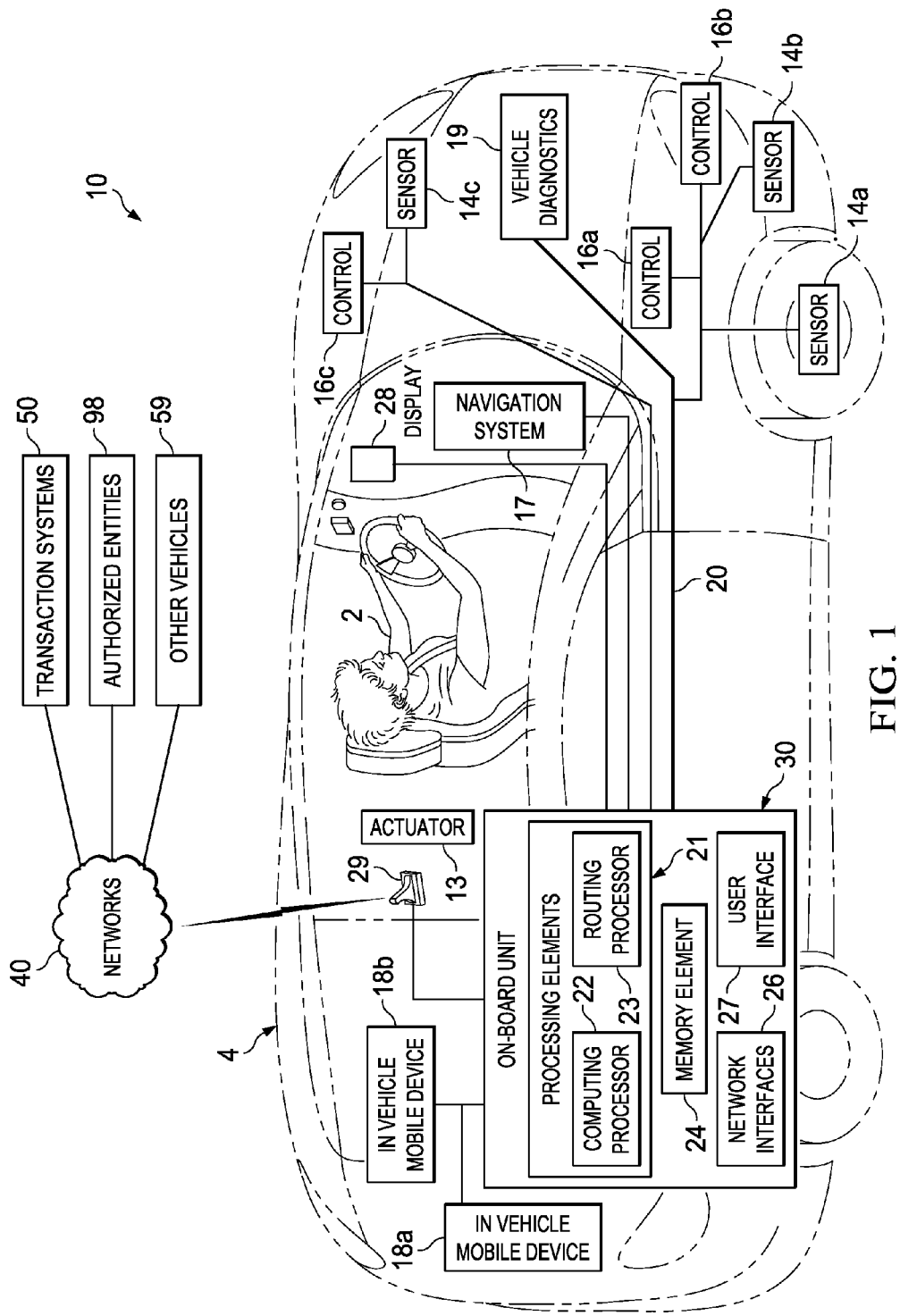
FIG. 1 is a simplified diagram of one embodiment of a communication system in accordance with the present disclosure.

Turning to FIG. 1, FIG. 1 is a simplified block diagram of a communication system 10 for enabling mobile wireless service from a vehicle in a vehicular network environment. The example architecture of FIG. 1 includes an end user (driver) 2 operating a vehicle 4 that includes an on-board unit (OBU) 30. In this particular example, OBU 30 includes processing elements 21, which include a computing processor 22 and a routing processor 23. OBU 30 also includes a memory element 24, network interfaces 26, a user interface 27, and a display 28. OBU 30 can be suitably coupled to a plurality of machine devices (e.g., sensors 14a-c, a plurality of controls (e.g., electronic control units (ECUs)) 16a-c, and a plurality of actuators, such as actuator 13). In one example embodiment, sensors 14a-b and controls 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time within vehicle 4. OBU 30 may also include capabilities associated with navigation system 17 (e.g., a global positioning system (GPS)).

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems that may be employed to convey information across the myriad of machine devices (e.g., sensors 14a-c, controls 16a-c, actuator 13) in vehicle 4.

FIG. 1 also includes networks 40, representing various types of connectivity to vehicle 4 (e.g., via antenna 29). Each established network of networks 40 has a logical coupling to remote nodes, or other external electronic devices, which may include transaction systems 50, authorized entities 98, and other vehicles 59. A node may be any electronic device (e.g., machine device or a mobile device), network element, client, server, peer, service, application, or other object capable of sending, receiving, or forwarding information over communications channels in a network. A remote node may be any node located externally to a particular vehicle, such as vehicle 4. Examples of remote nodes include user devices, optical devices, mobile devices, electronic devices in networked systems (e.g., server in a datacenter, user device in a local area network (LAN), etc.), OBUs of other vehicles, and road-side user devices.

Embodiments of communication system 10 may enable communication with remote nodes via wireless interfaces. For example, OBU 30 may connect to networks 40 and to remote nodes, for example, other vehicles 59, through wireless links such as High Speed Packet Access (HSPA), 3G, Global System for Mobile Communication (GSM), WiFi, WiMax, Ultra Wide Band (UWB), Bluetooth, Long Term Evolution-Advanced (LTE-A), and any other wireless technology developed in the future. In one embodiment, OBU 30 may be adapted to facilitate wireless communication as a "WiFi hotspot" between other vehicles 59 that may be equipped with similar OBUs.

Embodiments of communication system 10 may enable OBU 30 to leverage Dedicated Short Range Communication (DSRC) possibly for signaling purposes among mobile nodes that cooperatively self-configure as a network. For example, vehicles manufactured by a vehicle manufacturer and equipped with OBU 30 may self-organize as an ad hoc mobile network, with ability to communicate with each other. The vehicle manufacturer may take advantage of this system to offer services as a mobile wireless service provider (MWSP). A self-organizing mechanism in OBU 30 may permit it to dynamically configure a vehicular mesh network (VMN) connecting vehicle 4 with other vehicles 59. OBU 30 may permit a mobility scheme (e.g., Locator/Identifier Separation Protocol (LISP) or mobile Internet Protocol (IP)) that supports connectivity as vehicles move relative to each other. The MWSP can configure the VMN to allow mechanisms that permit connections across different scenarios, including urban and highway situations under widely different car densities. Such mechanisms may include admission and power control, interference management, node cooperation possibly using network coding techniques, and satellite support for remote areas.

Embodiments of communication system 10 may enable vehicle 4 to register a hotspot/femtocell to a network via a remote or virtual Subscriber Identity Module (SIM). For example, OBU 30 may register an identity number associating it with the remote or virtual SIM. One example embodiment of using virtual SIMs (VSIMs) is included in U.S. Provisional Application Ser. No. 61/433,138, filed Jan. 14, 2011, by Addepalli et al., which was previously incorporated by reference herein in its entirety. Networks 40 may encompass access points (AP) to Internet clouds. APs may include roadside infrastructure devices and wireless APs. In one embodiment, a MWSP may partner with an established service provider (SP), (e.g., AT&T, Verizon, etc.) to gain access to the SP's infrastructure. In another embodiment, the MWSP may also develop its own access infrastructure, possibly leveraging roadside infrastructure devices.

Embodiments of communication system 10 may also leverage a combination of femtocell and Mobile Ad-hoc Networks (MANET) concepts to penetrate into homes, malls and public places. A femtocell is a small cellular base station that generally permits service providers to extend wireless service coverage indoors, especially where access could otherwise be limited or unavailable. The femtocell can connect to the service provider's network via broadband technologies (e.g., General Packet Radio Service (GPRS), 3G, Incremental Packet Writing (IPW), etc.). A coverage area of the femtocell may be in the order of approximately 10-50 meters. In an example embodiment, parked vehicles, such as vehicle 4, may act as a femtocell, and extend their reach through an ad hoc VMN configured with communication devices, for example, smart phones carried by end users.

Embodiments of communication system 10 may rely on location information on all network nodes and a structured channel reuse scheme to provide a minimum Signal to Interference-plus-Noise Ratio (SINR) on all communications in communication system 10. Such a scheme can reduce a number of hops, leading to high throughput density (e.g., up to 85 Mbps/km) deploying one roadside infrastructure device or roadside unit (RSU) per kilometer. Communication system 10 may take advantage of wireless capabilities built into OBU 30 to support a rich portfolio of services efficiently. For example, embodiments of communication system 10 may be used to provide good quality video streaming and video conferencing to multiple occupants in vehicle 4.

Certain terminologies are used with regard to the various embodiments of the present disclosure. The term 'road-side' as used herein is intended to mean outside of a vehicle and may or may not be physically located by a road. In addition, 'user device' as used herein is intended to include mobile devices, personal computers, electronic devices, and any other device, component, element, or object operable by a user and capable of initiating voice, audio, video, media, or data exchanges within communication system 10. The terms 'road-side infrastructure device' as used herein includes a base station, access point, satellite, and any device capable of establishing a network connection for exchanging packets between a user device or OBU and other networks such as the Internet. As used herein, the term 'machine device' is meant to encompass sensors, actuators, vehicle controllers including ECUs, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. The term 'in-vehicle device' as used herein, encompasses machine devices and user devices located inside a vehicle. The term 'link' as used herein, encompasses a physical or logical communications channel that connects two or more communicating devices. The term 'channel' as used herein, encompasses a physical transmission medium, such as a wire, or a logical transmission medium, such as a radio channel. The term 'path' as used herein encompasses links and nodes connecting two end nodes in a network. An end node as used herein, encompasses nodes that originate data packets in a network flow, and nodes that are the final destination of the data packets in the network flow. Other terminologies are defined throughout the Specification.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles (e.g., automobiles, airplanes, trains, boats, etc.). For example, with appropriate external network access (e.g., to Internet Protocol (IP) infrastructure), data from machine devices in a vehicle could be used to provide dynamic, real-time vehicle diagnostics from associated sensors, actuators, and vehicle controllers to a manufacturer of the vehicle or to any other authorized entity. External networks may be accessed from a vehicle by certain electronic devices when a communication link is available. An 'external network' as used herein is intended to encompass a network that is external to a vehicle, where the network is a collection of nodes interconnected by communicative channels that facilitate electronic communications therebetween.

Mobile devices such as, for example, mobile phones, smart mobile phones/devices, e-book readers, tablets, laptops/netbooks, portable navigation systems, multimedia devices, other handheld devices, etc. may be used within a vehicle to wirelessly access an external network, for making a cellular phone call, accessing the Internet via a mobile network operator, and accessing the Internet via a WiFi connection to a road-side access point. A vehicle router in a vehicle may also be used to access a roadside infrastructure device within range of the vehicle. However, external network access from mobile devices and vehicle routers is dependent upon the particular wireless interfaces being within a wireless range of corresponding mobile or wireless network infrastructures. If the particular corresponding roadside infrastructure devices are not within a wireless range, or if the vehicle carrying the mobile devices and vehicle routers moves outside of the wireless range, then external network communication can be lost.

Some form of consistent and reliable wireless communication is needed to achieve external network connectivity from a vehicle. Wireless technologies are continually evolving to better enable electronic devices with appropriate wireless interfaces to access various networks and other electronic devices. For example third generation (3G), fourth generation (4G), and 3GPP long term evolution (LTE) wireless telephone technologies, worldwide interoperability for microwave access (WiMax), WiFi, and DSRC are some of the numerous wireless technologies currently available with the appropriate interfaces and network infrastructure to support the technology. Communications protocols and infrastructure for vehicular networking (e.g., IEEE 802.11p standard for physical and Multiple Access Channel (MAC) layers, and 1609.x family of standards describing higher layers of vehicular Dedicated Short-range Communications (DSRC)) are being rapidly developed. Moreover, CALM (Continuous Air Interface for Long and Medium Distance) allows an open architecture for intercommunication through multiple radio technologies, including 802.11, 802.11p, 802.15, 802.16e, 802.20 and cellular 2G/3G/4G. Inclusion of a vehicle-to-vehicle (V2V) and vehicle-to-infrastructure (V2I) capable communications platform in a vehicle, coupled with infrastructure access points (IAP), may provide a powerful infrastructure for wireless access.

Although numerous wireless technologies exist, the mobile nature of vehicles obfuscates continuous wireless connectivity from a vehicle to an external network. Vehicles travel at various speeds and their travel can span extensive geographical distances. Disturbances (e.g., topographical changes, physical structures, weather, geographical distance from a network access point or cellular tower, etc.) may cause interference and reception difficulties for a particular wireless technology being used. Consequently, an electronic device, such as a mobile device, in a moving vehicle often vacillates between having wireless connectivity and losing wireless connectivity. Even if another wireless communication link is available when wireless connectivity to an external network is lost due to the movement of a vehicle, the other available wireless link may be inaccessible to the particular electronic device without an appropriate wireless interface and network configuration to latch onto the available wireless link. Moreover, switching to a new wireless interface may involve repeatedly breaking a current session and reestablishing another session on the new wireless interface. Such disruptions can be frustrating for the end user, thereby diminishing the end user's reliance on and use of network connectivity while traveling in the vehicle.

Moreover, network access from a vehicle depends upon wireless access provided by service providers. Services such as Google® Voice may open up the mobile operator market to owners of telecom infrastructure other than service providers. Nevertheless, service provision by wireless operators can entail high investments, mainly for extensive infrastructure deployment spectrum licenses. Moreover, with advancements in smartphone technologies, ever-increasing data traffic may put significant stress on traditional wireless network infrastructure. The volume of mobile data traffic is expected to double every year until 2014. Therefore, wireless access provided by service providers may be subject to high costs, congestion, unreliability, and incompatibility.

At the same time, vehicle manufacturing is potentially at an inflexion point as a result of a confluence of converging forces. Mounting pressure to dramatically reduce polluting emissions may be leading to a redesign/replacement of centuries-old combustion engines by hybrids/electric/hydrogen solutions. Computer and networking technologies may be concurrently taking over roles formerly performed by mechanical and fluid controllers, and also creating transformative elements and services to a connected vehicle (CV). A plethora of technologies under an umbrella of Telematics, Infotainment, Collision Prevention, and Mobility may potentially enhance driving and traveling experience, reduce/eliminate collisions, improve efficiency, facilitate diagnosis, and support drivers and passengers during medical emergencies. However, vehicle manufacturers may be dependent on service providers for wireless connection to CVs. For example, vehicle manufacturers may have to enter into service agreements with SPs or buy service in bulk from SPs to provide networking capabilities to end consumers.

Demand for wireless services from user devices and machine devices are expected to increase over time. To meet such demand, mechanisms for providing wireless service that are capable of offloading traffic from a cellular network in high demand areas may be implemented. For example, in-home femtocells may be deployed in homes to provide a low cost cellular service to indoor users. A vehicular network may be viewed as a parallel, complementary effort to provide and/or enhance wireless service to users on roads, streets, and surrounding areas. Such a vehicular network may be designed using networking protocols that can handle a high degree of mobility in a self-organized way. Several approaches to handle high mobility are known in the art, but such methods may use centralized knowledge of information such as traffic demand and channel states. A system for enabling mobile wireless service from a vehicle in a vehicular network environment, outlined by FIG. 1, can resolve many of these issues.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the infrastructure of FIG. 1, end user 2 can be associated with a human agent (e.g., a driver or passenger). End user 2 may initiate communication in communication system 10 via some network, and such communication may be initiated through any suitable device, inclusive of an in-vehicle mobile device 18*a* or 18*b*, display 28, and a navigation system (not shown), which could be integrated with infotainment system 15. Mobile devices, such as in-vehicle mobile devices 18*a-b*, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18*a-b*, and mobile devices external to vehicle 4, may communicate with OBU 30 of communication system 10 through any suitable wireless or wired communication link and may be configured as a personal area network (PAN) or a wireless personal area network (WPAN) or any other appropriate networking architecture or system that facilitates communications in a network environment. Wired and wireless communication links may be inclusive of any electronic link such as wireless technologies (e.g., Bluetooth, Zigbee, IEEE 802.11x, WiFi Direct, 60 GHz, ultrawideband (UWB), etc.), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving and transmitting packets of information that propagate through communication system 10. Networks 40 offer communicative interfaces between any of the components of FIG. 1 and remote nodes and other electronic devices of transaction systems 50, authorized entities 98, and other vehicles 59. Networks 40 could be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11, 802.16, WiFi, Bluetooth, WiMax, DSRC, etc.), satellite, cellular technologies (e.g., 3G, 4G, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMax, 3G, 4G, white space, 802.11x, satellite, 60 GHz, Bluetooth, near field communication (NFC), LTE, GSM/WCDMA/HSPA, CDMA1x/EVDO, DSRC, GPS, etc.). Other interfaces represented by network interfaces 26, may include physical ports (e.g., Ethernet, USB, HDMI, etc.), interfaces for wired and wireless internal subsystems, and the like. Similarly, each of the nodes of communication system 10 can also include suitable interfaces for receiving, transmitting, and/or otherwise communicating data or information in a network environment.

OBU 30 and other associated or integrated components can include one or more memory elements (e.g., memory element 24) for storing information to be used in achieving operations associated with the wireless interface selection, seamless mobility, and enabling vehicular access network control activities, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory or storage options discussed herein should be construed as being encompassed within the broad term 'memory element' as used herein in this Specification.

In example embodiments, the operations as outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 and associated or integrated components may include processing elements 21 (e.g., computing processor 22, routing processor 23, etc.) that can execute software or algorithms to perform activities to enable internal networking, data optimization and dynamic frequency selection, and to route packets using suitable routing protocols. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Regarding a physical implementation of OBU 30 and its associated components, any suitable permutation may be applied based on particular needs and requirements, including the design of the particular vehicle in which OBU 30 is implemented. OBU 30 could be a computing device, a simple processor, a microprocessor, a digital signal processor (DSP), a router, a proprietary device, an internal server, a switch, a gateway, or any other suitable element configured to exchange and/or manage data in a vehicular environment. In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, ECUs, embedded devices, actuators, displays, etc.) through one or more suitable communication interfaces, for example, for an Internet Protocol (IP) network, Ethernet network, a user datagram protocol (UDP) network, or any other suitable protocol or communication architecture enabling network communication with machine devices in vehicle 4. Typically, numerous vehicle controllers, with different embedded software, may be found in a single automobile and may communicate with other machine devices. For example, vehicle controllers 16a-b may be inclusive of any embedded system or ECU that controls one or more of the electrical subsystems in vehicle 4. Sensors 14a-b may represent wheel and headlight sensors respectively. Actuator 13 may represent a vehicle-setting device such as a seat-positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communication via internal network subsystem 20. Vehicle controller 16c, representing one or more ECUs, may be suitably integrated for controlling the network and sensors and other associated components.

In the particular example shown in FIG. 1, vehicle 4 includes capabilities associated with infotainment system 15 and vehicle diagnostics 19. A navigation system (not shown) may be provided in various embodiments including, for example, a portable navigation system or a fixed navigation system as part of infotainment system 15, each of which may be configured for Ethernet communication and/or other types of wired or wireless communication. Wireless links may be via Bluetooth, Zigbee, IEEE 802.11 WiFi, WiFi Direct, 60 GHz or IEEE 802.15.4 radio, or other wireless interfaces. Wired links may include Ethernet lines, power lines or traditional LIN and CAN buses. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, infotainment system components (e.g., speakers, radio, DVD, CD, etc.), vehicle cameras, and the like.

Turning to FIG. 2, FIG. 2 illustrates an exemplary network environment associated with a vehicular access network (VAN) 100, according to embodiments of the present disclosure. Vehicles 104a-e may communicate with each other and with network clouds 140a-c through various wireless communication links 112a-h, for example, DSRC, WiFi, HSPA, and LTE-A. In an example embodiment, vehicles 104a-e may form a vehicular mesh network (VMN). Vehicles 104a, 104d and 104e may communicate with in-vehicle devices 120a-e via wired or wireless links through respective OBUs 130a, 130d and 130e. Vehicles 104a, 104d and 104e may perform a function of a vehicular mobile router (VMR) when they aggregate end-node traffic from end nodes, for example, in-vehicle devices 120a-e. Vehicles 104b and 104c may also access network clouds 140a, 140b, and 140c via wireless access network provided by service provider 1 (SP1), WiFi hotspots, and service provider 2 (SP2), respectively. In an example embodiment, OBU 130d may perform functions associated with a femtocell.

OBUs 130a-e may have interfaces in hub mode, peer mode, and roadside infrastructure mode for communication with each other and with remote nodes in network clouds 140a-c. Although it will be apparent that numerous network connectivity and mobility scenarios are possible, including more complex and sophisticated arrangements, FIG. 2 provides an example network environment as a frame of reference from which the various features of communication system 10 can be further described and understood.

Network interface association and access interface association, as used herein, include discovery, authentication if necessary, and IP address assignment if any. Access interface association is a process in which an in-vehicle device or a road-side user device, within a wireless coverage area of multiple hub-mode interfaces, selects and associates with one or more of the interfaces. The hub mode interfaces may belong to a single OBU or to different OBUs. Furthermore, they may have the same wireless technology or different technologies, and they may belong to a single management domain or to different management domains.

Access interface association is illustrated in FIG. 2. For ease of description purposes, only some access interface association scenarios are described herein. Other combinations and associations, not shown or described herein, are possible according to embodiments of the present disclosure. In-vehicle device 120a of vehicle 104a has a hub mode interface associated exclusively with a hub mode interface 132a of OBU 130a. In-vehicle device 120b of vehicle 104a has two interfaces. A first interface of in-vehicle device 120b is associated exclusively with a hub mode interface 132b of OBU 130a and a second interface of in-vehicle device 120b is associated exclusively with an interface 134a (having multiple interface modes) of OBU 130d. Each of hub mode interfaces of in-vehicle devices 120a-e may be associated exclusively with a hub mode interface of one of OBUs 130a, 130c, and 130e, and with multiple hub mode interfaces of the same or different OBUs.

FIG. 2 also illustrates some network interface association scenarios. While an OBU interface is in roadside infrastructure mode or in peer mode, the OBU interface may be under the coverage area, respectively, of any number of roadside infrastructure devices or any number of other OBUs and/or other devices in peer mode. Network interface association is the process of selecting and associating with one or more of these interfaces. When an OBU interface is under a coverage area, the interface is considered available for network connectivity. The roadside infrastructure devices and the other OBUs and devices may be the same or different wireless technologies and management domains.

In FIG. 2, both OBU 130d and 130e have an interface in peer mode where a peer mode interface 134b of OBU 130d is associated exclusively with interface 136 of OBU 130e. Interface 138a of OBU 130b is associated with network cloud 140b in roadside infrastructure mode. Interface 138b of OBU 130b is associated with network cloud 140a in hub mode. The interfaces shown on OBUs 130a-e, and in-vehicle devices 120a-e are shown for example purposes, and these OBUs and devices may each be alternatively configured with more or less interfaces based on particular component configurations and/or needs. Moreover, any number of more or less (including none) road-side infrastructure devices associated with network clouds 140a-c may have a wireless coverage area inclusive of a particular OBU interface at any given time and location.

Access and network interface associations can be further divided into two subcategories: 1) Single association (1:1)—one wireless interface associated exclusively with one wireless interface, and 2) Multiple associations (1:n)—one wireless interface associated with multiple (n) wireless interfaces. Different interface association possibilities are described in the table below for an arbitrary interface $l_0$. In one embodiment, for multiple associations (i.e., 1:n) transmissions from $l_0$ to $l_1, \ldots, l_n$ can be unicast, multicast, or broadcast. In addition, a list of corresponding wireless interfaces with which $l_0$ can associate may change over time, thereby potentially necessitating association list updates.

| Access Interface Selection | Network Interface Selection | | |
|---|---|---|---|
| | Hub mode | Road-side infrastructure mode | Peer mode |
| 1:1 | A wireless interface ($I_0$) on an in-vehicle or roadside user device is associated with one wireless interface ($I_1$ in hub mode) on an on-board unit. While $I_0$ is only associated with $I_1$, $I_1$ can have other wireless devices associated with it. | A wireless interface ($I_0$ in roadside infrastructure mode) on an on-board unit is associated with one wireless interface on a roadside infrastructure ($I_1$). While $I_0$ is only associated with $I_1$, $I_1$ can have other wireless devices associated with it. | A wireless interface ($I_0$ in peer mode) on an on-board unit is associated with one wireless interface on another on-board unit or device ($I_1$). $I_1$ is associated only to $I_0$. This is direct peer-to-peer connection between two interfaces. |
| 1:n | A wireless interface ($I_0$) on an in-vehicle or roadside user device is associated with n wireless interfaces ($I_1, \ldots, I_n$ in hub modes) on an on-board unit or on multiple on-board units. Interfaces $I_1, \ldots, I_n$ can have other wireless devices associated with them. | A wireless interface ($I_0$ in road-side infrastructure mode) on an on-board unit is associated with n wireless interfaces ($I_1, \ldots, I_n$) on a roadside infrastructure or on multiple roadside infrastructures. Interfaces $I_1, \ldots, I_n$ can have other wireless devices associated with them. | A wireless interface ($I_0$ in peer mode) on an on-board unit is associated with n wireless interfaces ($I_1, \ldots, I_n$) on another on-board unit/device or on multiple other on-board units/devices. Interfaces $I_1, \ldots, I_n$ can have other wireless devices associated with them. This allows the formation of a multiply connected peer network. |

According to the embodiment shown in FIG. 2, OBU 130d may perform a role of a hotspot/femtocell. For example, vehicle 104d may be a parked car. Users of the femtocell may be passengers in vehicle 104d, or others passing by outside vehicle 104d, including OBUs in other cars. Vehicles 104a, 104b and 104d may communicate among each other (through their respective OBUs 130a, 130b and 130d) through a VMN. VMN may leverage existing mechanisms and protocols (e.g., ad-hoc network) for communication. Traffic propagation amongst vehicles 104a, 104b and 104d (through their respective OBUs 130a, 130b and 130d) may be based on measurements of network parameters (e.g., delay, data transfer rate, etc.).

According to the embodiment illustrated in FIG. 2, OBU 130b may be an infrastructure access point (IAP) that accesses a cellular network 140a via a cellular uplink and a roadside WiFi/hotspot network 140b via a roadside uplink. OBU 130b may access road-side WiFi/hotspot network 140b on a priority basis relative to cellular network 140a based on availability. In one example embodiment, if both roadside access and cellular access are available, OBU 130b may preferentially use the roadside access. Additionally, OBUs in VAN 100 may dynamically allocate a gateway function to the node (e.g., OBU) with the best uplink channel. By leveraging vehicular access network 100, fewer cars may be directly connected to access points (APs), and more cars can be connected to APs from a greater distance. In general, RSUs can act as access points, but they may be expensive to deploy and manage. With VMN 100, according to embodiments of the present disclosure, fewer RSUs may be deployed to achieve substantial connectivity.

Figure 3A:
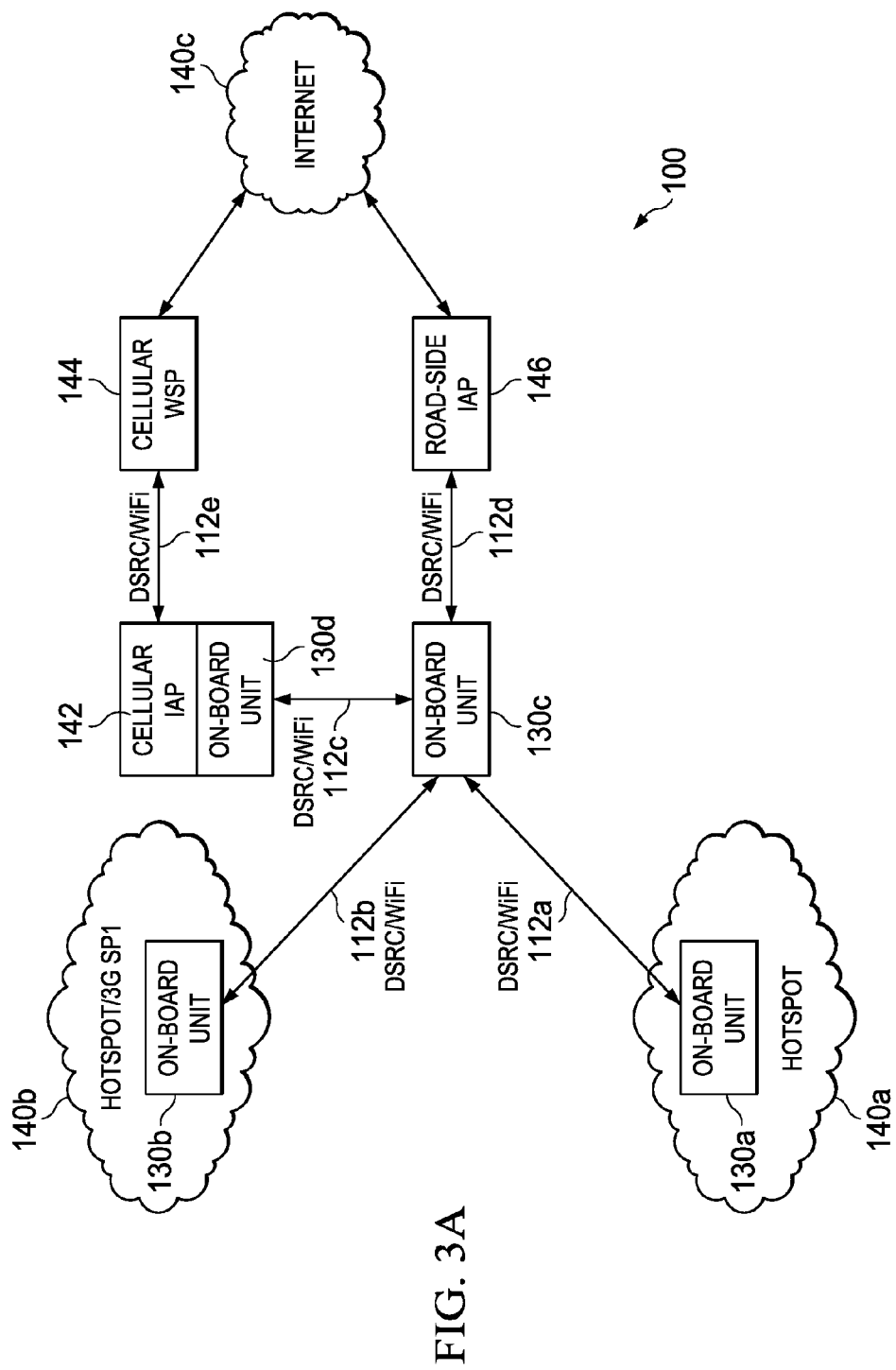
FIG. 3A is a simplified block diagram of an embodiment of a vehicular access network in accordance with the present disclosure.

Turning to FIGS. 3A and 3B, FIG. 3A is a simplified block diagram of VAN 100 illustrating embodiments of the present disclosure. Resource allocation schemes according to embodiments of the present disclosure may include: 1) Hotspot/femtocell, encompassing admission control based on Quality of Service (QoS) and uplink capacity, power control and handovers; 2) vehicular mesh network, encompassing channel selection, mobility and power control; and 3) infrastructure connectivity, encompassing road-side access and cellular access. Cellular and roadside access may constitute independent access trees. They may coexist or alternate according to various factors, including progressive deployment of roadside infrastructure, traffic classes, capacity utilization, and issues in frequency allocation for coexistence.

In example embodiments, OBUs 130a and 130b may be gateways of hotspot area networks 140a-b around the respective vehicles (not shown). OBUs 130a-d may communicate with each other via wireless communication links 112a-c (e.g., DSRC, WiFi) in an access network scheme. OBUs 130a-d may also communicate with Internet 140c via cellular access and roadside access. In cellular access, a cellular Infrastructure Access Point (IAP) 142 may be coupled to an OBU, for example, OBU 130d, and may be located inside the respective vehicle. Cellular IAP 142 may access a cellular wireless network 144 via a wireless link 112e, for example, HSPA or LTE-A. On the other hand, in a roadside access, roadside IAP 146, for example, a RSU, may communicate with an OBU, for example, OBU 130c, via a wireless link 112d, for example, DSRC. In an example embodiment, RSU may operate on short-range wireless channels, for example, Femto, Pico, and IEEE 802.11a, b, g, n, ac, and ad. In an example embodiment, radio resources and power control may be optimized by cellular IAP 142 and roadside IAP 146 to maximize a capacity of communication system 10.

According to embodiments of the present disclosure, vehicular access network 100 can minimize delay and maximize bandwidth for substantially all network connections. VAN 100 may be configured to handle mobility and multichannel operation. Vehicular access network 100 may be highly structured, and may provide predictable mobility and traffic pattern. In an example embodiment, vehicular access network 100 may be designed to encompass a tree topology.

Embodiments of the present disclosure may enable non-service providers (e.g. car manufacturers, car manufacturer consortium, dealers, third parties, end users, etc.) to provide wireless access services by creating a wireless access network based on OBUs, RSUs, and base stations. Traditionally, voice services have been provided by wireless service providers (e.g., AT&T, Verizon, and Sprint). With embodiments of VAN 100 according to the present disclosure, anyone, including non-traditional service providers, could potentially provide voice services to those who want to connect through OBUs in VAN 100. In addition to voice services other media rich services (e.g., video streaming, Facebook uploading, etc.) may be wirelessly accessed through embodiments of VAN 100.

FIG. 3B is a simplified block diagram of VAN 100 illustrating potential details of OBU 130 in accordance with embodiments of the present disclosure. OBU 130 in vehicle 104 is connected to multiple in-vehicle devices 120a and 120b. OBU 130 is connected to a controller 110 in a network cloud, such as Internet 140. The connection to controller 110 may be over a cellular access network via a cellular network 144 (illustrated in FIG. 3B as a base station) or over a roadside access network via roadside IAP 146. OBU 130 may also be connected to other OBUs (not shown) via ad-hoc networks, for example, over DSRC wireless links. OBU 130 may comprise one or more virtual subscriber identity modules (VSIMs) 150, a globally unique phone number 152, an association module 154, a configuration module 156, and an updating module 158. Agents (e.g., humans, mobile devices, machine devices) may be configured for authentication and access to a particular vehicle (e.g., vehicle 104). By provisioning one or more unique VSIMs 150 in OBU 130 that are each associated with an authenticated agent, an agent can leverage the wireless connectivity options of OBU 130 to access, for example, other OBUs and the Internet. In an example embodiment, in-vehicle device 120a may be associated with a unique VSIM, which is different from the unique VSIM associated with in-vehicle device 120b. Users may also be associated with unique VSIMs. For example, a driver/owner of vehicle 104a may be associated with multiple unique VSIMs, which may be different from VSIMs associated with passengers.

A user may obtain globally unique phone number 152 for OBU 130 from a wireless access provider or other sources. In one example implementation, OBU 130 may be associated with globally unique phone number 152 by a vehicle manufacturer or dealer. Association module 154 can associate multiple devices (e.g. cell phone, OBU, VSIM, etc.) to globally unique phone number 152. Configuration module 156 can configure settings of various devices and users to OBU 130. For example, configuration module 156 may determine (e.g., based on active VSIMs) that in-vehicle device 120a is a cell phone and set configurations for routing calls through OBU 130 to in-vehicle device 120a. In another example embodiment, configuration module 156 may determine that a user associated with a VSIM provisioned on OBU 130 has logged into OBU 130. Configuration module 156 may configure settings to route calls through vehicle 104's speakers and microphone (for example, based on the user's preferences as determined through an identity profile of the user that is associated with the user's unique VSIM). OBU 130 may also update controller 110 with information on currently available devices (e.g., which VSIM is active, what devices are connected to OBU 130, etc.). Controller 110 and OBU 130 may handle mobility events (e.g., switching VSIM from OBU to cell phone and vice versa) to provide seamless network connectivity.

Embodiments of OBU 30 may have multiple wireless interfaces (e.g., WiFi interface, 3G/4G interface, etc.) offering various types of infrastructure access to OBU 130 and authenticated agents of OBU 130. In one example scenario, when there are enough cars on the road with OBUs such as OBU 130, infrastructure access by OBU 130 (and other OBUs on the road) could be achieved through multi-hop to roadside IAPs such as roadside IAP 146, over WiFi networks, for example. In another example scenario, a non-traditional wireless service provider (e.g., car manufacturer) could offer in-vehicle connectivity (for example, using a negotiated bulk rate with traditional wireless service providers such as AT&T, Verizon, Sprint, etc.).

In an illustrative example, assume that user A has a WiFi phone (e.g., a phone that cannot connect over 3G networks), and connects to OBU 130 over a WiFi interface. User B has a smart phone (e.g., phone with capability to connect to 3G and WiFi networks) and connects to OBU 130 over a WiFi interface. User C is an authenticated user with a unique VSIM provisioned on OBU 130 and logs into OBU 130. Users A, B and C can call anyone (e.g., on landline phones, mobile phones, etc.) and/or receive calls from anyone through OBU 130 using globally unique phone number 152, and access global networks (e.g., Internet 140) over VAN 100. VSIMs associated with the respective devices and users may be provisioned in OBU 130. OBU 130 can associate the VSIMs of the respective devices and users with globally unique phone number 152, and facilitate calls over cellular or road-side access networks irrespective of any limited connectivity or wireless interfaces of the devices (e.g., limited connectivity of user A's WiFi phone over 3G networks). In an example embodiment, network connections may be possible though multi-hopping (for example, from OBUs to roadside IAPs). In another example embodiment, users A, B and C can also call others through local ad hoc networks via OBUs.

Figure 4:
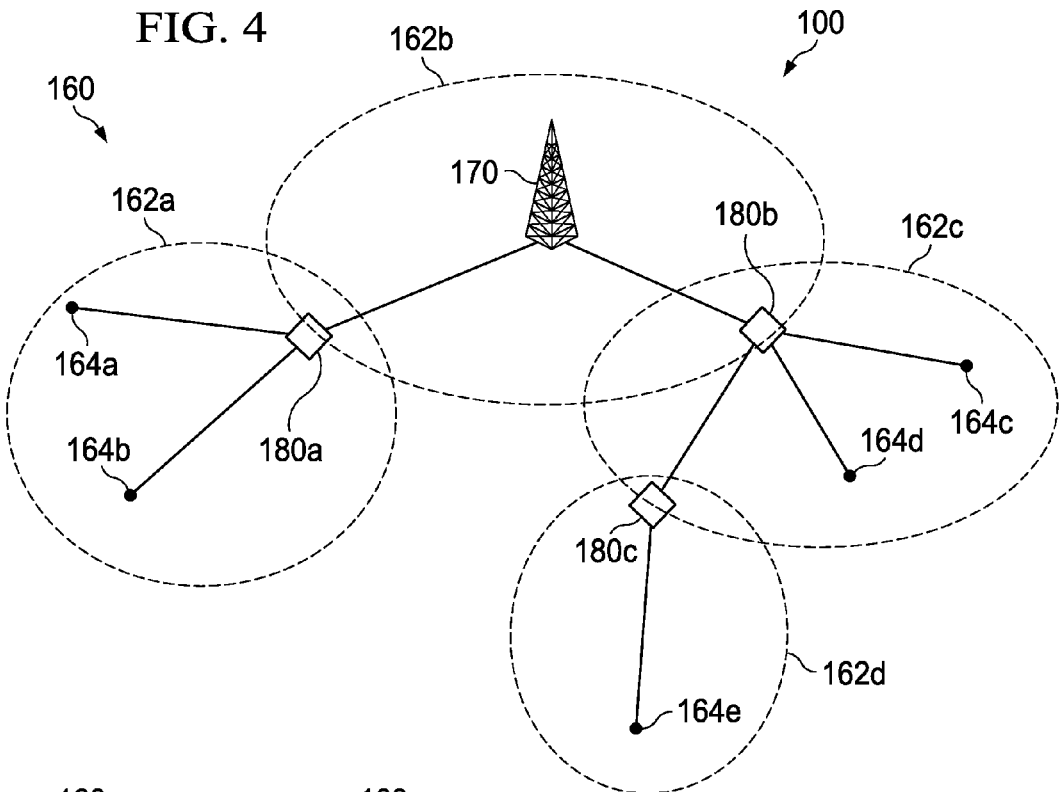
FIG. 4 is a simplified diagram of a radio access tree (RAT) according to embodiments of the present disclosure.

FIG. 4 illustrates a topology of a Radio Access Tree (RAT) 160, mapped into several channels with corresponding cells 162a-d, according to embodiments of the present disclosure. For example, the channels may be MAC channels. A MAC channel can provide a data communication protocol sub-layer, with address and channel access control mechanisms that make it possible to communicate with a multi-port network. Multiple mobile devices may communicate in a shared physical media on a MAC channel without experiencing data packet collisions. Topologically, depth of RAT 160 may be determined by a number of cells, which, in turn, can determine a number of hops. The number of hops can be, in general, smaller than in other car-to-car communications systems. RAT 160 may be set up and maintained by an IAP, for example, IAP 170, through a dedicated control channel.

For purposes of describing an example operation, assume that a total available bandwidth $W_T$ in RAT 160 can be arbitrarily divided into N channels, through a combination of frequency and time division multiplexing (FDM and TDM). Short-range wireless standards may allow FDM through definition of several channels (e.g., three non-overlapping channels for IEEE 802.11g/n in the 2.4 GHz band, and 4 data channels for IEEE 802.11p in the 5.9 GHz band). TDM may also be possible if all OBUs have access to a global clock such as that provided by a Global Positioning System (GPS), or through a specific clock signal in the IAP's control channel. The N channels can be allocated to the cells in RAT 160, so that each Mobile Cell Gateway (MCG) 180a-d can handle traffic in its own cell as well as relay traffic from other cells. In an example embodiment, MCG 180a-d may be OBUs in mobile vehicles. This may result in a non-uniform channel allocation scheme, whereby more channels are given to cells close to IAP 170.

FIG. 4 shows an example mapping of tree topology in RAT 160 into several cells 162a-d on distinct channels in VAN 100, according to embodiments of the present disclosure. As used herein, 'cell' refers to a geographic area covered by a channel. Nodes in a VAN (e.g., mobile devices, user devices, in-vehicle devices, OBUs, VMRs etc.) can share a cell. For example, in FIG. 4, nodes 164a and 164b share cell 162a. MCG 180a may aggregate cell traffic from nodes 164a and 164b and transmit the traffic to IAP 170. In an example embodiment, MCGs may be OBUs responsible for routing cell traffic toward IAP 170. There may be cooperation among OBUs in different vehicles, where some OBUs may temporarily take a role of an MCG. Dynamically, an OBU may be selected to perform the functions of an MCG, for example, MCG 180b, based on its position, which may be under coverage areas of two adjacent cells. For example, MCG 180b may be under coverage areas of cell 162b and 162c. Traffic can be relayed through various MCGs until IAP 170 is reached. For example, MCG 180c may route traffic aggregated in cell 162d toward MCG 180b using a channel allocated to cell 162c. In a roadside access, IAP 170 may be a RSU. In an example embodiment, RSU may operate on short-range wireless channels. In a cellular access, IAP 170 may be an OBU or a base station. In an example embodiment, the OBU and/or base station may operate on long and short-range wireless channels.

A control plane may be used to set up and maintain RAT 160. The control plane may operate with a control channel for communication between IAP 170 and MCGs 180a-c. The control channel may be either a dedicated channel or may consist of in-band signaling in one or more data channels. OBUs in communication system 10 may scan VAN 100 to pick up coverage of IAP 170. In an example embodiment, location information of MCGs may be available at the other OBUs by means of a GPS device. In another example embodiment, OBUs in RAT 160 may determine their respective cells by listening to channel allocation information from all IAPs and MCGs in RAT 160.

IAP 170 may send a request for an MCG at a nominal location in RAT 160. The nominal location of MCGs 180a-c may be determined based on a nominal cell size, an initial value that may be adjusted later depending on various factors, including road traffic conditions. OBUs within range of IAP 170, for example, OBUs represented by MCGs 180a and 180b, may check the nominal location, and may send a MCG candidacy message to IAP 170 if they are in a range (e.g., vicinity) of the nominal location. IAP 170, in turn, may reply with a MCG confirmation message to the OBUs closest to the nominal location, e.g., OBUs represented by MCG 180a and 180b. The new MCGs can relay the control channel information to other OBUs so that new MCGs can be elected, until the maximum number of cells in RAT 160, or coverage from a different RAT, is reached. Once RAT 160 is set up, IAP 170 may transmit channel allocation through the control channels. Connectivity through RAT 160 may thus become operative. In an example embodiment, if connectivity is lost, the setup process may be started all over.

Vehicular networks using short-range communication may be characterized by high mobility. Mobility can represent a challenge both to selection of the network control plane (e.g., mobility can cause frequent changes in the configuration of the MCGs) and to the connectivity plane (e.g., mobility can force frequent handoffs). Mobility in VAN 100 may be characterized through the following series of events: 1) VMR handoff; 2) MCG change; and 3) IAP change. VMRs, for example, represented by node 164a, may switch from a current MCG (e.g., MCG 180a) to a new MCG. In an example embodiment, VMR handoff may be triggered when a vehicle associated with a VMR represented by node 164a exits its current cell and enters a new cell. In another example embodiment, an MCG in the OBU's current cell may change, triggering a VMR handoff.

An MCG, for example, MCG 180a, may drop its functions in favor of a new OBU that becomes the new MCG. In an example embodiment, such MCG change may occur when a current MCG, for example, MCG 180a, loses connectivity in one of its two adjacent cells, e.g., cell 162a and 162b, and is not able to relay traffic. An MCG change may trigger a VMR handoff in all vehicles in the cell.

IAP change may occur when an OBU, for example, OBU represented by node 164a, leaves RAT 160 and enters a different RAT rooted in a new IAP. This event may or may not have implications at a network level, depending on a configuration of the network. An IAP cellular handoff may occur when an IAP connection experiences a handoff. It may have no implications at the radio (e.g., RAT) level but it may have some implications at a network level. IAP changes may affect the control plane and cause a large number of simultaneous VMR handoffs.

According to embodiments of the present disclosure, MCGs may be located at a cell edge between two cells, wherein the cell edge is closest to an IAP, for example, IAP 170. Being in the cell edge, MCGs may communicate through non-overlapping channels allocated to the adjacent cells. Thus, MCG can collect and relay cell traffic to another MCG in the next ell en route to IAP 170. Finally, in the central cell, IAP 170 can collect all traffic. For the downlink, the same topology and channel allocation scheme may apply (e.g., for a TDD scheme such as 802.11 or DSRC). For example, MCG 180a may receive cell traffic on channel i and transmit on channel i+1 to MCG 180b. An OBU in a vehicle may take a role of an MCG when it is located near the cell edge, and when it moves away from cell edge, it may drop the role in favor of another OBU in another vehicle. Such handover can happen more frequently in the case of roadside access network, as a frequency allocation remains geographically fixed with respect to the IAP (which may be a static RSU). On the other hand, due to a platoon-like mobility of cars on a highway, MCGs may be more stable (e.g., with less handovers) for cellular access. Multiple MCGs may also be possible in a single cell to balance traffic load in a cell.

Figure 5:
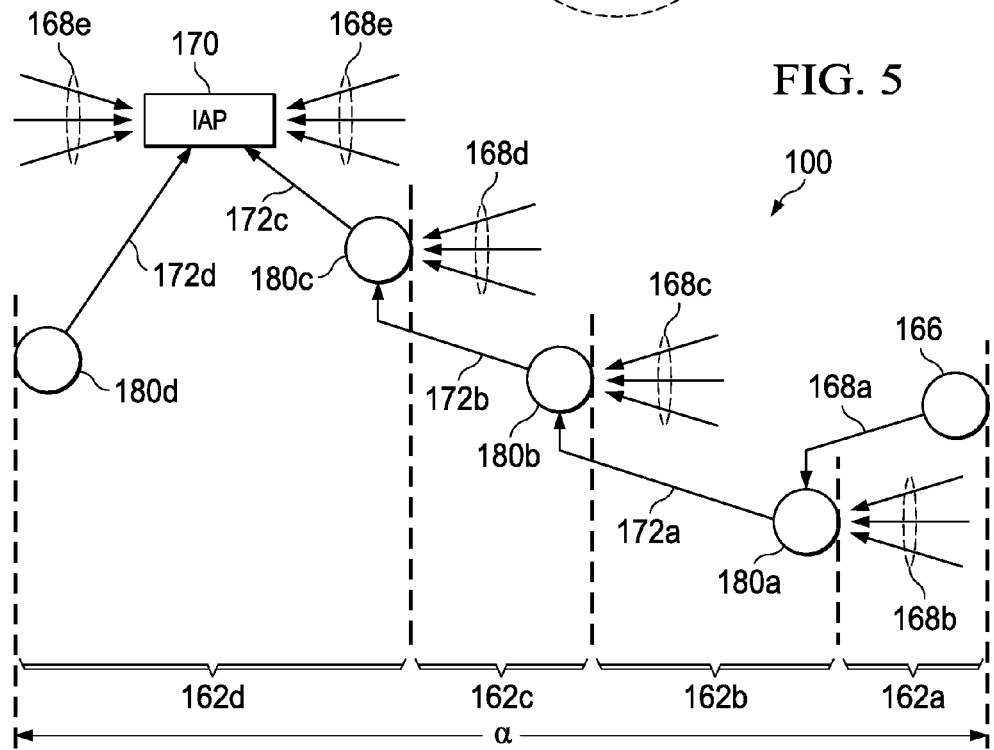
FIG. 5 is a simplified block diagram showing an example operation of a vehicular access network according to an embodiment of the present disclosure.

Turning to FIG. 5, FIG. 5 illustrates a potential principle of operation of VAN 100 according to embodiments of the present disclosure. According to the example embodiment illustrated in FIG. 5, an access tree size (denoted by Q) may comprise four cells 162a-d. VMR 166 may aggregate traffic 168a from one or more communication devices, for example, user devices, mobile devices, in-vehicle devices, etc. and transmit traffic 168a to MCG 180a in cell 162a. MCG 180a may aggregate similar traffic 168b from other VMRs in cell 180a, and relay the aggregated traffic 172a to MCG 180b in cell 162b.

MCG 180b may aggregate cell traffic 168c (e.g., traffic from VMRs) in cell 162b, and relay traffic, including traffic 172a from MCG 180a, and relay the aggregated traffic 172b to MCG 180c in cell 162c. MCG 180c may aggregate cell traffic 168d and relay traffic, including traffic 172b from MCG 180b, and relay the aggregated traffic 172c to IAP 170 via a control channel in cell 162d. IAP 170 may aggregate cell traffic 168e in cell 162d and relay traffic 172c and 172d from MCGs 180c and 180d, respectively. Data traffic density may increase with each cell proximate IAP 170, with cell 162d comprising IAP 170 possibly seeing the maximum traffic density in the illustrated embodiment. IAP 170 can route traffic of the entire Q-cluster cells. A number of hops in connectivity in the exemplary embodiment may be at most (Q−1)/2.

Figure 6A:
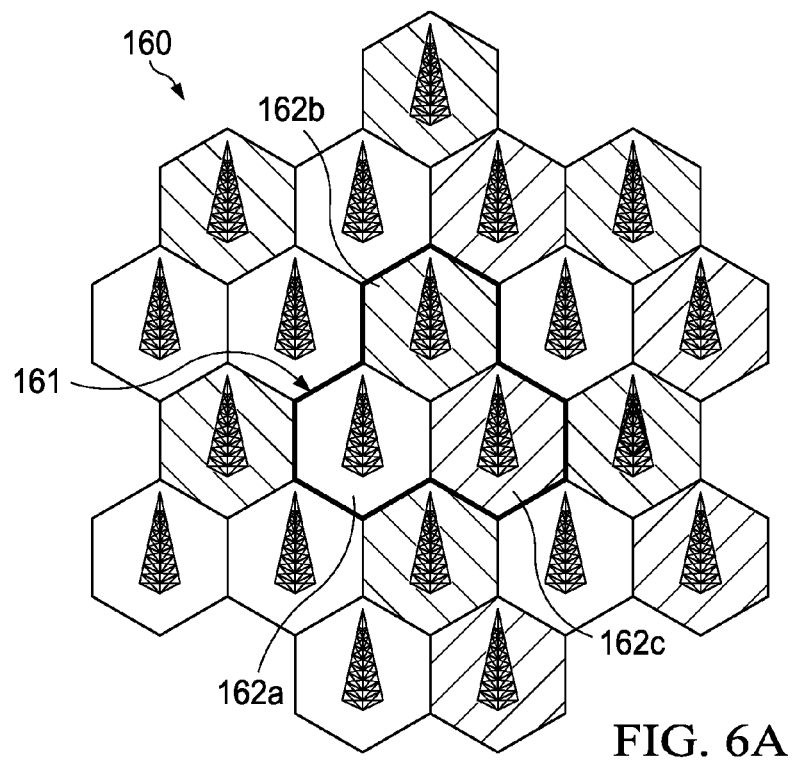
FIGS. 6A and 6B are simplified block diagrams showing potential principles of operation associated with a RAT in accordance with embodiments of the present disclosure.
Figure 6B:
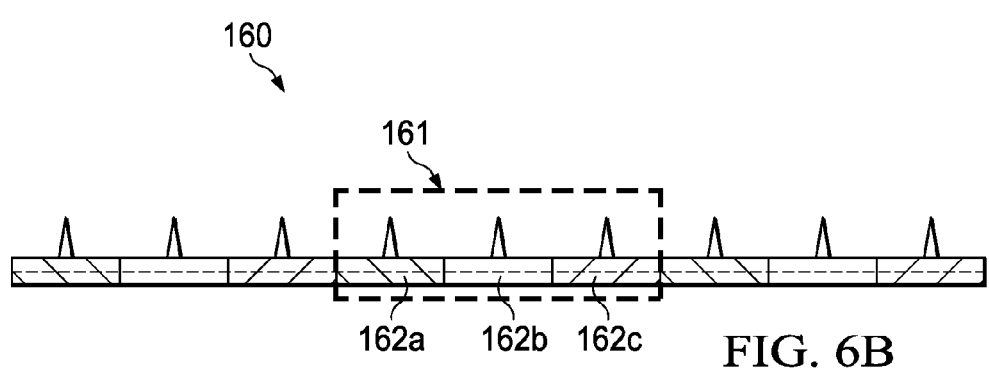

Turning to FIGS. 6A and 6B, FIGS. 6A and 6B illustrate a potential principle of operation of VAN 100 according to embodiments of the present disclosure. A cellular system (e.g., comprising MAC channel cells) may reuse a limited set of frequency channels, for example, when two transmitters (e.g., IAPs) are spatially separated. Frequency reuse may maximize a capacity of RAT 160, for example, by reducing SINR. The number of channels N in RAT 160 can be a function of the number of cells of RAT 160 (i.e., Q) and a frequency reuse factor (F).

The frequency reuse factor F may be defined as the number of orthogonal channels appropriate for a channel reuse pattern. If the number of orthogonal channels in the frequency domain is smaller than F, time and frequency multiplexing may be implemented to arrive at an optimum reuse factor. For example, in FIGS. 11(a) and (b), F=3. The reuse factor (F) is determined by a minimum distance an interferer (e.g., a node whose communication interferes with communication from a user node) should keep with respect to a user to meet a target SINR level. F can depend on a target SINR and propagation conditions expressed through a path loss exponent α.

A frequency reuse cluster 161 according to embodiments of the present disclosure can encompass a group of cells, e.g., 162a, 162b and 162c, using substantially all available channels. The frequency reuse cluster 161 may repeat uniformly, creating a pattern. In an example embodiment, a regular reuse pattern may be imposed to obtain a target SINR for the air interface. FIG. 6(a) illustrates a scenario where the cell is two-dimensional (e.g., in an urban area) and total cluster size (Q) is 21. Cells 162a-c form a frequency reuse cluster, with F=3. Cell pattern 161 of cells 162a-c is repeated to form RAT 160. FIG. 6(b) illustrates a scenario where the cell is one-dimensional (e.g., on a highway) and total cluster size (Q) is 9.

In an example embodiment, each IAP 170 in RAT 160 may attempt to reuse all available frequencies, according to a predetermined reuse factor F for various reasons, for example, in order that a minimum reuse factor is satisfied. A minimum reuse factor may consequently be achieved between adjacent RATs. Otherwise, the reuse factor between adjacent RATs may be too low, lowering an SINR below its target value. In one embodiment, adjacent RATs may coordinate through a service operator, which may coordinate the corresponding IAPs. In another embodiment, IAP 170 may reduce the cell size so that a full frequency reuse can take place within boundaries of RAT 160.

Figure 7:
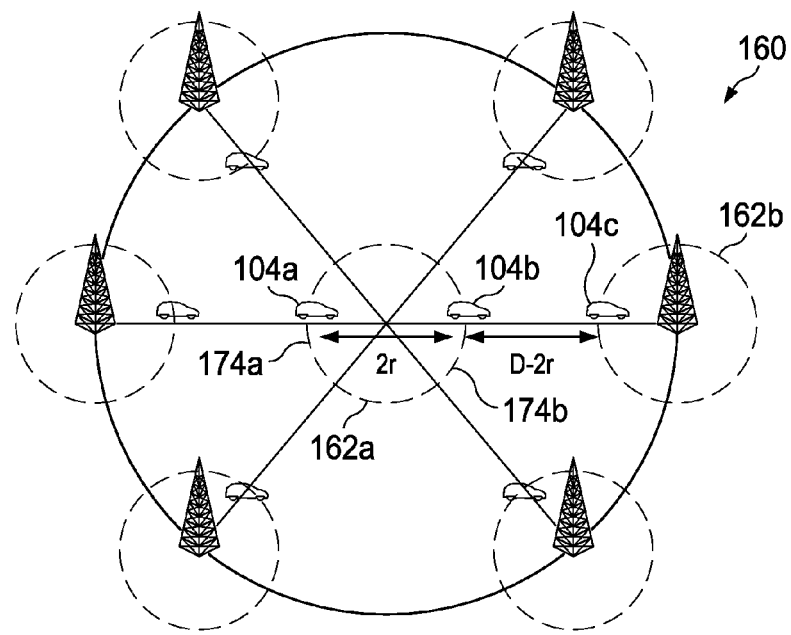
FIG. 7 is a simplified block diagram showing a potential principle of operation associated with a RAT in accordance with embodiments of the present disclosure.

Turning to FIG. 7, FIG. 7 illustrates a simplified diagram to illustrate SINR calculations for VAN 100 according to embodiments of the present disclosure. To determine a minimum SINR, a worst-case scenario may be considered. A device in vehicle 104a at an edge 174a of a cell 162a may initiate communication with an OBU in a vehicle 104b (e.g., the OBU may function as an MCG). Vehicle 104b may be situated at a diametrically opposite edge 174b of cell 162a, at a distance 2r from vehicle 104a. A co-channel interferer, which may be another OBU in vehicle 104c, may be situated at another cell 162b at a distance (D−2r), where D is a distance between cell centers. Target SINR ($\gamma_i$) for node i (e.g., OBU in vehicle 104a) in such traffic pattern may be lower bounded as shown by the following mathematical relation:

$$\gamma_i(r, D) = \frac{P(2r)^{-\alpha}}{N + \sum_{j=1}^{N_I} Pd_i^{-\alpha}} \geq \frac{P(2r)^{-\alpha}}{N + 2P(D-2r)^{-\alpha}}$$

where P is a transmitted power level, N is a background noise power, $N_i$ is the number of interferers and α is a propagation exponent. In VAN 100, $N_i$ may be 2, given that there are two adjacent cells and users can share a channel by TDM. Interference from subsequent tiers of interfering cells may be neglected. Under such approximations, target SINR ($\gamma_i$) for node i can be expressed by the following mathematical relation:

$$\gamma_i(r, D) \geq \frac{(2r)^{-\alpha}}{2(D-2r)^{-\alpha}} = \frac{(F-1)^\alpha}{2}$$

In an example scenario, If P=20 dBm, r=400 m, α=3, for γ=20 dB (e.g., full 802.11g rate), D/r=13.6 (e.g. D=5440 m), Interference power 2*Pr=−89 dBm, noise power (for bandwidth=20 MHz) may be $N_F$=5 dB, and N=−95 dBm. If α=2, interference power 2*Pr=−54 dBm. Sample values of reuse factor F for a propagation exponent α=2-4; SINR γ=10 dB (e.g., 802.11g with 12 Mbps); 20 dB (e.g., 802.11g with 54 Mbps) are provided herein:

| α | γ | D/r | F |
| --- | --- | --- | --- |
| 2 | 10 dB | 10.9 | 6 |
| 2 | 20 dB | 30.2 | 16 |
| 3 | 10 dB | 7.4 | 4 |
| 3 | 20 dB | 13.6 | 7 |
| 4 | 10 dB | 6.2 | 4 |
| 4 | 20 dB | 9.5 | 5 |

Since MCG in vehicle 104a is located at the cell edge rather than the center, to attain a target SINR, a larger reuse distance D may be appropriate, as compared to a scenario where the MCG is located at the center of a cell. In addition, because traffic is relayed wirelessly to IAPs in VAN 100, a large amount of relay traffic may be present in the network.

Figure 8:
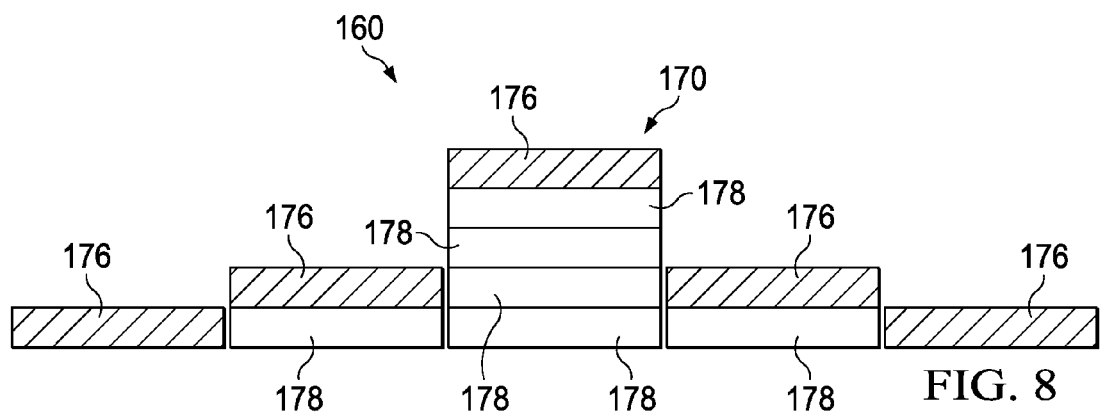
FIG. 8 is a simplified block diagram showing a potential principle of operation associated with a RAT in accordance with embodiments of the present disclosure.

Turning to FIG. 8, FIG. 8 illustrates a channel capacity in cells in RAT 160 according to embodiments of the present disclosure. Cell capacity is the maximum traffic that can be reliably transmitted across a cell. Blocks 176 represent net cell capacity and blocks 178 represent transport capacity. Transport capacity is a product of traffic and distance from IAP 170. The cell containing IAP 170 may carry a maximum traffic, with adjacent cells carrying lesser traffic. Net cell capacity remains the same for all cells, irrespective of distance from IAP 170. Total cell capacity is the sum of net cell capacity and transport capacity. Because transport capacity varies with distance from IAP 170, total cell capacity decreases with increasing distance from IAP 170.

For a bandwidth $W_H$ allocated to access (i.e., net) traffic 168 in a given cell 162, the average cell capacity, $\overline{C}$ is calculated from the equation $\overline{C}=W_H \overline{S}_{eff}$, where $\overline{S}_{eff}$ is the average spectral efficiency of air interface. To access IAP 170, traffic 168 in a cell at a distance l from IAP 170 flows through l−1 cells. The cell also carries traffic originating in cells at a distance g>l. For a cell at a distance l from IAP 170, an amount of relay traffic 172 originating in farther cells that may be relayed can be calculated from the following mathematical equation:

$$T_l = \left(\frac{Q-1}{2} - l\right)\overline{C}$$

where $T_l$ is the amount of relay traffic (i.e., transport capacity) 172, Q is the cluster size, l is the distance of the cell from IAP 170 and $\overline{C}$ is an average capacity of the cell, assuming a symmetric cluster configuration, with IAP 170 in the middle of RAT 160. The total capacity for the cell is $T_l + \overline{C}$. For the cell containing IAP 170, total traffic, $T_0 = (Q-1)\overline{C}$. Thus, a non-uniform resource allocation policy may be in place to obtain a desired capacity in each cell.

Figure 9:
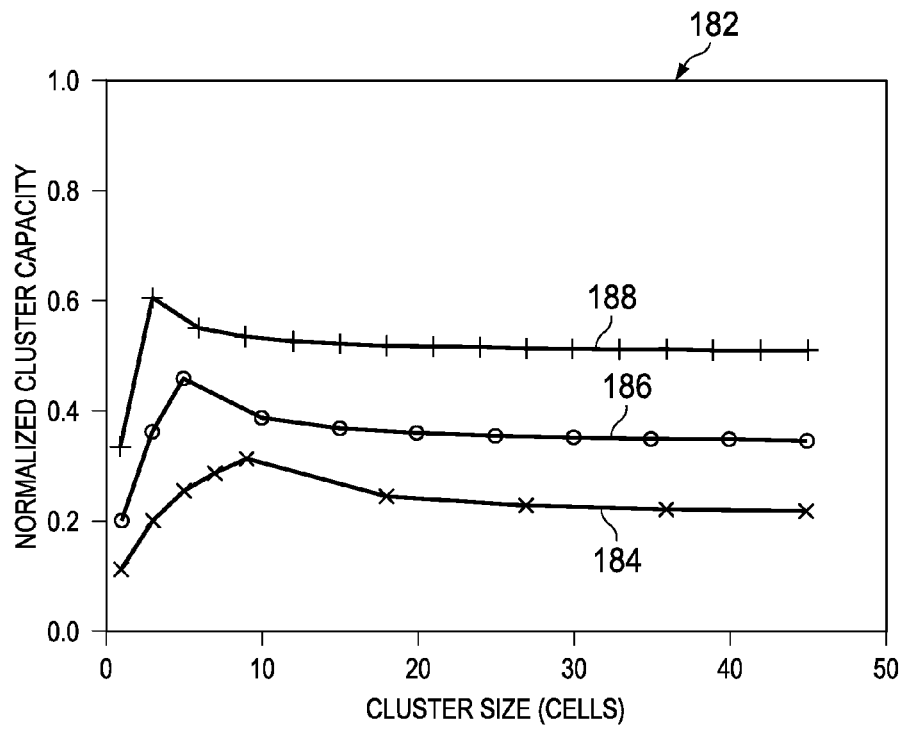
FIG. 9 is a graph of normalized RAT capacity over cluster cells associated with a RAT in accordance with embodiments of the present disclosure.

Turning to FIG. 9, FIG. 9 shows a graph 182 of normalized cluster capacity in cells over cluster size for three different reuse factors. Line 184 represents a reuse factor of 9, line 186 represents a reuse factor of 5 and line 188 represents a reuse factor of 3. For each complete frequency usage, capacity for the entire cluster is given by $C_T = W_T S_{\mathit{eff}}$. If $Q \geq F$, $C_r$ should satisfy:

$$C_T = Q\overline{C} + 2\left(\sum_{l=1}^{\frac{F-1}{2}} \left(\frac{Q-1}{2} - l + 1\right)\overline{C}\right)$$

which includes a capacity for relay traffic originating in other clusters. Assuming that Q is odd, RAT is symmetric, and Q/F is an integer number, the corresponding average cell capacity may be expressed by the following equation:

$$\overline{C} = \frac{C_T}{Q + 2\left(\sum_{l=1}^{\frac{F-1}{2}} \left(\frac{Q-1}{2} - l + 1\right)\right)}$$

RAT capacity ($C_Q = Q\overline{C}$) can be expressed by the following mathematical equation:

$$C_Q = \frac{QC_T}{Q\frac{F+1}{2} - \left(\frac{F-1}{2}\right)^2} \geq \frac{1}{\frac{F+1}{2}} C_T$$

RAT capacity for any F may decrease monotonically for increasing Q until the lower bound ($2C_T/(F+1)$) is reached for $Q \to \infty$. Loss in access (i.e., net) capacity due to relay capacity may be expressed through normalized RAT capacity, $C_Q^{norm} = C_Q/C_T$, which is shown in FIG. 9. Capacity per unit distance may be obtained by dividing RAT capacity by distance between IAPs ($D_{IAP}$), which yields the following relation:

$$C_d = \frac{QC_T}{D_{IAP}Q\frac{F+1}{2} - D_{IAP}\left(\frac{F-1}{2}\right)^2} \geq \frac{1}{D_{IAP}\frac{F+1}{2}} C_T$$

For Q<F, total cluster capacity may be expressed as:

$$C_T \frac{Q}{F} = Q\overline{C} + 2\left(\sum_{l=1}^{\frac{Q-1}{2}} \left(\frac{Q-1}{2} - l + 1\right)\overline{C}\right)$$

where the factor multiplying $C_T$ is due to the reuse pattern being shared between different clusters. Thus, each cluster only has a fraction Q/F of the total capacity. For the RAT capacity ($C_Q = Q\overline{C}$), $$C_Q = \frac{C_T}{F} \frac{4Q^2}{Q^2 + 4Q - 1}$$

As shown by graph 182, normalized RAT capacity is maximum when cluster size and frequency reuse size are the same, i.e. Q=F. Normalized cluster capacity decreases gradually as Q increases beyond F, and it is lower-bounded by 2/(F+1). Therefore, traffic behavior and characteristics in RAT 160 may be unlike in a typical cellular network, where a base station absorbs traffic from each cell and routes the traffic through a wired connection. In such a typical cellular system, which has an IAP in each cell, $C_Q^{norm} = 1$. In contrast, in VAN 100, traffic of each cell may be transported to an IAP (e.g., IAP 170) via MCGs or other nodes.

Figure 10:
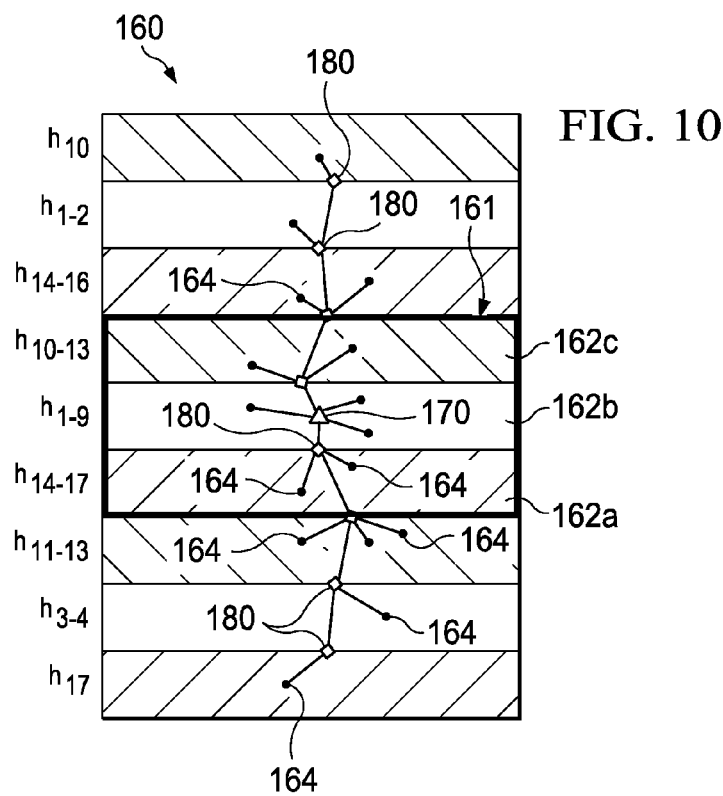
FIG. 10 is a simplified block diagram showing a potential principle of operation associated with a RAT in accordance with embodiments of the present disclosure.

Turning to FIG. 10, FIG. 10 shows an example channel allocation for RAT 160 according to embodiments of the present disclosure, in which F=3, Q=9 and number of channels H=17. Cell 162a, 162b, and 162c represent a frequency reuse cluster 161. Pattern represented by cells 162a-c may be repeated in RAT 160. According to FIG. 10, IAP 170 falls in cell 162b. MCGs 180 may be located at a border between two cells, for example, cell 162a and cell 162b. Nodes 164 may be VMRs, or user devices, or mobile devices, or other devices with connectivity to MCGs in RAT 100. Cell 162b can use channel h1 to h9, cell 162c can use channels h10 to h13, and cell 162a can use channels h14 to h17 and so on. In the example channel allocation shown in FIG. 10, MCG 180a is located at a border of cells 162b and 162a may operate on channels h1 to h9 with IAP 170, and on channels h14 to h17 with nodes 164a and 164b in cell 162a.

Figure 11:
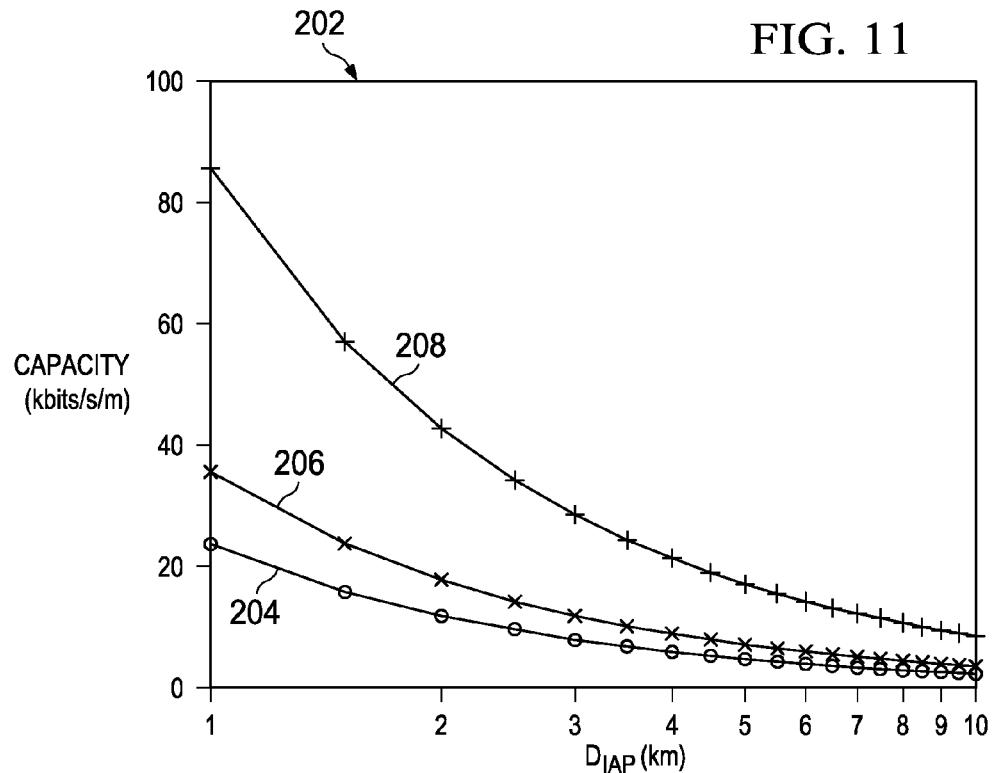
FIG. 11 shows a graph illustrating RAT capacity over distance from an infrastructure access point (IAP), according to embodiments of the present disclosure.

Turning to FIG. 11, FIG. 11 shows a graph 202 of capacity in kbits/s/m over distance between IAP ($D_{IAP}$) for various network standards, and data rates. Line 204 represents 802.11p, line 206 represents 802.11g and line 208 represents 802.11n. As shown by graph 202, capacity decreases with increasing distance between IAPs.

RAT 160 may utilize a limited frequency spectrum depending on the wireless channels it encompasses. To determine how efficiently the limited frequency spectrum is utilized by the channel (e.g., MAC channel), a spectral efficiency ($\overline{S}_{\mathit{eff}}^L$) may calculated in bits/s/Hz. Spectral efficiency refers to traffic that can be transmitted over a given bandwidth in a specific communication system. Spectral efficiency may be a function of a distance between IAPs ($D_{IAP}$), frequency reuse factor F, cluster size Q, and average spectral efficiency of air ($\overline{S}_{\mathit{eff}}$) as provided by the following mathematical equation:

$$\overline{S}_{\mathit{eff}}^L = \overline{S}_{\mathit{eff}} \frac{1}{\frac{F+1}{2} D_{IAP} - \frac{D_{IAP}}{Q}\left(\frac{F-1}{2}\right)^2} \geq \overline{S}_{\mathit{eff}} \frac{1}{\frac{F+1}{2} D_{IAP}}$$

Spectral efficiency is inversely proportional to distance between IAPs ($D_{IAP}$) (i.e., larger the distance between IAPs, smaller the spectral efficiency). For a fixed distance between IAPs and a given F, spectral efficiency may decrease slightly with increasing Q (i.e., larger the cluster size, smaller the spectral efficiency). In VAN 100, it may not be possible to increase area spectral efficiency by diminishing cell size unless the geographical RAT size is reduced accordingly (e.g., number of cells per cluster is kept constant). The total capacity per unit area may be limited by a density of IAPs and can scale accordingly with the IAP density.

Figure 12A:
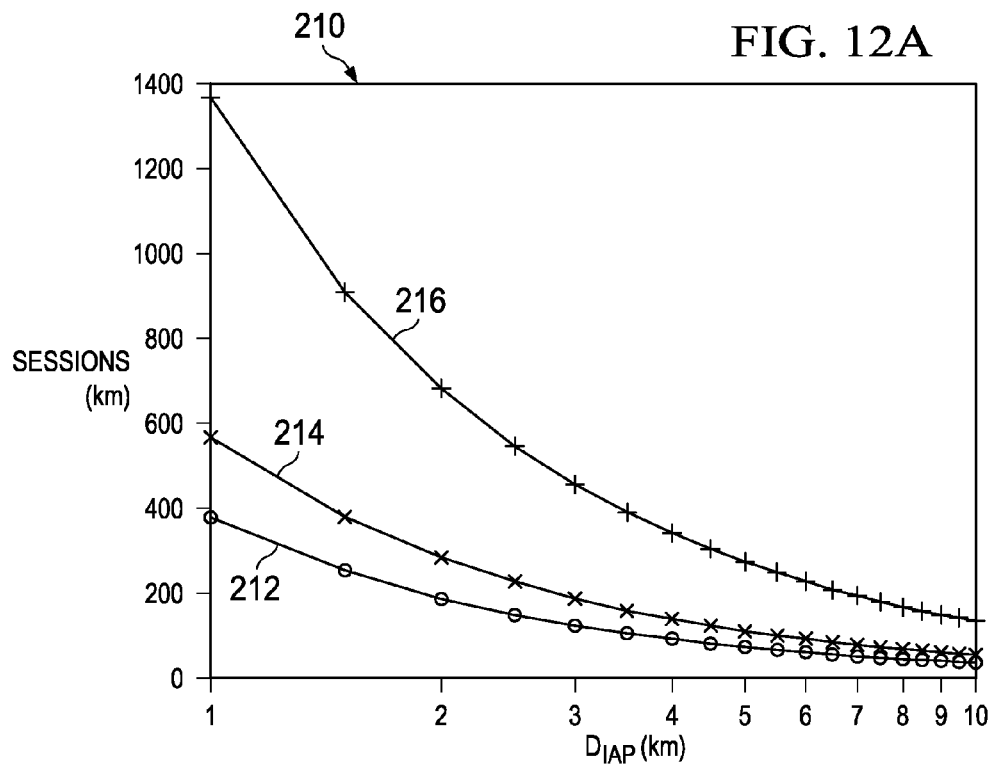
Figure 12B:
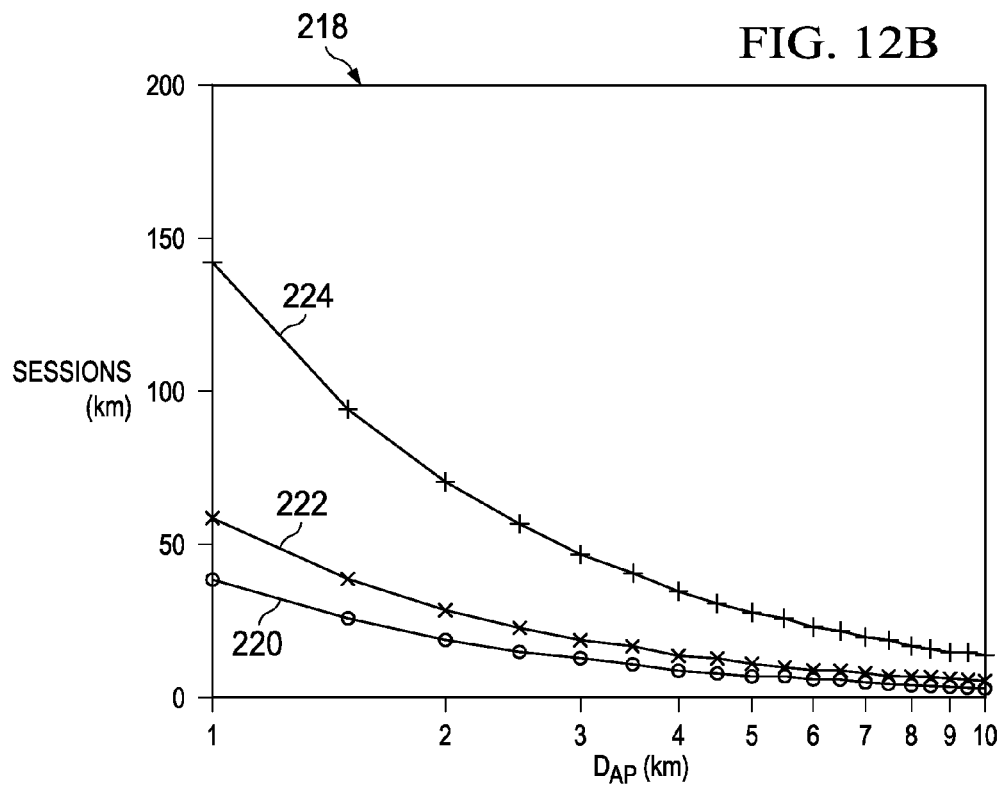
Figure 12C:
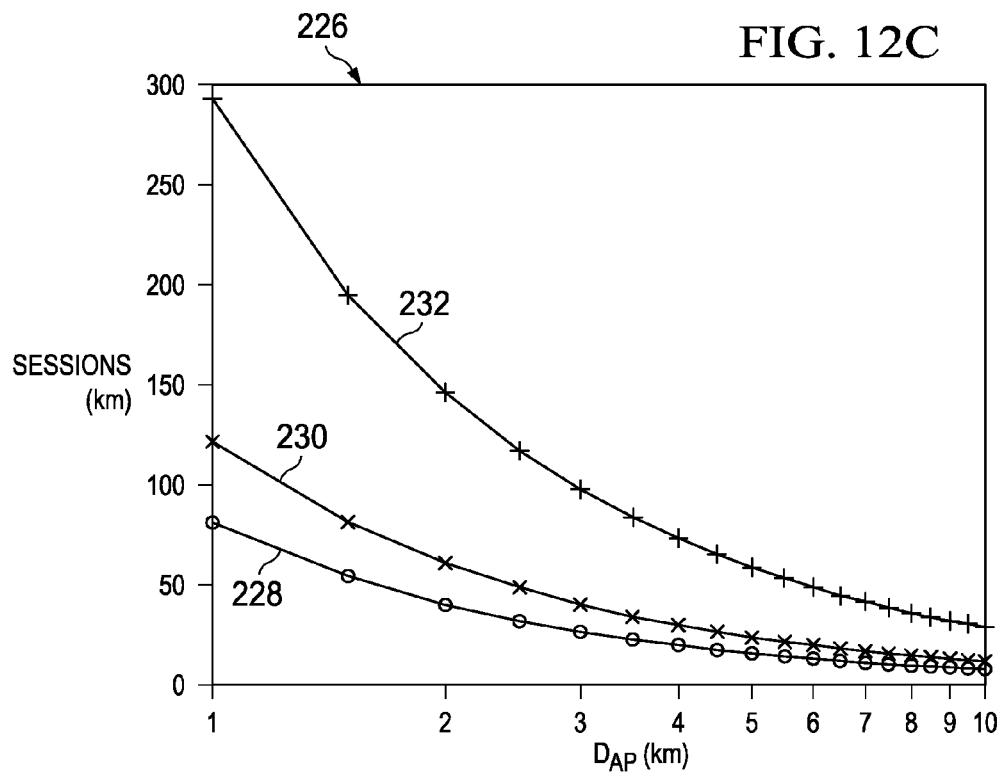

Turning to FIGS. 12A-12D, FIGS. 12A-12D show graphs of capacity (in sessions/km) over distance from IAP ($D_{IAP}$) for different frequency standards and applications. FIG. 12A shows a graph 210 of capacity over distance from IAP for a VoIP application. Line 212 represents 802.11p, line 214 represents 802.11g and line 216 represents 802.11n. FIG. 12B shows a graph 218 of capacity over distance from IAP for a videoconferencing application. Line 220 represents 802.11p, line 222 represents 802.11g and line 224 represents 802.11n. FIG. 12C shows a graph 226 of capacity over distance from IAP for a Low Definition TV (LDTV) application. Line 228 represents 802.11p, line 230 represents 802.11g and line 232 represents 802.11n. FIG. 12D shows a graph 234 of capacity over distance from IAP for an IPTV application. Line 236 represents 802.11p, line 238 represents 802.11g and line 240 represents 802.11n. As can be seen from the graphs in FIG. 12, capacity may decrease with increasing $D_{IAP}$ irrespective of the application.

According to embodiments of the present disclosure, actual SINR in VAN 100 may depend on an exact mobile position, and propagation conditions. In an example embodiment with adaptive modulation and coding such as 802.11 or DSRC, a higher SINR may be obtained by using more spectrally efficient transmission modes. In such a scenario, power control can maximize the capacity of RAT 160. Power control, in addition to frequency reuse, may be implemented to reduce interference. Power control may minimize interference to co-channel cells and compensate for channel fading. Minimum power usage may result in better channel capacity in co-channel cells and reduced link margins, which may, in turn, result in more aggressive channel reuse.

Power control techniques may be adapted to a moving environment, for example, tracking channel variation caused by mobility, propagation, and mobile nodes entering or leaving channel. In an example embodiment, power control techniques may include at least two methods: 1) iterative algorithm to maintain SINR; and 2) game theoretic approach, wherein utility can be maximized by link capacity and a cost function of the transmitted power. In both cases, information available at the mobile node (e.g., SINR measurement) may be sufficient for the respective algorithms to converge.

An iterative algorithm, for example, an adaptive Power Control (PC) algorithm like Foschini-Miljanic (F-M) algorithm, may use time-varying signal quality to obtain a desired power allocation that: 1) satisfies QoS factors, such as SINR, or average link capacity ($\overline{C}$); and 2) minimizes transmitted power as also interference to co-channel links. Wireless channels, in general, may cause time dispersion (frequency domain channel variation), which can be addressed through air interface design according to other embodiments of the present disclosure. F-M algorithm may be used to converge to a target SINR based on local observations. A target SINR for node q ($SINR_q$) may be defined by the following mathematical equation:

$$SINR_q = \frac{p_q G_{qq}}{N + \sum_{j=1}^{N_I} p_j G_{jq}}$$

where each node j has variable power $p_j$, $G_{ij}$ denotes a gain from transmitter i (for example, MCG 180) to receiver j (for example, IAP 170), and N is a background noise power. Channel gain $G_{ij}$ depends in general on time, distance, position, and propagation conditions of the mobile nodes (e.g., OBUs).

According to embodiments of the present disclosure, adaptive systems with several transmission nodes may have different data rates depending on the target SINR. In an example embodiment, a constant ratio of data rate to channel inversion may be implemented. For example, more power may be used when a channel is bad. In such scenarios, an instantaneous data rate may be equal to an average data rate. This may result in slow PC (e.g., average data rate achieved with high delay), which may compensate for path loss and shadow fading.

Alternatively, waterfilling algorithms may be used, for example, more power may be used when channel conditions are better. Waterfilling algorithms may maximize average data rate, but may result in high variability in instantaneous data rates. It may support a multi-version, multi-user diversity. Such techniques may result in fast PC (e.g., average data rate achieved with low delay), which can compensate for small-scale fading. However, it may be difficult to implement for random access-based scheduling, and may be more appropriate for deterministic scheduling. Generally, such algorithms may use channel state information, and can adapt to sudden changes in interference level from handoffs.

If a system-wide target SINR is denoted by $\gamma_T$, a pareto optimal solution to power vector P (P=$[p_1, \ldots p_L]^T$) may be obtained from the following equation:

$$(l-F)P \geq u$$

where P>0, wherein > stands for component-wise inequality, and L is the total number of nodes in the network. u is a matrix given by:

$$u = \left(\frac{\gamma_T N}{G_{11}}, \ldots, \frac{\gamma_T N}{G_{LL}}\right)^T$$

where N stands for noise variance. Matrix l is an identity matrix, and matrix F is defined as:

$$F_{i,j} = \begin{matrix} 0 & \text{if } i = j \\ \frac{\gamma_T G_{ij}}{G_{ii}} & \text{if } i \neq j \end{matrix}$$

Matrix F is assumed to be irreducible and all its elements are non-negative. The pareto-optimal solution, which may implement iterative algorithms to converge, is given by:

$$P^* = (l-F)^{-1}u$$

According to embodiments of the present disclosure, techniques for power control may be distributed or centralized. In a centralized power control technique, a base station or access point may determine power level of nodes (e.g., mobile devices, OBUs, etc.) in a corresponding network. Nodes in the network may have access to global information (e.g., all SINRs) and the method may be flexible (e.g., weighted power control may also be used).

In another embodiment, according to a distributed technique, nodes (e.g., mobile devices, OBUs, etc.) may self-adjust transmitted power. A distributed technique may be suitable for distributed systems, where access to local information (e.g., local SINR) may be used. However, in a distributed technique, convergence and tracking can be problematic.

For example, in a centralized approach, in matrix form, power vector P may be updated for the $(k+1)^{th}$ iteration from the following mathematical equation:

$$P(k+1)=F(k)P(k)+u(k)$$

In a distributed approach, power vector P may be updated for each iteration k for node q by updating individual power components from the following mathematical equation:

$$p_q(k+1) = \frac{\gamma_T}{SINR_q(k)} p_q(k)$$

Figure 13:
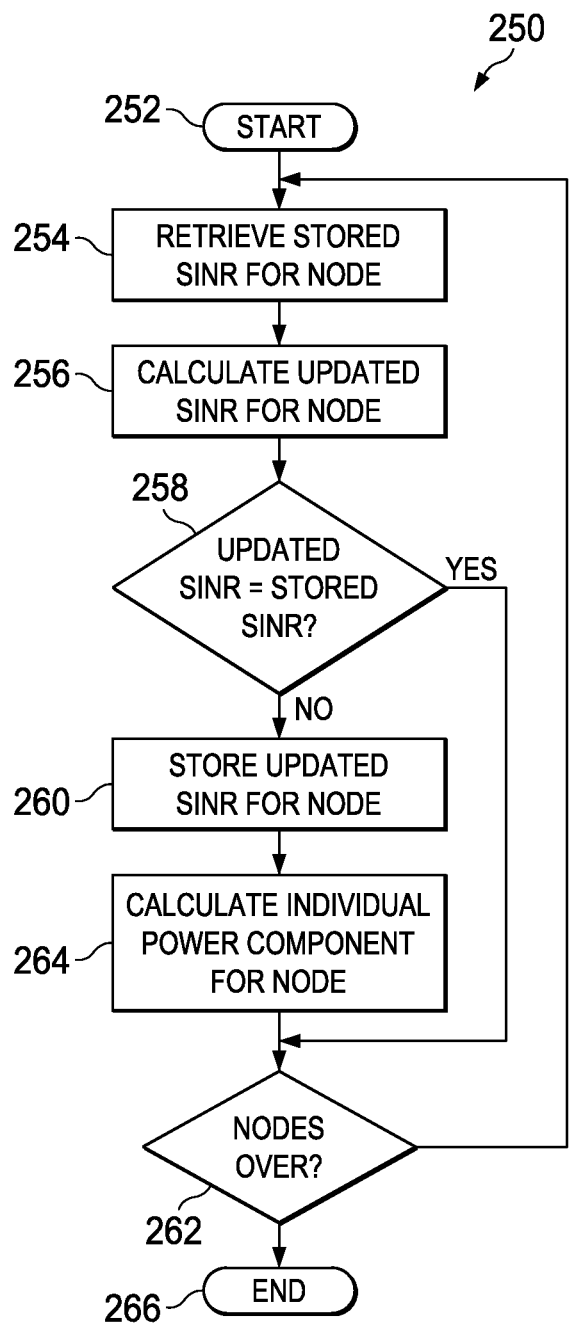
FIG. 13 is a flow-chart illustrating example operational steps associated with a method for power control in accordance with the present disclosure.

Turning to FIG. 13, FIG. 13 illustrates example operational steps of a method 250 associated with power control calculations for VAN 100 according to embodiments of the present disclosure. Method 250 starts in step 252. In step 254, stored SINR for a node is retrieved. In step 256, an updated SINR is calculated. If the updated SINR is not equal to the stored SINR as determined in step 258, calculated SINR is stored in step 260. Otherwise, power for the next node is computed by looping to step 262. Individual power components for the node are calculated in step 264 based on the formula for a distributed approach. If calculations for all nodes are not completed, as determined in step 262, the process loops back to step 254. Otherwise, the process terminates in step 266.

Figure 14A:
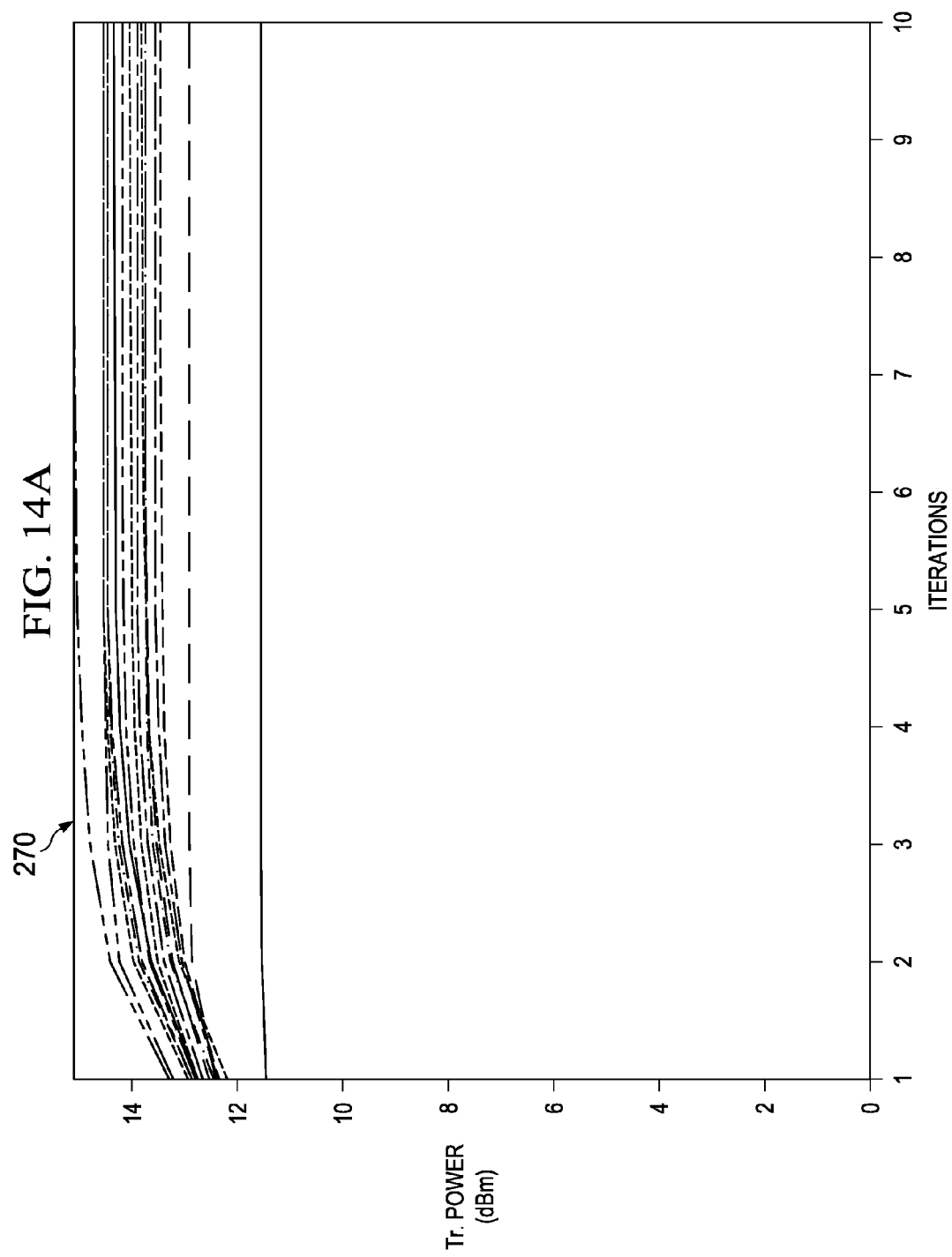
FIGS. 14A and 14B show graphs of transmitted power over iteration numbers associated with exemplary methods in accordance with the present disclosure.
Figure 14B:
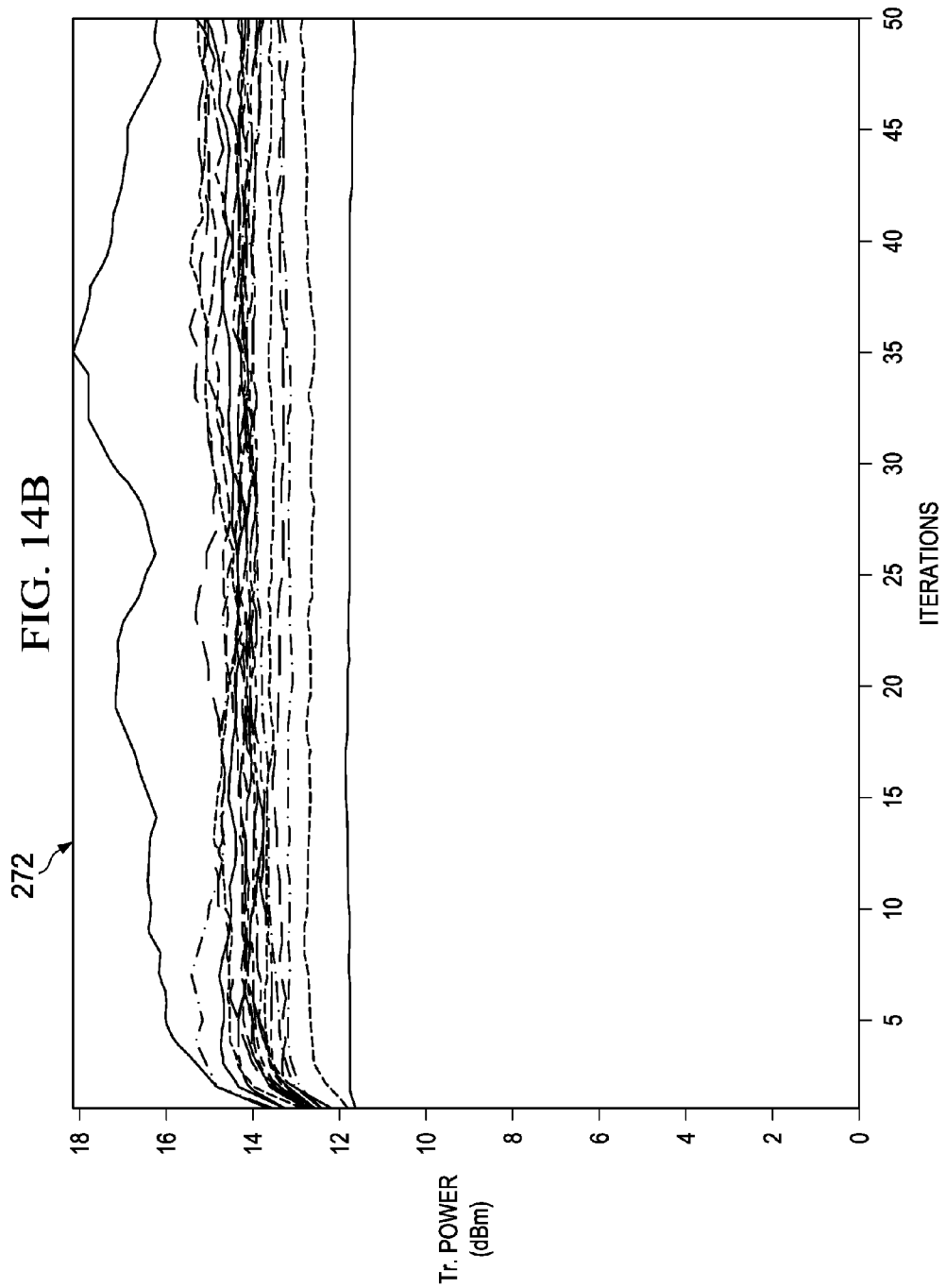

Turning to FIGS. 14A and 14B, FIGS. 14A and 14B show graphs of transmitted power over iteration number using an iterative algorithm for various nodes in VAN 100 in static and mobility scenarios, respectively, according to embodiments of the present disclosure. As shown by graph 270 in FIG. 14A, convergence may be obtained in around 5 iterations in the static scenario. However, convergence may be more difficult in a mobile scenario as shown by graph 272 in FIG. 14B.

Figure 15A:
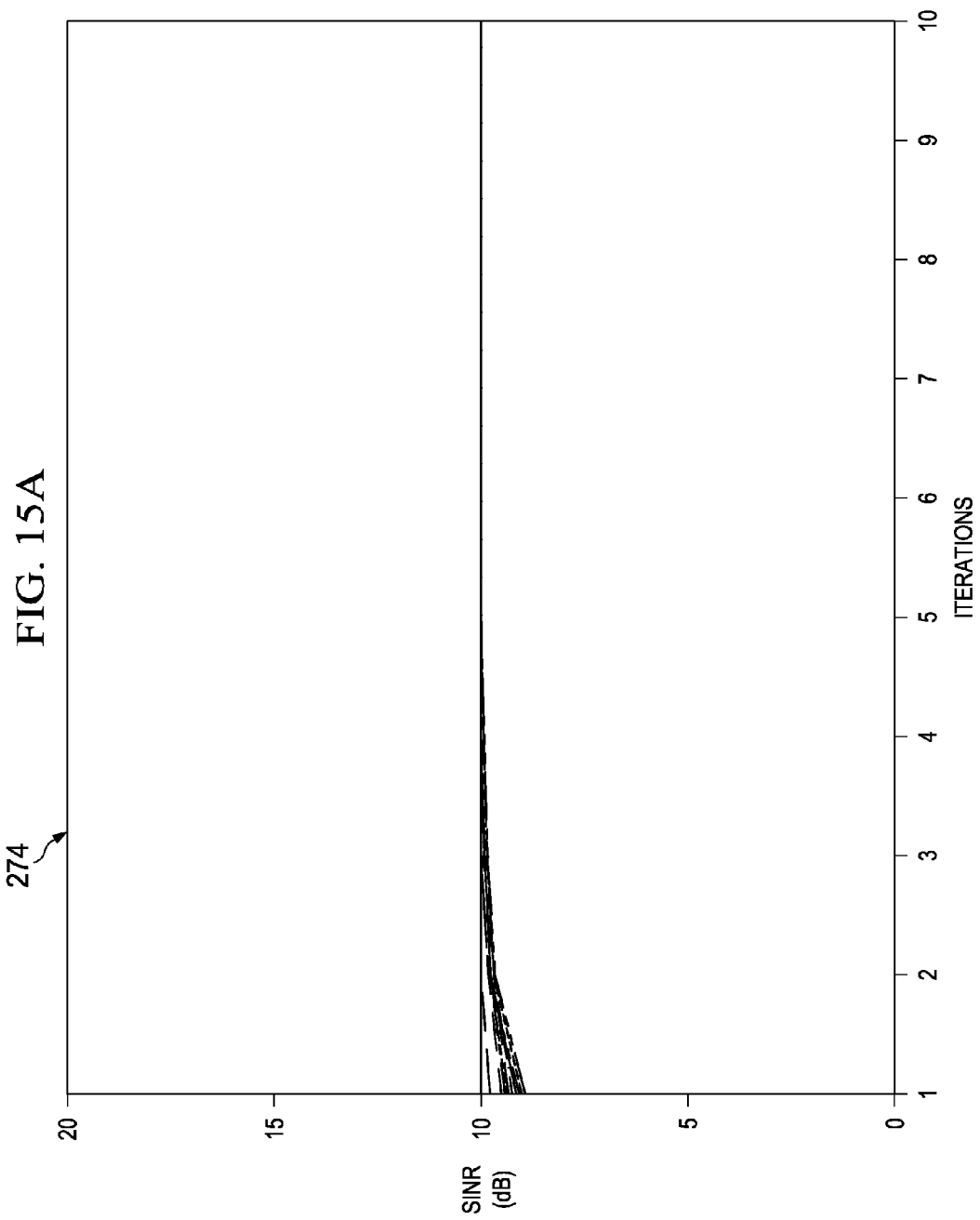
FIGS. 15A and 15B show graphs of Signal to Interference-plus-Noise Ratio (SINR) over iteration numbers associated with exemplary methods in accordance with the present disclosure.
Figure 15B:
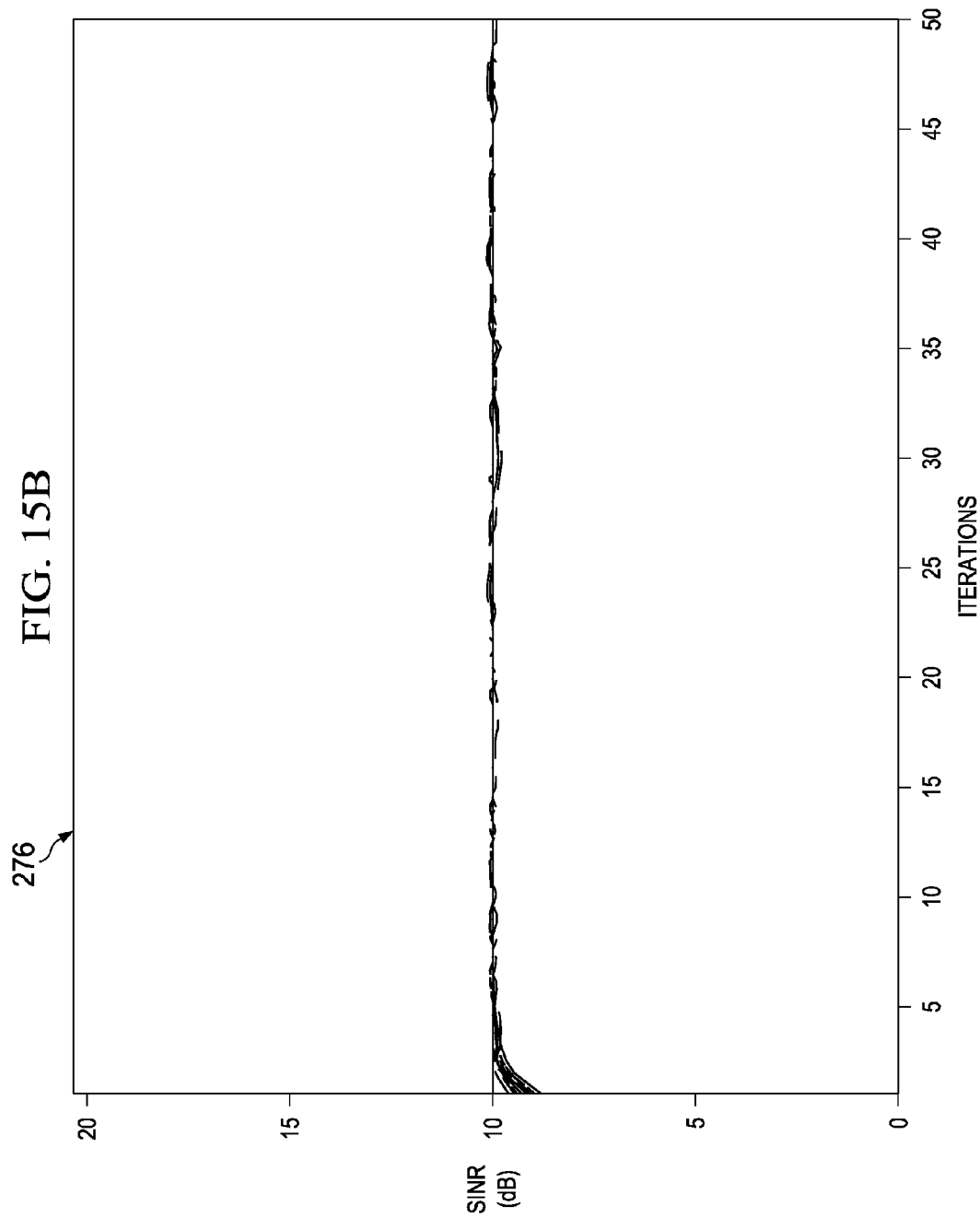

Turning to FIGS. 15A and 15B, FIGS. 15A and 15B show graphs of SINR over iteration number using an iterative algorithm for various nodes in VAN 100 in static and mobility scenarios, respectively, according to embodiments of the present disclosure. As shown by graph 274 in FIG. 15A, convergence may be obtained in around 4 iterations in the static scenario. However, convergence may be more difficult in a mobile scenario as shown by graph 276 in FIG. 15B but can be reasonably obtained in around 5 iterations.

Figure 16:
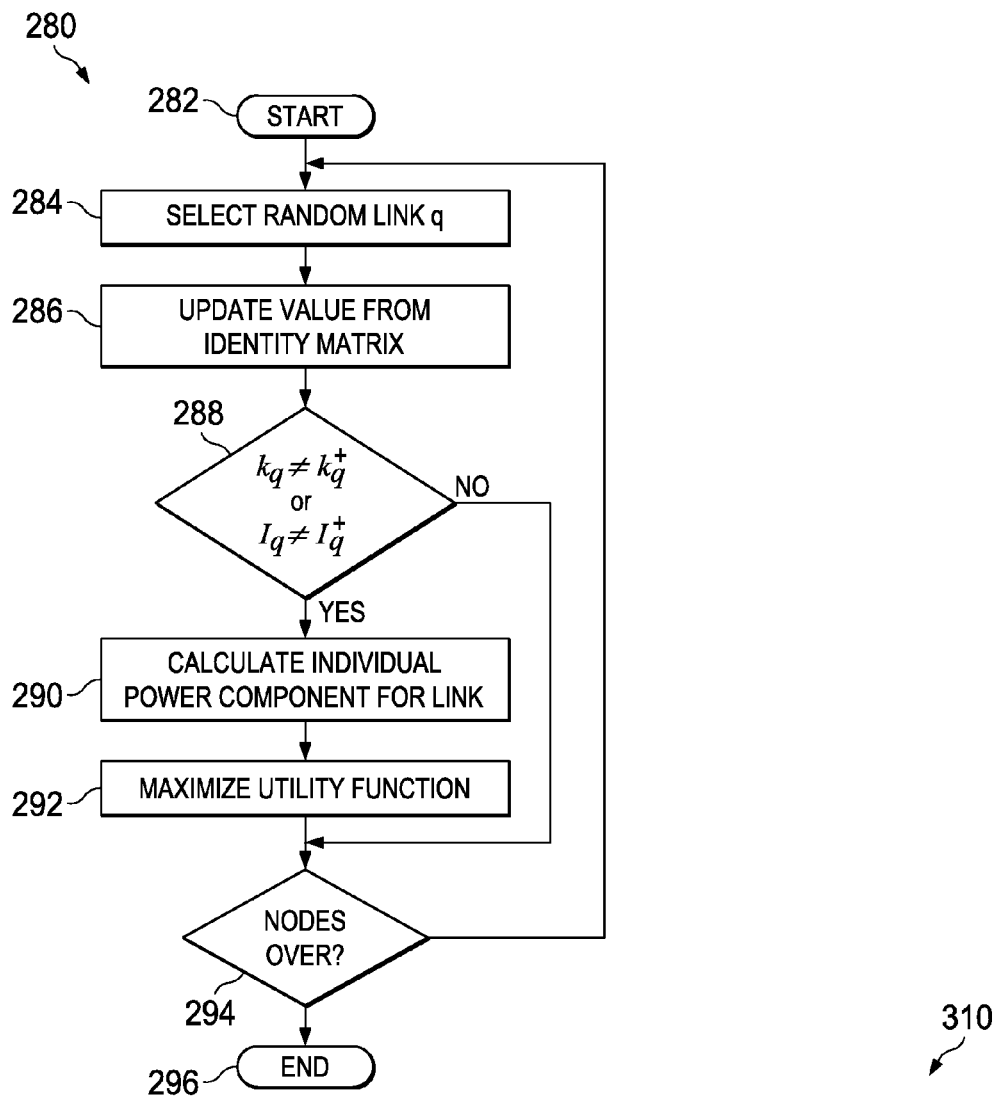
FIG. 16 is a flow-chart illustrating example operational steps associated with a method for power control in accordance with the present disclosure.

Turning to FIG. 16, FIG. 16 illustrates example operational steps of a method 270 associated with power control calculations for VAN 100 according to embodiments of the present disclosure. According to embodiments of the present disclosure, a utility based algorithm may also be implanted using a utility function, which may have a positive rate-dependent term and a negative power dependent term:

$$\phi_q = \log\left(1 + \frac{p_q G_{qr}}{N + \sum_{j \neq q} p_j G_{jq}}\right) - c(p_q)$$

where each node has variable power $p_q$, $G_{ij}$ denotes a channel gain from transmitter i to receiver j, N stands for noise variance, and c is a cost factor, which may be a function of power. Each node j in RAT 160 may maximize utility independently by adjusting transmitted power $p_j$. Convergence may be obtained to a Nash equilibrium if certain properties are satisfied. No actual rate may be guaranteed by the algorithm, and MCGs may adapt rate according to global cost parameters. The algorithm may use local SINR measurements and global cost to converge to a solution.

In FIG. 16, method 280 starts in step 282. In step 284, a node q is selected randomly. In step 286, a value $1_q$ from Identity matrix 1 is updated to $I_q^+$ for the $k^{th}$ iteration. If $k_q \neq k_q^+$ or $1_q \neq I_q^+$ as determined in step 288, a power component is updated for node q, in step 290 as:

$$p_q^+ = p_q^*(k_q^+, I_q^+)$$

where $p_q^*$ may be a pareto-optimal power level for node q. Otherwise, the method proceeds to step 294. A utility function may be maximized for node q in step 292. If calculations for all nodes are not completed, as determined in step 294, the process loops back to step 284. Otherwise, the process terminates in step 296.

Figure 17A:
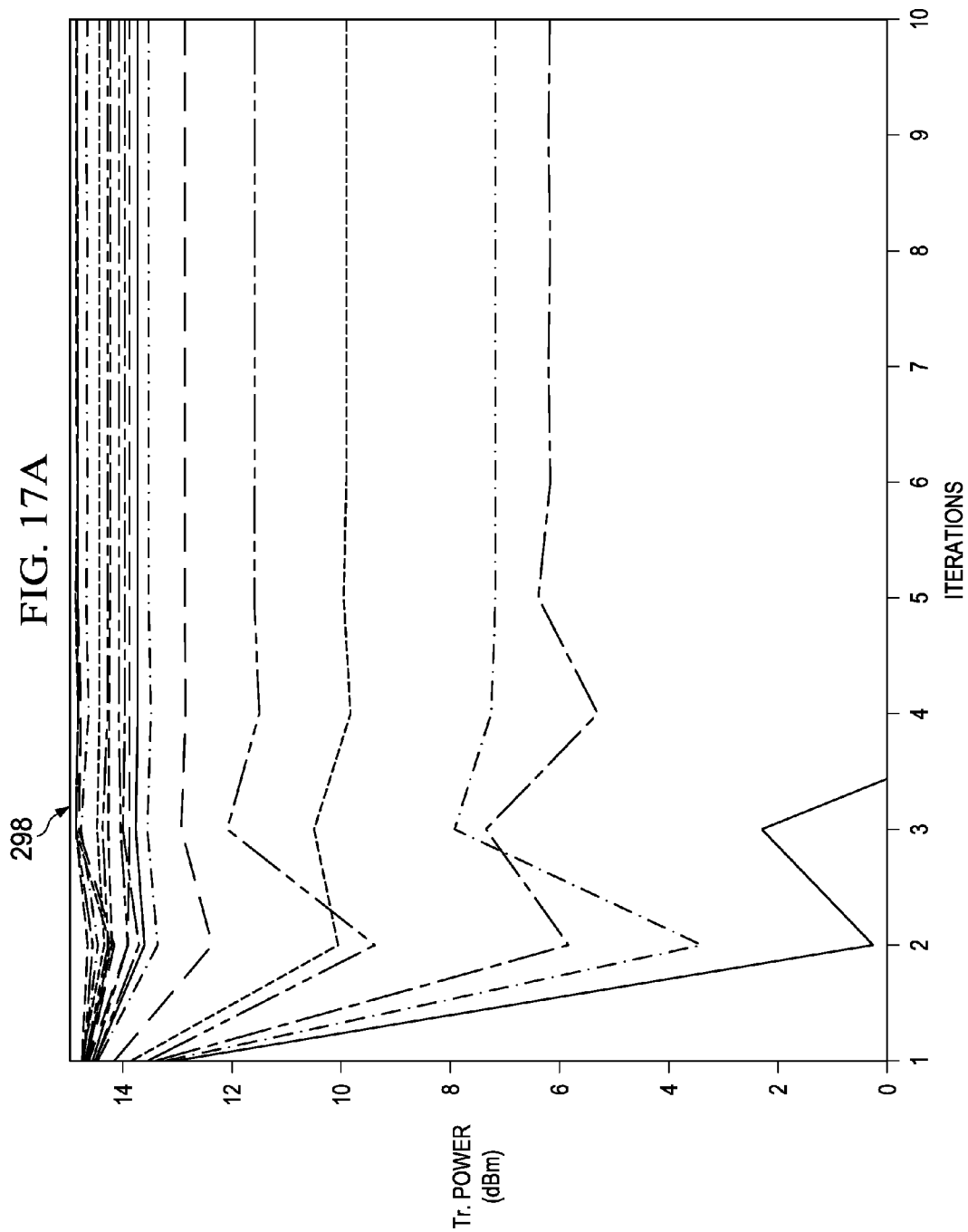

Turning to FIGS. 17A and 17B, FIGS. 17A and 17B show graphs of transmitted power over iteration number using a utility algorithm for various nodes in VAN 100 in static and mobility scenarios, respectively, according to embodiments of the present disclosure. As shown by graph 298 in FIG. 17A, convergence may be obtained in around 5-6 iterations in the static scenario. However, convergence may be more difficult in a mobile scenario as shown by graph 300 in FIG. 17B.

Figure 18A:
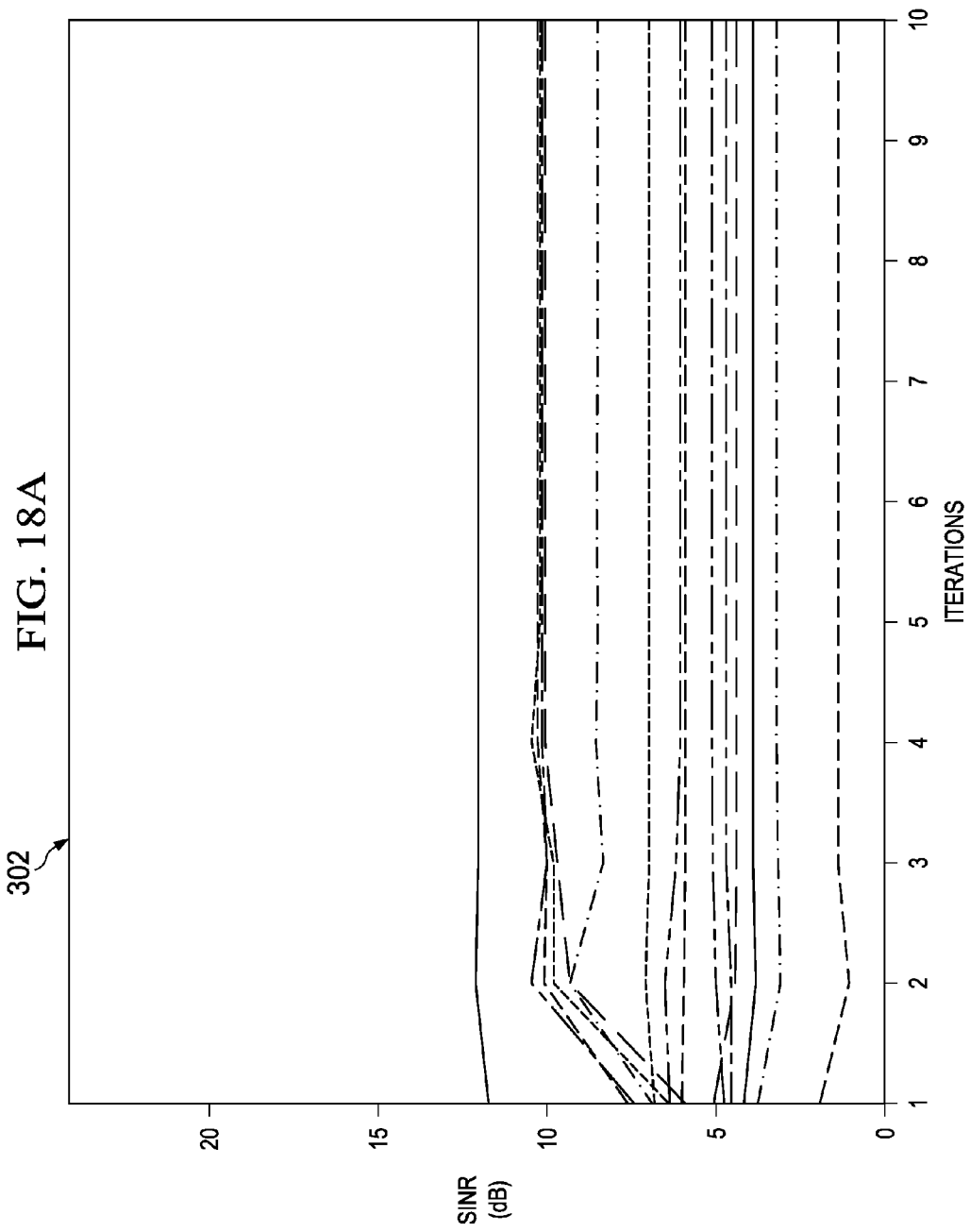
FIGS. 18A and 18B show graphs of SINR over iteration numbers associated with exemplary methods in accordance with the present disclosure.
Figure 18B:
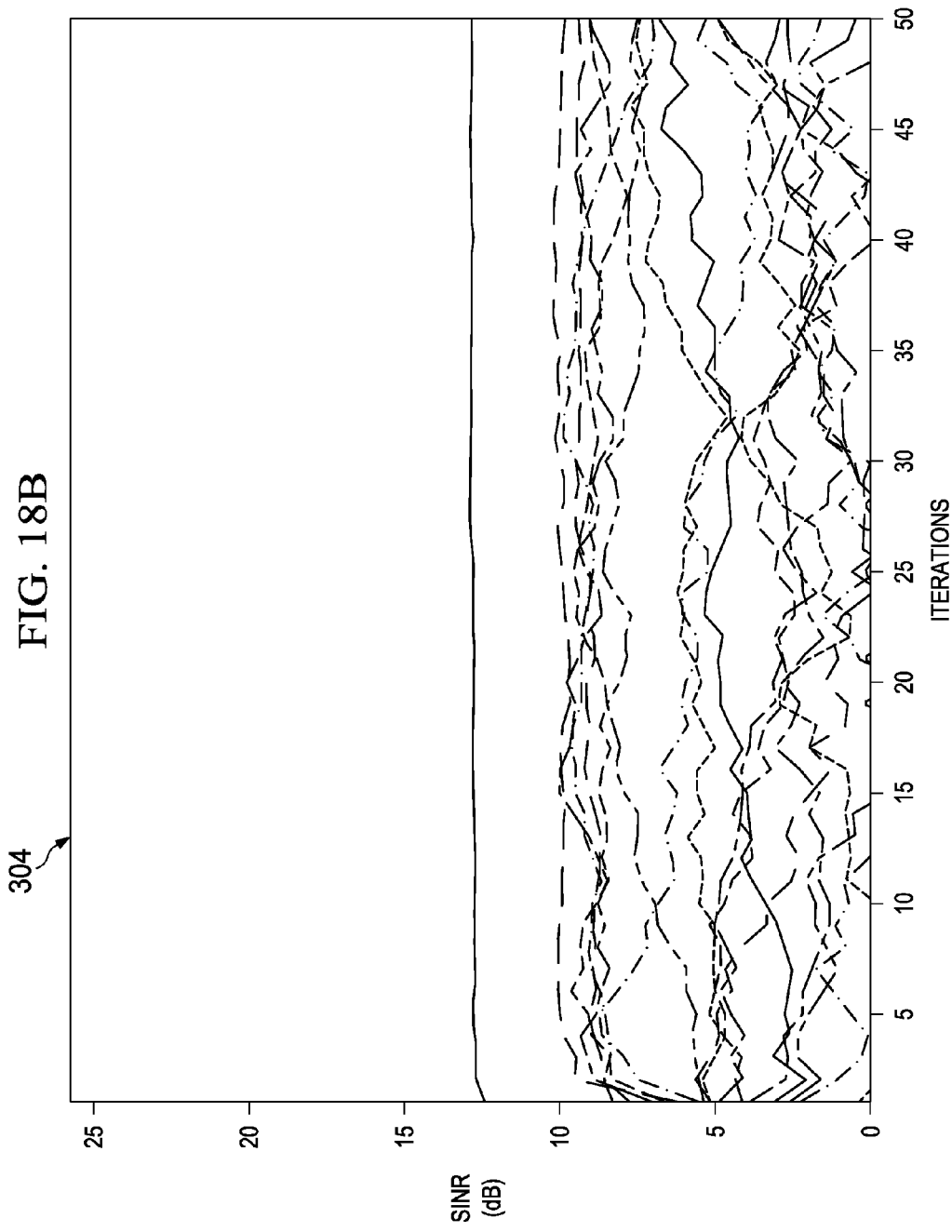

Turning to FIGS. 18A and 18B, FIGS. 18A and 18B show graphs of SINR over iteration number using an iterative algorithm for various nodes in VAN 100 in static and mobility scenarios, respectively, according to embodiments of the present disclosure. As shown by graph 302 in FIG. 18A, convergence may be obtained in around 4-5 iterations in the static scenario. However, convergence may be more difficult in a mobile scenario as shown by graph 304 in FIG. 18B.

Figure 19:
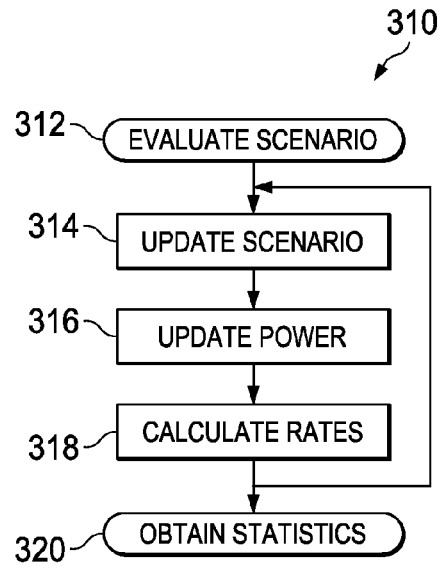
FIG. 19 is a simplified flow-chart illustrating example operational steps associated with a method for operating a vehicular access network in accordance with the present disclosure.

Turning to FIG. 19, FIG. 19 illustrates example operational steps associated with a method 310 for integrated performance evaluation according to embodiments of the present disclosure. Method 310 starts with evaluating a scenario in step 312. The scenario includes various elements (e.g., connectivity architecture, channel allocation, mobility model and power control) that characterize the system under analysis. The scenario may be updated based on mobility propagation cell, channel, etc. in step 314. Power may be updated in step 316. Rates may be calculated in step 318. The process may loop back to step 312 based on calculated power and rate. Statistics of various measurements, for example, power, signal-to-noise ratio, and mobility patterns of the involved vehicles, may be calculated in step 320. Solution elements can include connectivity architecture, channel allocation, mobility model and power control. Environment modeling may include propagation, mobility model, and traffic and usage density.

According to embodiments of the present disclosure, deployment of VAN 100 may be managed (e.g., with network planning), or self-organized (e.g., facilitating out of the box deployment). The table below reports on a number of connections and a degree of service coverage attainable for different deployment scenarios. Considering an initial penetration of up to 25% and a busy hour service demand of 25%, bold numbers indicate that the number of connections provided may be satisfactory for specified penetration rates and service demand. Notation a/b/c refers to 802.11n/g/p, respectively. Upper row in each cell represents $D_{IAP}$=1 km, and lower row represents $D_{IAP}$=10 km.

| Road-Type | 8-lane highway, congested | 8-lane highway, full | 8-lane highway, light traffic | 2-lane rural road, light traffic |
|---|---|---|---|---|
| vehicles/km | 800 | 160 | 50 | 13 |
| VOIP calls (232 kbps, two-way) | 100/69/46 16/6/4 | 100/100/100 83/34/23 | 100/100/100 100/100/74 | 100/100/100 100/100/100 |
| Videoconferencing calls (320 kbps, two-way) | 17/7/4 1/0/0 | 89/36/24 8/3/1 | 100/100/78 28/10/6 | 100/100/100 100/38/23 |
| Low definition TV (320 kbps, downlink) | 35/14/9 3/1/0 | 100/74/49 17/6/4 | 100/100/100 56/22/14 | 100/100/100 100/84/53 |
| IPTV (2 Mbps, downlink) | 5/2/1.3 0/0/0 | 26/10/6 2/0/0 | 86/34/22 8/2/2 | 100/100/84 30/7/7 |

Figure 20B:
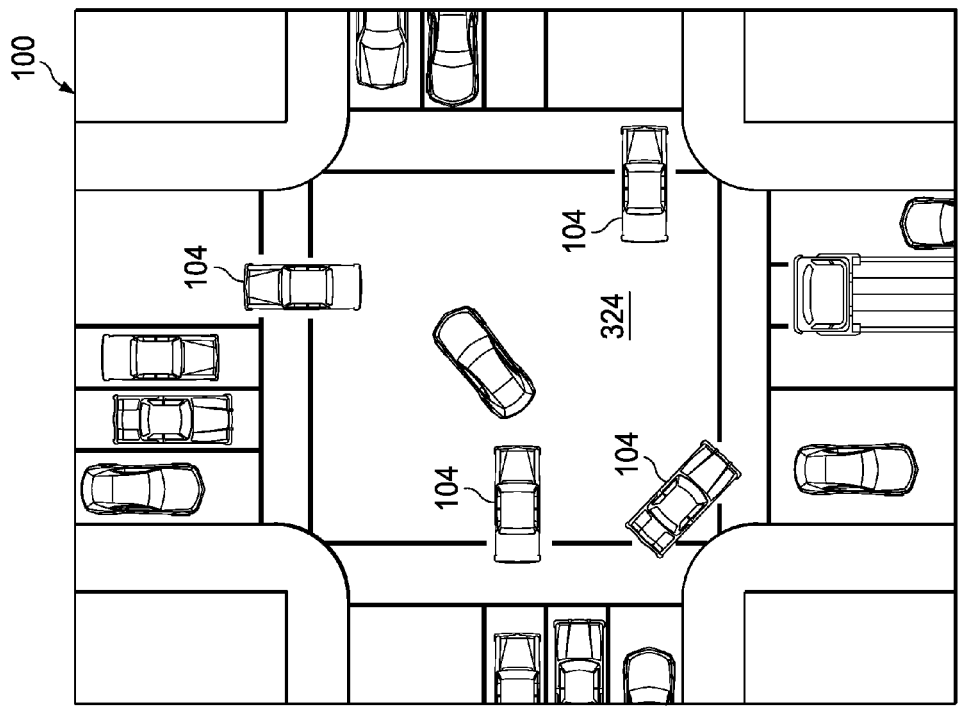
FIGS. 20A and 20B are simplified block diagrams illustrating highway and urban areas, respectively, in accordance with the present disclosure.
Figure 20A:
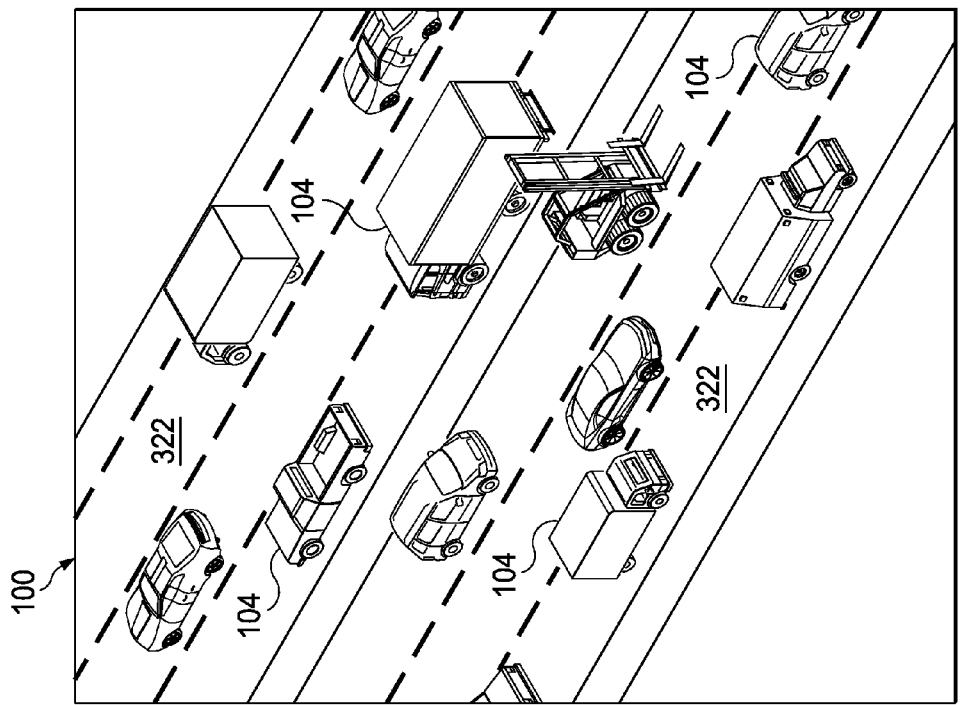

Turning to FIGS. 20A and 20B, FIGS. 20A and 20B illustrate example scenarios of VAN 100 according to embodiments of the present disclosure. FIG. 20A illustrates a highway scenario with vehicles 104 on highway 322 and FIG. 20B illustrates an urban scenario with vehicles 104 on streets 324. In both scenarios, a car density can range from low (e.g., on highways) to extremely high (e.g., in urban areas). While the low-density scenario may affect an efficient formation of VAN 100, the high-density scenario may demand an efficient management of the frequency spectrum through power control, frequency reuse, and admission control.

A highway scenario may be characterized by a fairly stable network topology, dynamic IAPs, passenger type users, very low to high density of vehicles and predictable mobility. Thus, a platoon model may be implemented on highways 322. Vehicles 104 may move somewhat in unison, for example, like a platoon, along highways 322 (e.g., they may move with similar speeds along the same direction). Relatively few vehicles may join or leave the platoon. Perturbations in vehicle speed may be small and random. A Nagel-Schreckenberg (NS) model may be used to characterize network connectivity on highways.

The NS model is a theoretical model for simulation of traffic on a highway. The NS model predicts roadway traffic, in particular concerning traffic density and traffic flow using algorithms (for example, stochastic traffic cellular automata (STCA) algorithms). Four factors may be considered in simulating traffic in the NS model: 1) acceleration/braking of vehicles; 2) randomization; 3) movement of vehicles; and 4) entry of new vehicles and exit of existing vehicles.

Cooperative schemes may be implemented to exploit a broadcast nature of wireless through network coding and cognitive radio. Components of the highway scenario may include mobility of vehicles in clusters, leveraging different implementations of GPS according to vehicle locations, as well as the topography of the highway and deployment of RSUs and other IAPs. A cluster of vehicles 104 may travel at high speed (say 65 miles/hour) but the relative velocities of vehicles in the cluster may be much smaller. Self-organization of the cluster and the efficient management of handovers may be implemented. Self-organization may lie at one extreme of a range between a centralized and distributed communication system 10.

Figure 21A:
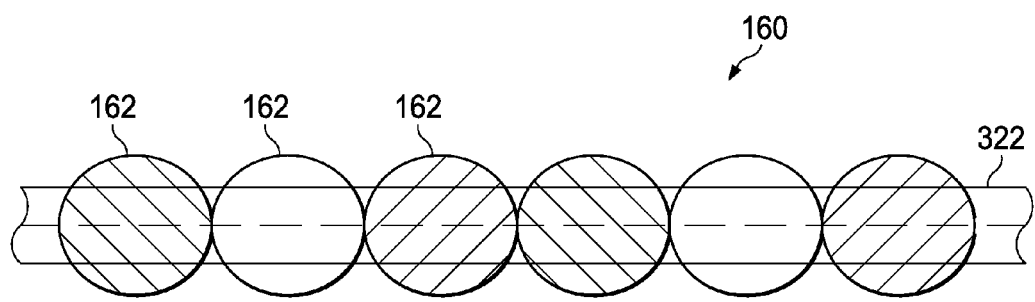
Figure 21B:
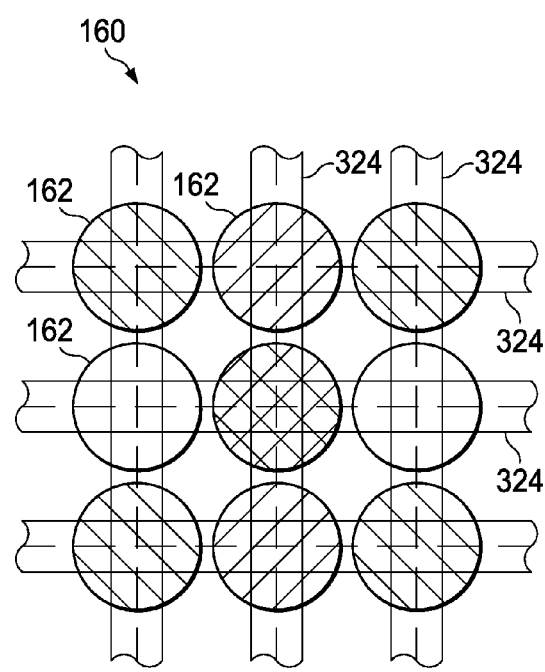

Turning to FIGS. 21A-21C, FIGS. 21A-21C illustrate frequency channel allocation in a highway and urban scenarios. As explained previously herein, frequency reuse may be implemented in RAT 160, including on a highway. Geographic RAT distribution may be linear (e.g., corresponding to a highway topology), as illustrated in FIG. 21A. Cells 162 may be arranged in a linear pattern along highway 322, with frequency reuse implemented. For example, in FIG. 21A, a frequency reuse size of 3 is shown.

On the other hand, an urban scenario may be characterized by dynamic network topology, passing by-type and residential indoor-type users, medium to high density (e.g., parked cars), and static or unpredictable mobility. Very low vehicle density can affect the establishment of VAN 100. This can be a problem during early deployment of connected vehicles, and can possibly be overcome by cooperation between car manufacturers, by arranging an interoperability standard, or by establishing a MWSP consortium, or by other means. In urban environments, a platoon model with higher rate of vehicles joining or leaving the platoon coupled with speed perturbation may apply. In urban areas, the RAT architecture may be dense grids (e.g., cells 162 centered at each corner), as shown in FIG. 21B arranged along streets 324, or sparse grids, which is a combination of linear and grid, with cells 162 arranged linearly and perpendicularly along corresponding streets 324, as shown in FIG. 21C. Architecture may be based on frequency reuse F factor, channel allocation, and spectral efficiency for a given IAP density.

Figure 22:
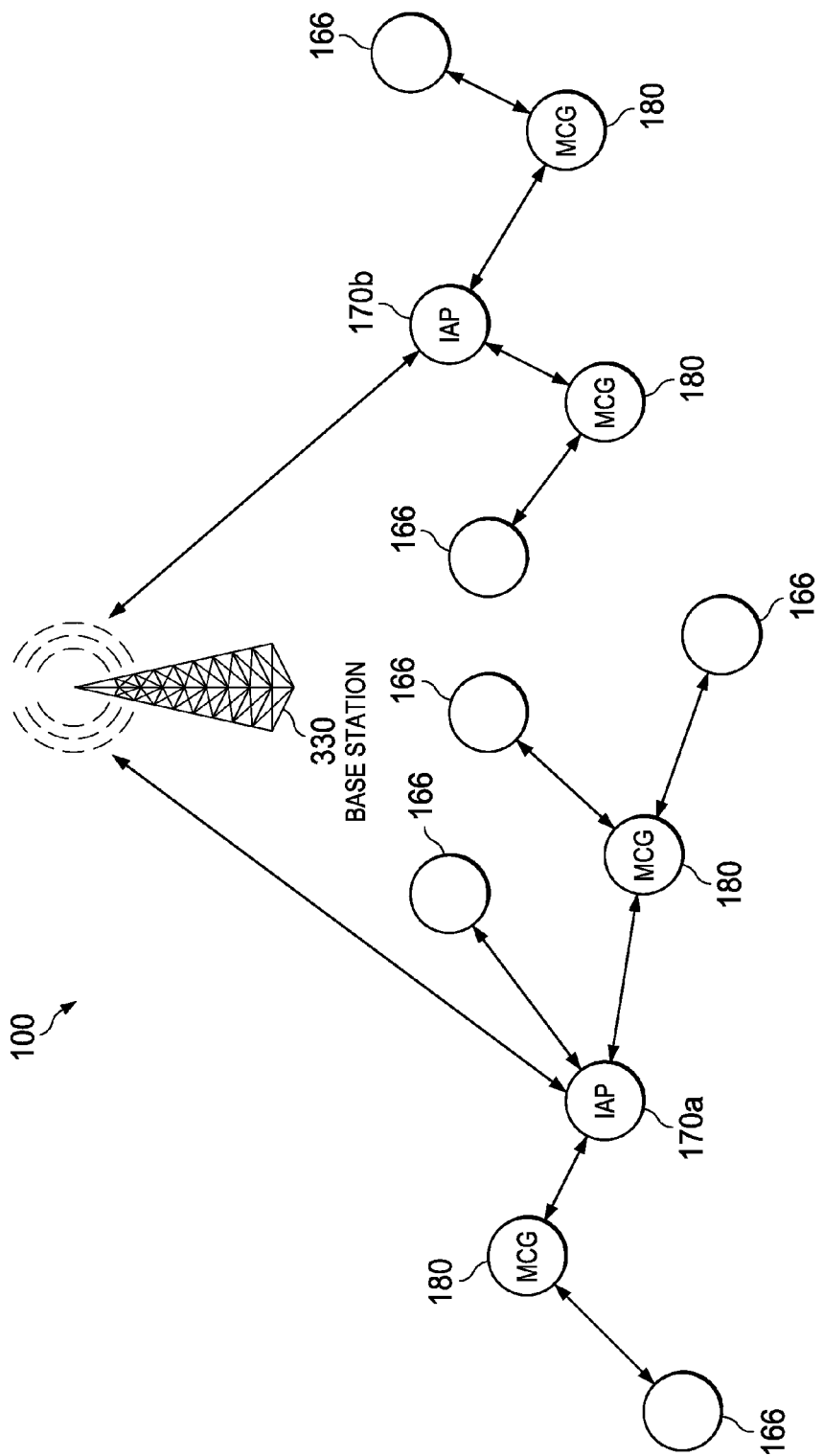
FIG. 22 is a simplified block diagram showing an example cellular access in the VAN in accordance with embodiments the present disclosure.

Turning to FIG. 22, FIG. 22 illustrates an example cellular access for VAN 100 according to embodiments of the present disclosure. According to the embodiment shown in FIG. 22, a cellular access may be enabled by a subset of users (e.g., OBUs, VMRs, etc.) with cellular access to base station 330 through wireless communication links such as HSPA, and LTE-A. Traffic may be aggregated for cost purposes (e.g., cost reduction through reduced number of cellular cards and flat rate subscriptions). To establish RAT 160, a cellular-enabled OBU in a vehicle may scan the environment and, if unable to pick up coverage of an existing RAT, may become a new IAP 170a. This procedure may use a random back-off mechanism to prevent several OBUs, for example, OBUs represented by VMR 166, from becoming IAPs simultaneously. The newly created IAP 170a may establish a control channel and proceed with creating RAT 160 as described herein. One or more OBUs in RAT 160 may function as MCGs, for example, MCG 180.

Figure 23:
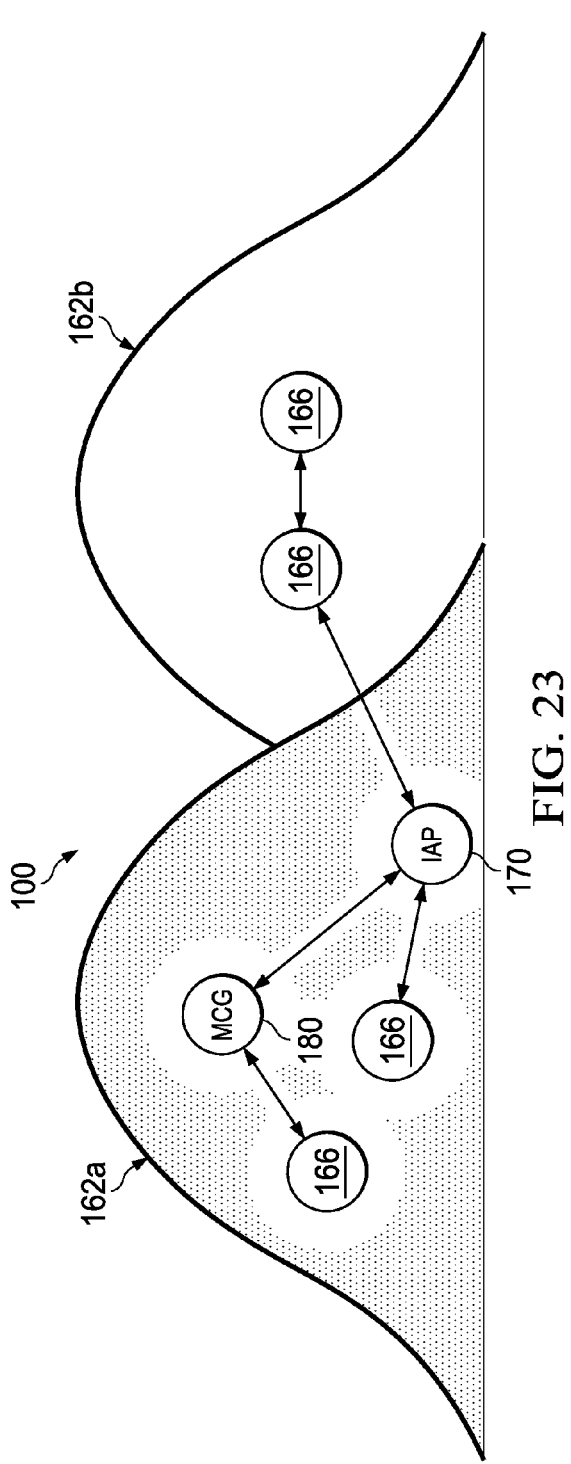
FIG. 23 is a simplified block diagram illustrating a potential principle of operation associated with embodiments of the present disclosure.

Turning to FIG. 23, FIG. 23 is a simplified diagram of a potential principle of operation of a cellular access in VAN 100 according to embodiments of the present disclosure. Cellular coverage 162a and 162b may be ubiquitous, so OBUs with IAP role (e.g., IAP 170) may be substantially under coverage. One or more OBUs in RAT 160 may function as MCGs, for example, MCG 180. One or more OBUs may also function as VMRs, for example, VMR 166. In a cellular access, a mobile IAP (e.g., OBU functioning as IAP 170) may be provided with uplink to the cellular system (e.g., a network comprising a base station). Thus, IAP 170 can move with the vehicle to which it is coupled. Consequently, RAT 160 may travel with cellular IAP 170. Handoffs may be determined by driver behavior (e.g., in a mobility model). A number of VMR handoffs may be low when a mobility pattern of the vehicles is stable.

The cellular link connecting IAP 170 to a cellular infrastructure (e.g., base station 330) may become the bottleneck for VAN capacity. In order to fully exploit the capacity of the cellular access network, each IAP 170 may supply an uplink/downlink cellular bandwidth of up to 85 Mbps, which can be hard to attain under current or future cellular systems such as HSPA or LTE-A. In one embodiment, the network architecture may be streamlined by designating an IAP per cell, thus eliminating relay traffic, and increasing capacity at the expense of a higher IAP density.

Figure 24:
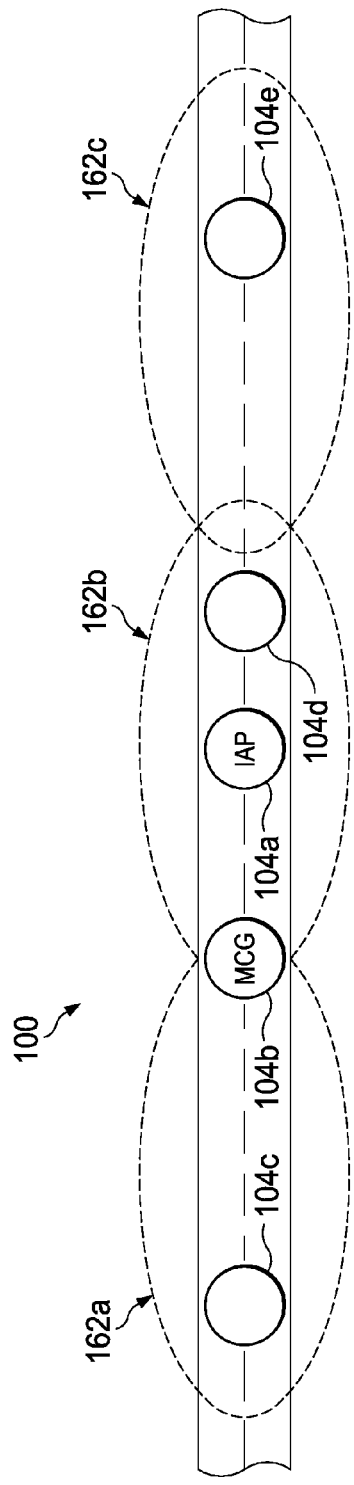
FIG. 24 is a simplified block diagram illustrating a potential principle of operation associated with embodiments of the present disclosure.

Turning to FIG. 24, FIG. 24 illustrates a cellular access according to embodiments of the present disclosure. Vehicles 104a-e may form a platoon in RAT 160. An OBU 130a in vehicle 104a may perform functions of IAP 170. IAP 170 may move with the platoon. As vehicle 104a moves from a coverage area of one base station to another, IAP connection may perform a seamless cellular handoff to the new base station. In addition, OBU in vehicle 104a may drop its role as an IAP (e.g., when vehicle 104a exits a highway) and OBU in another vehicle, say, vehicle 104b, may become a new IAP. OBUs in other vehicles, for example, vehicle 104c may perform functions of an MCG based on its location in the platoon (e.g., MCG may be located at a cell edge). Channel allocation may be dynamic, and may follow IAP 170. Cellular structure may be determined in real time, depending on the platoon's mobility, mobility events and other factors.

Figure 25:
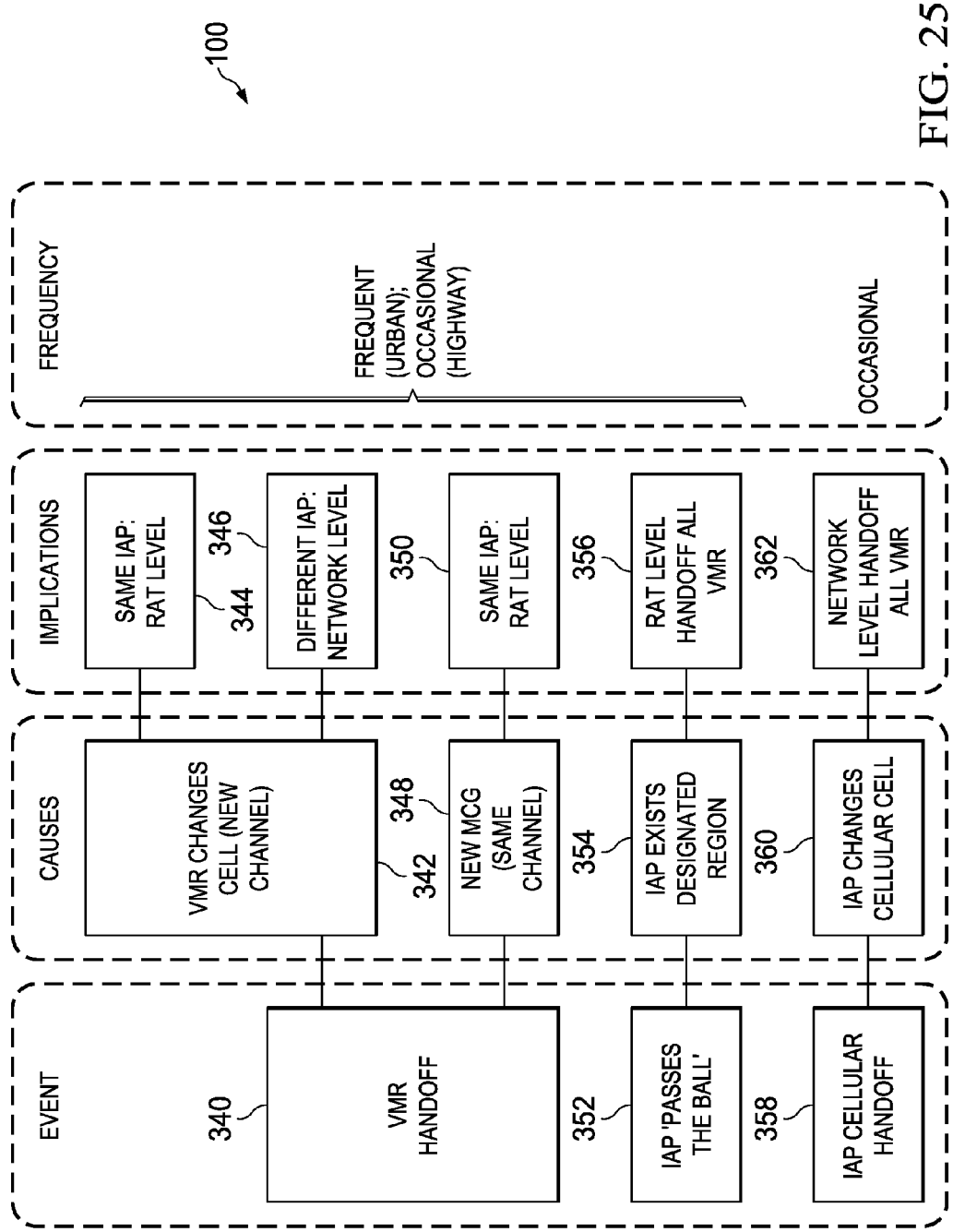
FIG. 25 is a simplified block diagram illustrating example mobility events associated with embodiments of the present disclosure.

Turning to FIG. 25, FIG. 25 illustrates a simplified block diagram of example mobility events in cellular access in VAN 100 according to embodiments of the present disclosure. For ease of description, certain blocks have been grouped together. In one embodiment, a mobility event may occur as a VMR handoff 340. VMR handoff 340 can happen for example, when VMR 166 changes cells and enters a new cell with a new channel, as indicated in block 342. When VMR 166 enters a new cell, IAP 170 may remain unchanged (e.g., when the new cell is part of the same RAT 160), as indicated in block 344. Alternatively, VMR 166 may enter a new RAT, with a new IAP, thus effecting a change on a network level, as indicated in block 346. In cellular access, frequency of VMR handover 340 occurring may be high in urban areas and may be occasional on highways.

In another embodiment according to the present disclosure, VMR handoff 340 can be caused when a vehicle coupled to MCG 180 moves away from a cell edge, and an OBU in another vehicle enters the cell edge and takes on functions of an MCG, as indicated in block 348. In such a scenario, an operating channel of the MCG may remain the same. IAP 170 for MCG 180 may remain unchanged, as indicated in block 350. Therefore, any change in connectivity may be confined to the RAT level.

In another embodiment according to the present disclosure, a mobility event may occur when IAP 170 'passes the ball' according to block 352. The mobility event may be caused when a vehicle associated with IAP 170 exits a designated region, for example, a highway, as indicated in block 354. This may result in a RAT-level handoff of all VMRs in RAT 160, as indicated in block 356. Such mobility events according to block 352 may be frequent in an urban environment and occasional on a highway.

In yet another embodiment according to the present disclosure, a mobility event may occur with IAP cellular handoff 358, caused by, for example, IAP 170 moving from a coverage area of one base station to another, as indicated in block 360. An implication may be at a network level, with handoff of all VMRs in RAT 160, as indicated in block 362. In cellular access, such IAP cellular handoff 358 may be occasional, in both urban and highway environments.

Figure 26:
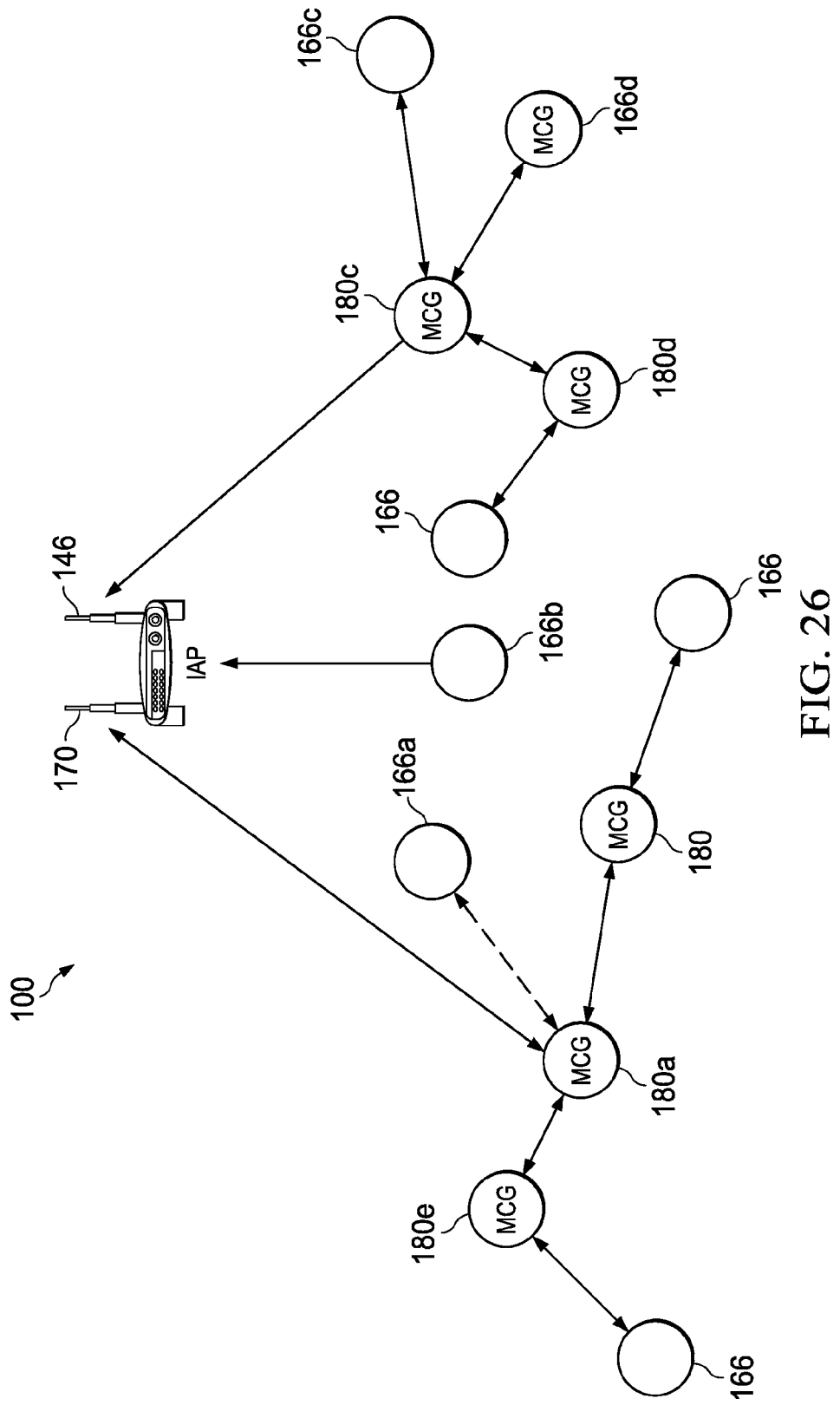
FIG. 26 is a simplified block diagram showing an example road-side access in the VAN in accordance with embodiments of the present disclosure.

Turning to FIG. 26, FIG. 26 illustrates an example roadside access for VAN 100 according to embodiments of the present disclosure. In roadside access, an RSU, for example RSU 146, may perform functions of IAP 170. A planning phase may be performed before RSUs are deployed as IAPs. During the planning phase, frequency reuse can be optimized according to a desired RSU distance (i.e., $D_{IAP}$). Several road traffic densities may also be considered, as frequency planning and nominal MCG positions may change accordingly. After deployment, IAP 170 can transmit both MCG nominal location and channel allocation through the control channel, and establish RAT 160 as described herein in connection with FIG. 4. In roadside access, VMR handoff may be high, because IAP 170 is static, hence the area occupied by each cell is also static, triggering possibly frequent MCG changes as vehicles with OBUs move. Nevertheless, VMR handoff problems in roadside access can be minimized using proper frequency planning.

Roadside access may be implemented by ferry, infostation and/or relay models. In a ferry model, an MCG, for example, MCG 180a may store traffic from other OBUs, for example, VMR 166a, and may transmit the traffic to IAP 170 when MCG 180a enters the IAP's coverage area. In an infostation model, OBUs, for example, VMR 166b, can connect to the network in a vicinity of RSUs (or infostations) like IAP 170, which are geographically distributed throughout the area of network coverage. However, outside the coverage area of IAP 170, network connectivity may be lost. Ferry and infostation models may reduce relay capacity, and may increase cluster capacity. In a relay model, OBUs, for example, VMR 166c and 166d, may transmit traffic to an MCG, for example, MCG 180c, in a coverage area of IAP 170. MCG 180b can relay the traffic to IAP 170. Other MCGs 180d-e may implement one of ferry, relay, or infostation models to transmit cell traffic to IAP 170.

Figure 27:
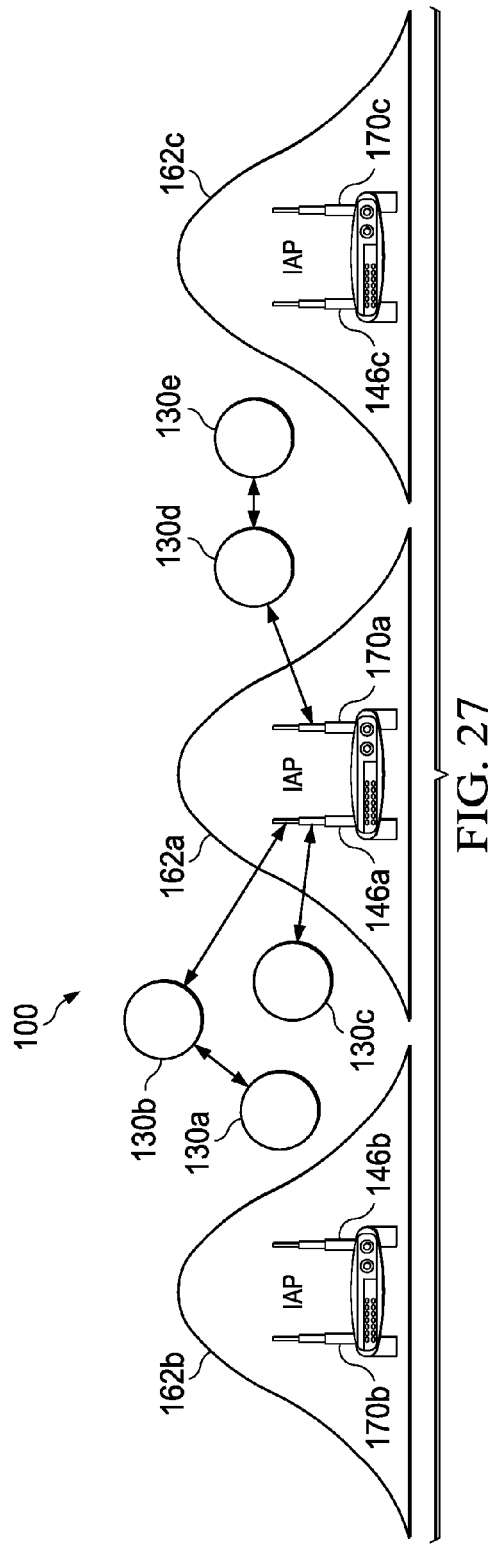
FIG. 27 is a simplified block diagram illustrating a potential principle of operation associated with embodiments of the present disclosure.

Turning to FIG. 27, FIG. 27 is a simplified diagram of a potential principle of operation of a roadside access model according to embodiments of the present disclosure. A roadside model may have bounded delay. In one embodiment, coverage areas 162a-c of IAPs 170a-c (for example, RSUs 146a-c), may not be ubiquitous (for example, when RSUs 146a-c operate on short range wireless channels), so MCG function of OBUs 130a-e may change frequently among vehicles. Outside the coverage areas, for example coverage area 162a, OBUs may not have network connectivity to IAP 170. However, they may cooperatively communicate with each other in RAT 160, possibly dynamically designating one of the OBUs as an MCG, and relaying traffic to IAP 170a via the designated MCG.

Figure 28:
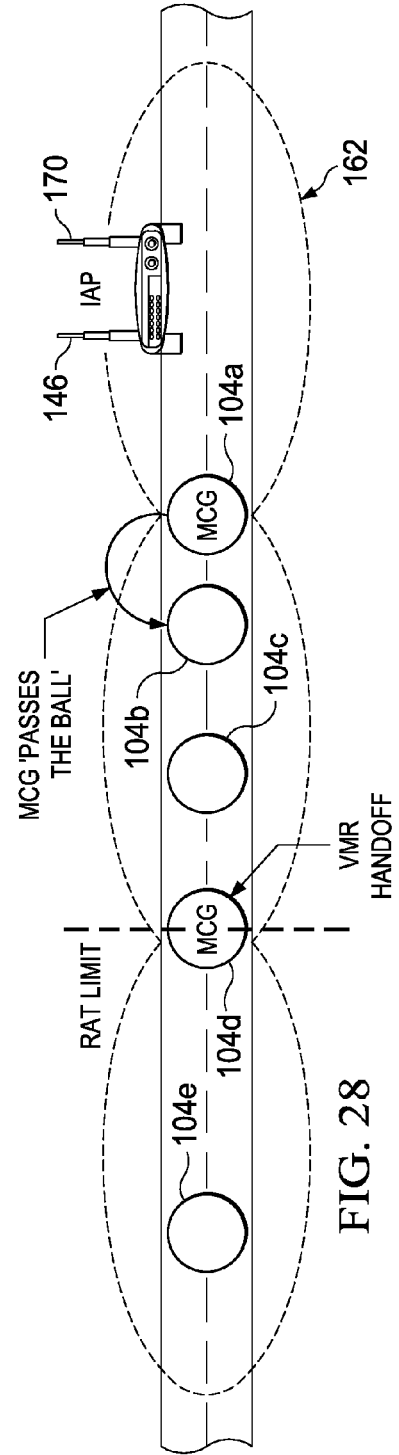
FIG. 28 is a simplified block diagram illustrating a potential principle of operation associated with embodiments of the present disclosure.

Turning to FIG. 28 illustrates an example roadside access according to embodiments of the present disclosure. Vehicles 104a-e may be part of RAT 160 established by IAP 170, which may be a RSU, for example, RSU 146. IAP coverage 162 is static, as RSU 146 is static, unlike potential embodiments using cellular access. An OBU in vehicle 104a may perform functions of an MCG based on its location in RAT 160 (e.g., MCG may be located at a cell edge). Channel allocation may be static and cellular structure may be determined (e.g., as managed or self-organized) at deployment phase. As vehicle 104a moves from one cell to another, it may 'pass the ball' to another OBU, for example, OBU in vehicle 104b, which may become the new MCG. In addition, as vehicle 104d enters RAT 160, a VMR handoff event may be triggered. Because the cell edge is static, and vehicles 104a-e are moving, such mobility events may be frequent in roadside access.

Figure 29:
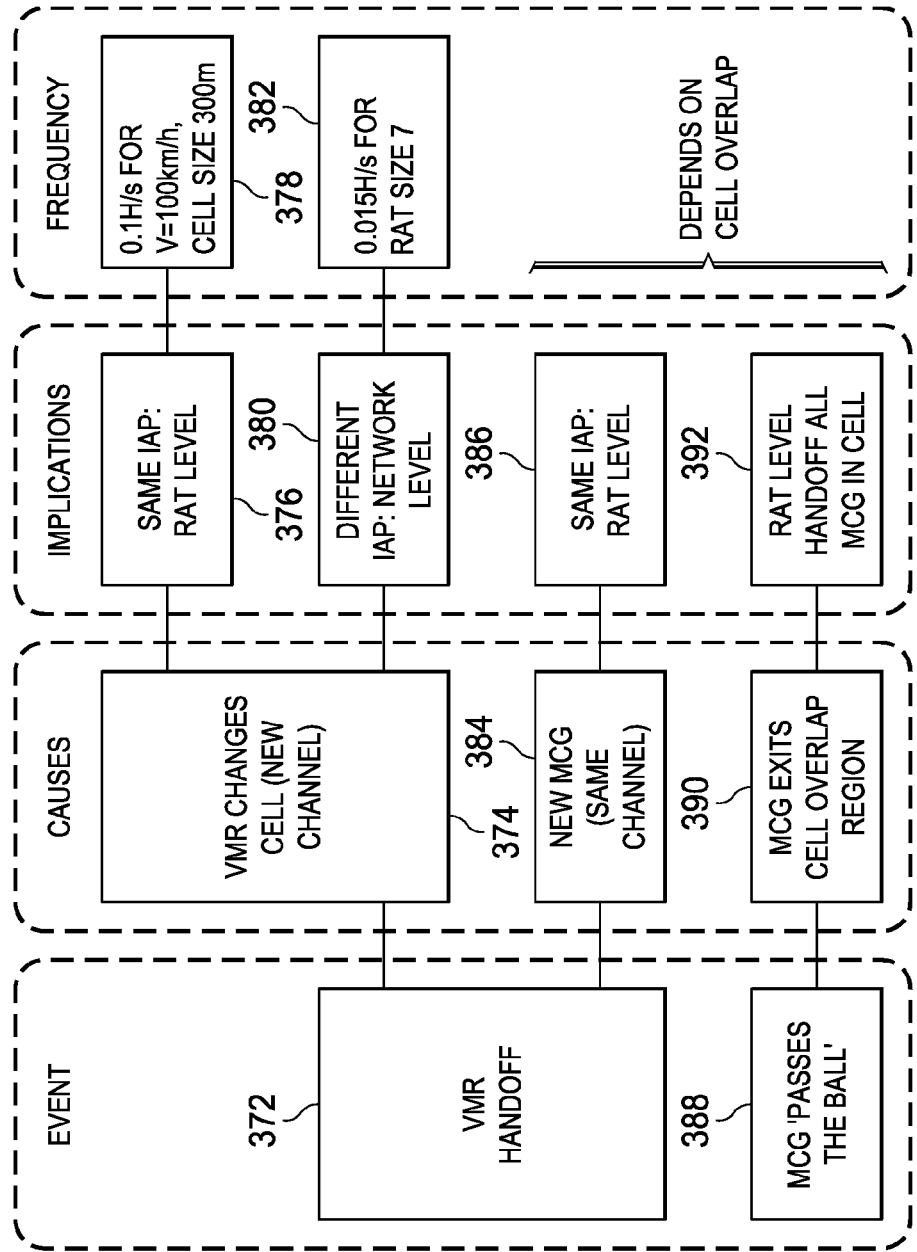
FIG. 29 is a simplified block diagram illustrating example mobility events associated with embodiments of the present disclosure.

Turning to FIG. 29, FIG. 29 illustrates a simplified block diagram of example mobility events in cellular access in VAN 100 according to embodiments of the present disclosure. For ease of description, certain blocks have been grouped together. In one embodiment, a mobility event may occur as a VMR handoff 372. A cause for VMR handoff 372 may be, for example, when a vehicle associated with VMR 166 changes cell and enters a new cell with a new channel as shown in block 374. An implication from this event may be at a RAT level, as IAP 170 remains unchanged, indicated in block 376. Frequency of VMR handoff 342 may change based on cell size, vehicle speeds, etc. For example, VMR changing cells may occur at a frequency of 0.1H/s for a vehicle travelling at 100 km/h in a cell size spanning 300m as indicated in block 378. Alternatively, an implication from VMR changing cells may be at a network level when MCG enters a new RAT 160 with a different IAP as indicated in block 380. Frequency of the foregoing events may change with RAT size. For example, for RAT size of 7, frequency of a handoff to a different IAP may be 0.015 H/s, as indicated in block 382.

In an example embodiment, VMR handoff 372 may occur when a new MCG is designated in the same channel, as indicated in block 384. An implication for this event may be at a RAT level, as IAP 170 remains unchanged, indicated in block 386. Frequency of this scenario may depend on the extent of cell overlap. The larger the overlap, the smaller the number of handoffs. In another example embodiment, a mobility event may occur when MCG 180 'passes the ball' as indicated in block 388, caused, for example, when MCG 180 exits a cell overlap region, as indicated in block 390. An implication for this may be at a RAT level, with handoff of all VMRs in the applicable cell, as indicated in block 392. Frequency of MCG passing the ball may depend on the cell overlap.

Figure 30A:
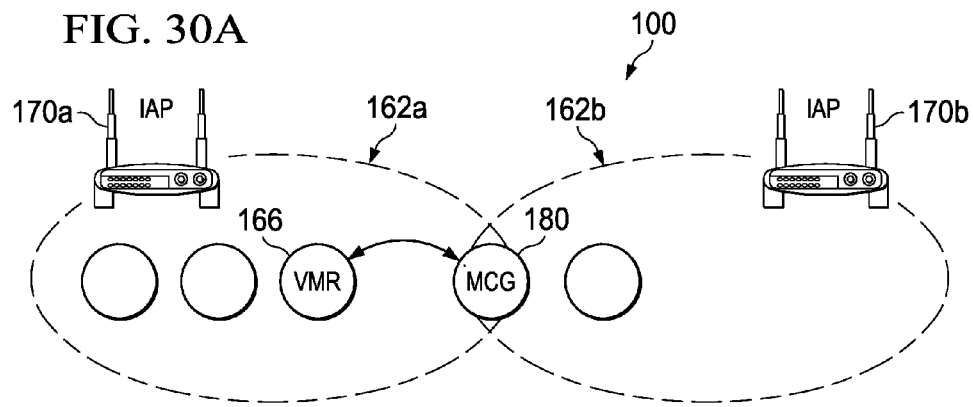
FIGS. 30A and 30B are simplified block diagrams illustrating potential principles of operation associated with embodiments of the present disclosure.
Figure 30B:
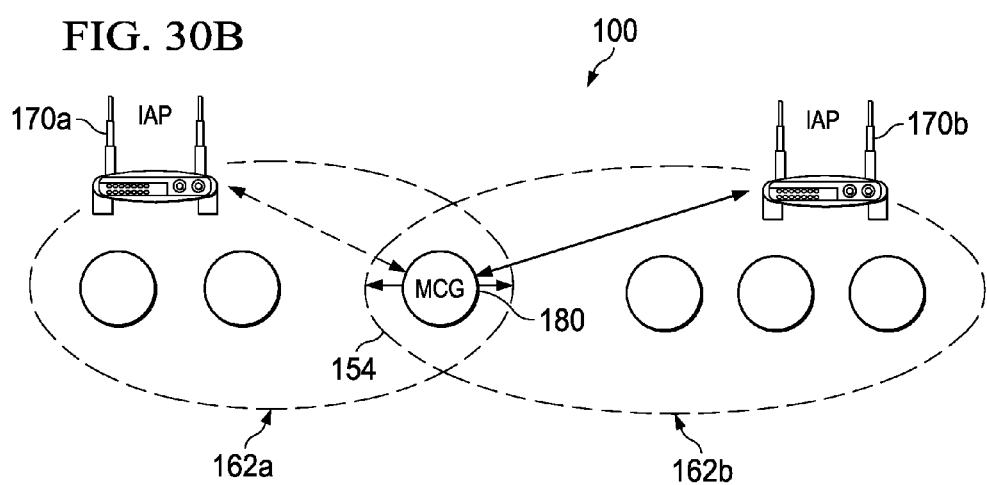

Turning to FIGS. 30A and 30B, FIGS. 30A and 30B are simplified diagrams showing a principle of operation according to embodiments of the present disclosure. MCG 180 may operate on two cells simultaneously when cells 162a and 162b overlap in RAT 160. If cells do not overlap, as illustrated in FIG. 30A, 'pass the ball' events may be frequent. For ease of description, and not as a limitation, assume that cells 162a and 162b belong to IAPs 170a and 170b, respectively. As MCG 180 moves from cell 162a to cell 162b, it may execute an MCG handoff to the nearest OBU, for example, an OBU performing functions of VMR 166. Because cell locations are static, and MCGs are mobile, such handovers may be frequent in this scenario.

With cell overlap, as illustrated in FIG. 30B, number of 'pass the ball' events can be reduced to zero. Assume that cells 162a and 162b are associated with IAPs 170a and 170b, respectively. As MCG 180 enters an edge 154 of overlap area 360, it may execute a MCG handoff from IAP 170a to IAP 170b. Nevertheless, it can 'keep the ball' and continue to perform functions of MCG associated with IAP 170a.

In an example, when traffic load is low, a goal of communication system 10 may be to guarantee connectivity to all OBUs. Therefore, substantial cell overlap may facilitate that a MCG is available in a desired coverage area for all cells. On the other hand, in high traffic conditions, reduced cell overlap may increase capacity allowing a reduction of the reuse factor. Increasing the reuse factor can allow increase in a maximum distance from the desired user to the MCG. This can be used to overlap cell coverage areas, creating larger areas where the MCG can communicate on both cells, which, in turn, reduces the frequency of MCG changes. Unfortunately, reducing the frequency of MCG changes can come at an expense of decreasing capacity; therefore, a tradeoff may be reached between implementation complexity and performance. In roadside access, results indicate that for an intensive (yet not prohibitive) deployment of one RSU every few kilometers it may be possible to serve even very busy highways with high vehicle mobility.

Figure 31:
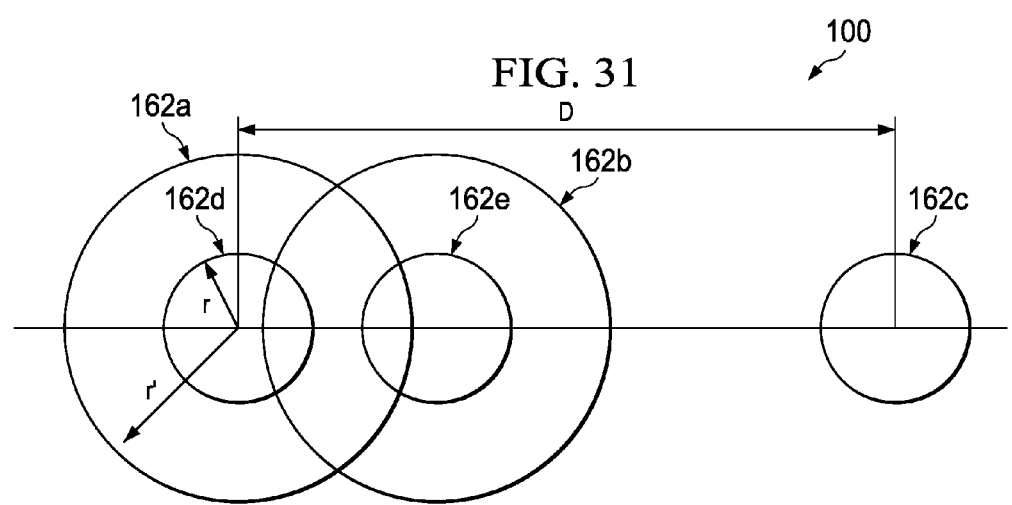
FIG. 31 is a simplified block diagram illustrating a potential principle of operation associated with embodiments of the present disclosure.

Turning to FIG. 31, FIG. 31 shows a principle of operation according to embodiments of the present disclosure. For a given target SINR ($\gamma_i$), and distance (D) between centers of cells 162a and 162c, cell size of cell 162a (indicated by cell radius r) may be determined from the following mathematical equation:

$$r = \frac{D}{2(2\gamma_i)^{1/\alpha} + 2}$$

where $\alpha$ is the propagation exponent. Frequency reuse size F may be determined to be:

$$F = \left\lceil \frac{D}{2r} \right\rceil$$

For overlapping cells, a frequency reuse size F' is calculated from the following relation, using the smaller radius r', corresponding to a larger target SINR (for cells 162d and 162e):

$$F' = \left\lceil \frac{D}{2r'} \right\rceil$$

Figure 32:
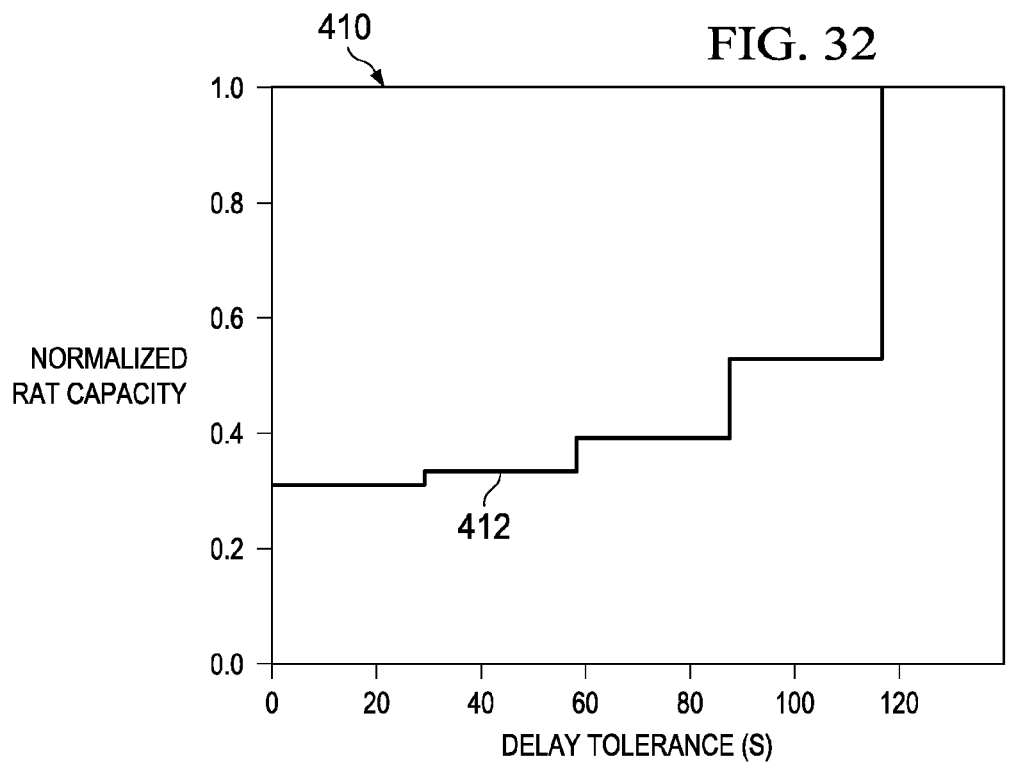
FIG. 32 is a graph showing normalized RAT capacity over delay tolerance in accordance with embodiments of the present disclosure.

Turning to FIG. 32, FIG. 32 is a graph 410 showing nominal RAT capacity over delay tolerance (measured in seconds) according to embodiments of the present disclosure. Line 412 is plotted for Q=F=9, and a cell size of 400 m. As delay tolerance increases, normalized RAT capacity may increase. Around a delay tolerance of 115 seconds, normalized RAT capacity may tend to ∞. A roadside access may be suitable for delay insensitive traffic because although delay is predictable in relation to speed, network connectivity may fail due to various reasons (e.g., congestion). Example models for delay characteristics and traffic type for various roadside access models are listed in the table below.

| Traffic type | Max Delay | Model |
|---|---|---|
| streaming/VoD | ~2 min | Ferry/infostation |
| IPTV | ~2 s | Relay |
| Conferencing | ~150 ms | Relay |
| Gaming | ~50 ms | Relay |

Figure 33:
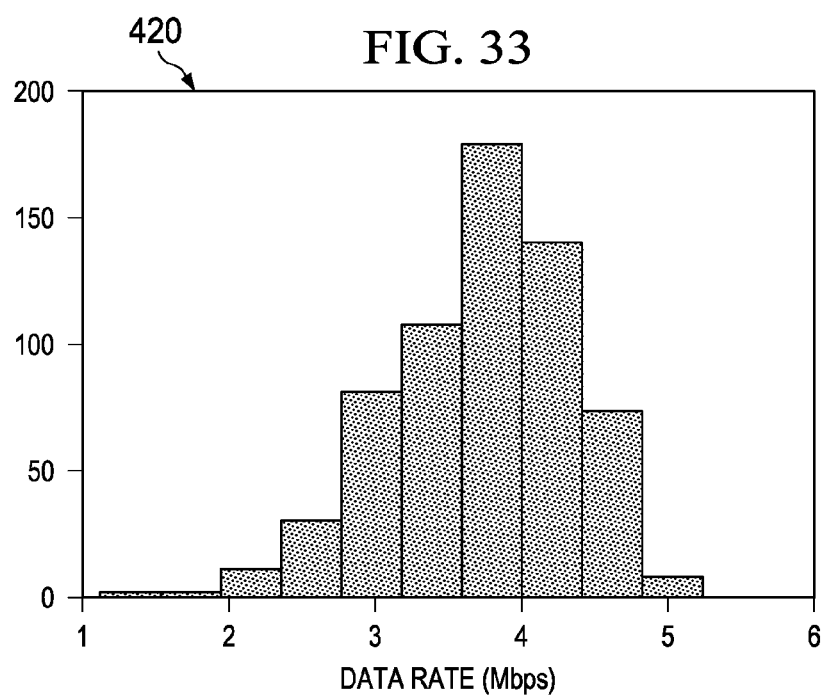
FIG. 33 is a histogram of access capacity in cells in an example RAT in accordance with embodiments of the present disclosure.
Figure 34:
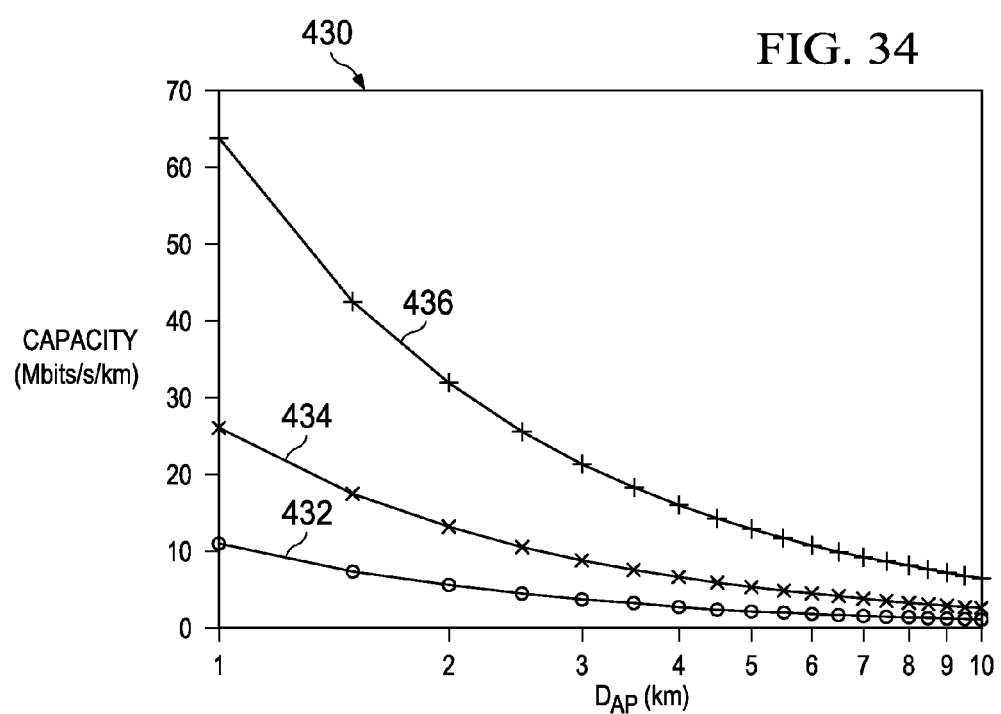
FIG. 34 is a graph of capacity over distance from IAP for an example RAT in accordance with the present disclosure.
Figure 35:
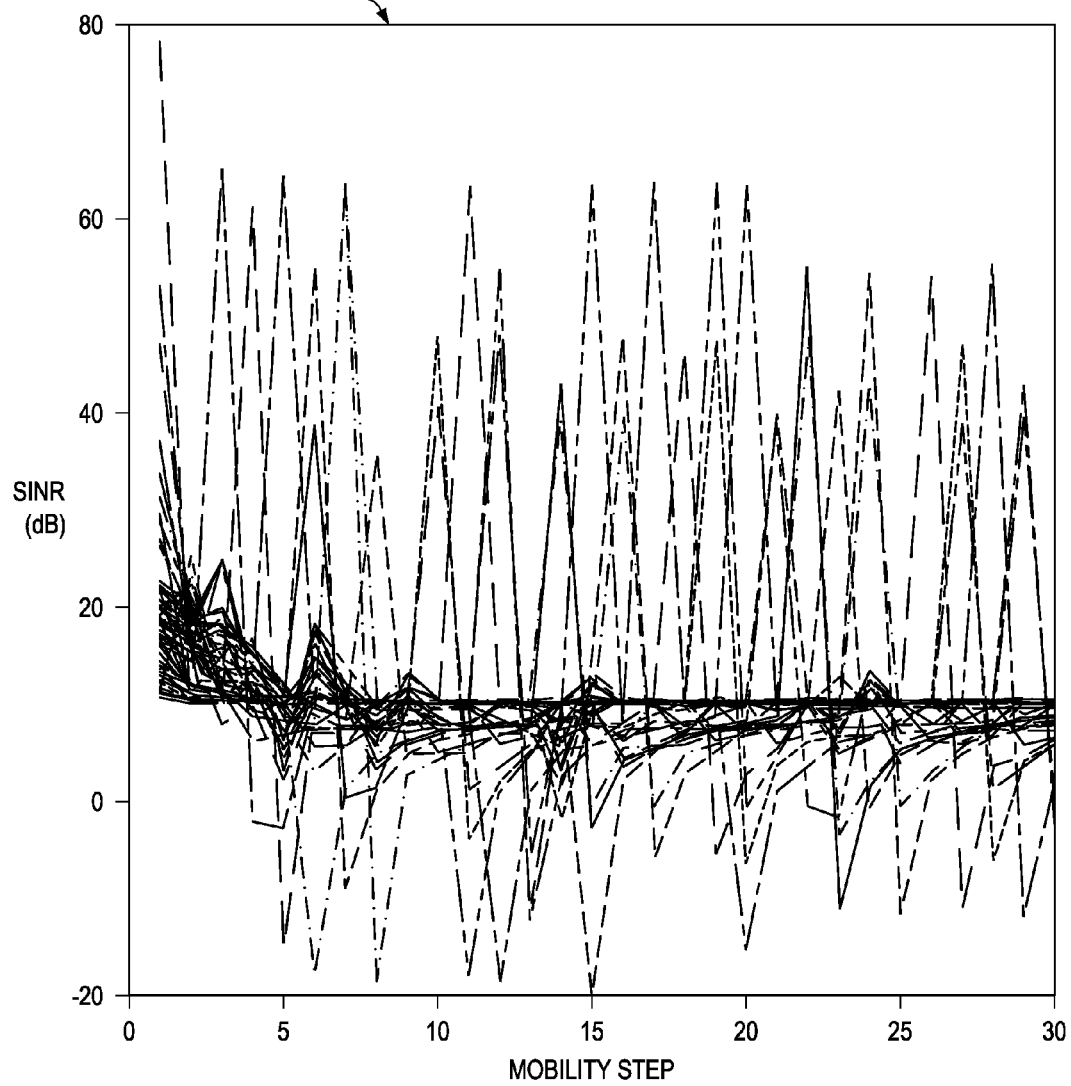
FIG. 35 is a graph illustrating temporal evolution of SINR of mobile cell gateways in an example RAT in accordance with embodiments of the present disclosure.

Turning to FIGS. 33-35, FIGS. 33-35 show results from various simulations associated with embodiments of the present disclosure. VAN 100 may implement RAT topology for connectivity between vehicles, cellular access and roadside access. RAT 160 may be rooted at IAP 170 spanning multiple cells. MCGs can collect traffic of each cell; however, channel allocation may be non-uniform. VAN 100 may support services ranging from VoIP to standard quality video and conferencing. It may accommodate variable IAP density for different road types. Using theoretical principles disclosed herein for various embodiments according to the present disclosure, simulations were conducted for a highway vehicular environment. A wireless medium was statistically characterized by a deterministic, distance-dependent path loss component (with path loss exponent $\alpha=3$), correlated lognormal shadowing, and un-correlated fast fading. A cellular automata model was used to model vehicular mobility, which may represent an example mobility pattern of vehicles on a highway.

The model may represent a platoon-like mobility pattern with small perturbations in vehicle speed representing acceleration and braking patterns. The following assumptions were used in the model: i) a vehicle may accelerate only up to its maximum allowable speed or speed of a preceding vehicle; ii) deceleration may be random with a probability $p_d$; iii)

vehicles may randomly enter or exit with probability $p_e$; iv) sensitivity of the air interface for different transmission modes corresponds to a Cisco Aironet® product line; (v) fading margin is zero; (vi) efficiency of carrier sense multiple access (CSMA) medium access contention is at 60% (i.e., 40% of channel bandwidth was assumed lost due to contention, regardless of a number of users); and (vii) each user obtains an equal share of channel access, which is divided among all users in a given cell.

The example embodiment was evaluated with IEEE 802.11p, g, and n air interfaces in the 5.9/2.4 GHz band, respectively. For 802.11p, four 10 MHz channels were used, while three 20 MHz channels were assumed for 802.11g/n. Each channel was conveniently slotted in regular TDM intervals to satisfy the channel reuse scheme described herein. Additional simulation parameters are listed herein:

| Parameter | Value |
| --- | --- |
| Target SINR $\gamma_T$ | 10 dB |
| Max Transmission power | 20 dBm |
| Frequency reuse F | 7 |
| RAT size Q | 7 |

FIG. 33 shows a histogram 420 of access capacity ($\overline{C}$) of each cell in the network, obtained as a sum of access capacities of active mobile links for IEEE 802.11g according to simulations associated with embodiments of the present disclosure. Variability in cell capacity in FIG. 33 may be caused by mobile positions and channel propagation conditions used in the simulations. The average capacity is 3.72 Mbps—IEEE 802.11p yields 1.56 Mbps, while IEEE 802.11n yields 9.13 Mbps.

FIG. 34 shows a graph 430 of capacity per road unit distance for IEEE 802.11n/g/p according to simulations associated with embodiments of the present disclosure. Line 432 corresponds to IEEE 802.11n, line 434 corresponds to 802.11g and line 436 corresponds to 802.11p. As shown by graph 430, capacity decreases with increasing $D_{IAP}$. Based on simulation results for cell capacity, and properly scaling cells according to the distance between access points ($D_{IAP}$), a capacity per road unit distance as shown in the FIGURE may be calculated. It may be noted that a capacity of 20/9/3.5 Mbps/km is possible for IEEE 802.11n/g/p, respectively, when placing an IAP every three kilometers, which may be a reasonable density for major highways. It will be appreciated that simulation results depend on various assumptions, including those made in the characterization of the wireless channel. Increasing $D_{IAP}$ further may also yield reasonable capacity values for secondary roads. With these values, it may be possible to cover, to a large extent, interactive communications needs for even high density of users in congested highways.

FIG. 35 shows a graph 440 of temporal evolution of SINR of all MCGs for a power control scheme according to simulations associated with embodiments of the present disclosure. Power control algorithms may be effective to maintain a target SINR, for example, a target SINR of 10 dB. Spikes in the plot correspond to handovers, when MCGs change cells and/or access a new channel with a nominal (maximum) power level. It may be noted that the algorithm is able to stabilize transmitted power values in a scenario with high mobility and frequent handovers.

Communication system 10 as described herein may disrupt wireless landscapes by greatly expanding possibilities for new types of networks. A massive growth of voice and wireless demand can follow deployment of OBUs. Expanded services, including quality video streaming, video conferencing, and multiple individual sessions within the same vehicle (e.g., a passenger watches a movie while another passenger plays a video game) may be possible due to various features of OBUs, including high processing power, improved antennas, battery capacity, and distributed infrastructure support. In addition, according to embodiments of the present disclosure, VANs can add new infrastructure possibilities that may substantially expand wireless capacity. For example, a third party, such as car manufacturers, or WSPs or RSU operators, may provide network access credentials including globally unique phone number 152 to OBUs inside respective vehicles. OBUs may associate unique VSIMs (e.g., VSIM 150) to globally unique phone number 152. OBUs may establish a network connection with an appropriate network using the network access credentials provided by the third party.

Car manufacturers, as owners of OBUs, may exploit their long-term customer relationship with car owners to offer wireless services as a feature in their vehicle fleets. RSUs may be owned and operated by toll highway operators, government agencies, or licensees. Finally, cellular wireless service providers may embrace the new infrastructure to offload data traffic from their already congested networks. Thus, embodiments of the present disclosure can provide unprecedented vehicular access capacity through a planned usage of the wireless spectrum.

Potential for such access capacity may be fully leveraged by a large degree of cooperation among all users of the unlicensed spectrum. For example, a car manufacturer may increase market share by bundling its car with an attractive package of wireless services that could be a market differentiator. Instead of deploying/acquiring its own cellular network, the car manufacturer may negotiate an agreement with existing WSPs. To get access to RSUs, the car manufacturer may also cooperate with highway operators or government agencies managing RSU infrastructure.

Moreover, a critical fraction of the vehicular fleet may be equipped with suitable OBUs to reach a density that makes VANs according to the embodiments described herein feasible. Hence, the car manufacturer, despite its desire for differentiation, may cooperate with other car manufacturers to develop appropriate standards for suitable OBUs. Such cooperation among these varied entities may be in a form of a global consortium or multiple alliances. Additional compelling reasons for a consortium include increased negotiating power with WSPs and RSU operators, and facilitation of interoperability standards.

In certain implementations and numerous examples provided herein, vehicle 10 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In one example implementation, the on-board unit (OBU) (e.g., OBUs 30, 130a-e) is a network element that facilitates or otherwise helps coordinate mobility events, network connectivity, and the transmission of data packets (e.g., for mobile devices, for machine devices, for nodes, for end users, or for a network such as those illustrated in the FIGURES herein) associated with a vehicular network environment. As used herein, the term 'network element' is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In example implementations, at least some portions of the enabling mobile wireless service from a vehicle in a vehicular network environment activities outlined herein may be implemented in software in, for example, the OBU. In some embodiments, one or more of these features may be implemented in hardware, provided external to these elements, or consolidated in any appropriate manner to achieve the intended functionality. The OBU may include software (or reciprocating software) that can coordinate in order to achieve the operations, as outlined herein. In still other embodiments, one or both of these elements may include any suitable algorithms, hardware, software, components, modules, interfaces, or objects that facilitate the operations thereof. Furthermore, OBUs described and shown herein may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements.

It is imperative to note that, because of the inherent properties of the technologies being leveraged by the present disclosure, the terms 'node', 'network element', 'OBU', and 'controller' are broad and, therefore, inclusive of many of the equipment examples discussed herein (e.g., a router, a wireless mobile device, a gateway, etc.). Such expansive breadth is afforded to this terminology due to the flexibility of the presented architectures (e.g., components can be readily exchanged for alternatives). Moreover, countless possible design configurations can be used to achieve the operational objectives outlined here. Accordingly, the associated infrastructure has a myriad of substitute arrangements, design choices, device possibilities, hardware configurations, software implementations, equipment options, etc. In addition, the terms 'node', 'network element', 'OBU', and 'controller' share overlapping definitions as used herein in this Specification, where particular scenarios and environments may require these elements to be extended to specific device provisioning that is atypical. At least in a general sense, these terms are interchangeable due to the limitless schemes in which they can be deployed.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc.

Moreover, although communication system 10 has been illustrated with reference to particular elements and operations that facilitate the communication process, these elements and operations may be replaced by any suitable architecture or process that achieves the intended functionality of communication system 10. Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
  joining a vehicular access network (VAN) in a location, the VAN facilitating communication between a plurality of on-board units (OBU) in respective vehicles;
  scanning the VAN for coverage of at least one infrastructure access point (IAP), wherein the at least one IAP operates on a control channel in a radio access tree (RAT) comprising a plurality of cells;
  receiving channel allocation information from the at least one IAP, wherein the channel allocation information comprises at least one request for a mobile cell gateway (MCG) at a nominal location in the RAT; and
  sending a candidacy message to the at least one IAP to become an MCG.

2. The method of claim 1, further comprising:
performing functions of the at least one IAP and establishing the control channel in the RAT if the coverage cannot be identified.

3. The method of claim 1, wherein at least one OBU in the plurality of OBUs is mobile.

4. The method of claim 1, wherein the at least one IAP is a roadside unit (RSU) operating on at least one short-range wireless channel.

5. The method of claim 4, wherein at least two cells in the plurality of cells overlap with each other.

6. The method of claim 1, wherein the nominal location is at an edge between two cells in the plurality of cells.

7. The method of claim 1, wherein the plurality of cells are covered by at least two non-overlapping channels.

8. The method of claim 1, further comprising:
locating in a first cell in the plurality of cells, a first MCG that aggregates a first traffic from at least one node in the first cell;
locating the IAP in a second cell; and
transmitting the first traffic to the IAP.

9. The method of claim 8, further comprising:
locating in a third cell a second MCG that aggregates a second traffic from at least one node in the third cell;
transmitting the first traffic to the second MCG; and
transmitting the first traffic and the second traffic to the IAP.

10. The method of claim 8, further comprising:
locating a vehicular mobile router (VMR) in the first cell that aggregates end-node traffic from end nodes; and
transmitting the end-node traffic to the first MCG.

11. The method of claim 10, wherein the VMR is an OBU in the plurality of OBUs and performs functions of a femto-cell.

12. The method of claim 1, wherein the location is a highway.

13. The method of claim 1, wherein the location is an urban area.

14. The method of claim 1, wherein the communication comprises maximizing a capacity of the RAT by implementing a frequency reuse method.

15. The method of claim 1, wherein the VAN comprises a plurality of IAPs located within a geographical area, and a capacity of the VAN increases with an increasing number of IAPs within the geographical area.

16. The method of claim 1, wherein the communication comprises:
implementing an iterative power control algorithm, comprising:
retrieving a stored signal-to-interference plus noise ratio (SINR);
calculating an updated SINR for a node in the RAT;
storing the updated SINR; and
calculating an individual power component for the node.

17. The method of claim 1, wherein the communication comprises:
implementing a utility power control algorithm, comprising:
randomly selecting a node in the RAT;
updating a power level for the node; and
maximizing a utility function corresponding to the power level independently for each node.

18. The method of claim 1, further comprising:
receiving a network access credential comprising a globally unique phone number from a service provider selected from a group comprising vehicle manufacturers, cellular wireless service providers, and road-side unit operators;
associating at least one virtual subscriber identity module with the globally unique phone number; and
establishing a network connection with the VAN using the network access credential.

19. Logic encoded in non-transitory media that includes code for execution and when executed by a processor is operable to perform operations comprising:
joining a vehicular access network (VAN) in a location, the VAN comprising communication between a plurality of on-board units (OBU) in respective vehicles;
scanning the VAN to pick up a coverage of at least one infrastructure access point (IAP), wherein the at least one IAP operates on a control channel in a radio access tree (RAT) comprising a plurality of cells;
listening to a channel allocation information from the at least one IAP, wherein the channel allocation information comprises at least one request for a mobile cell gateway (MCG) at a nominal location in the RAT; and
sending a candidacy message to the at least one IAP to become an MCG.

20. An apparatus comprising:
a memory element configured to store data;
a network interface; and
a computing processor operable to execute instructions associated with the data, wherein the network interface, computing processor and the memory element cooperate such that the apparatus is configured for:
joining a vehicular access network (VAN) in a location, the VAN comprising cooperative communication between a plurality of on-board units (OBU) in respective vehicles;
scanning the VAN to pick up a coverage of at least one infrastructure access point (IAP), wherein the at least one IAP operates on a control channel in a radio access tree (RAT) comprising a plurality of cells;
listening to a channel allocation information from the at least one IAP, wherein the channel allocation information comprises at least one request for a mobile cell gateway (MCG) at a nominal location in the RAT; and
sending a candidacy message to the at least one IAP to become an MCG if the apparatus is within a range of the nominal location in the RAT.

* * * * *